(12) United States Patent
Korchagin et al.

(10) Patent No.: US 7,918,314 B2
(45) Date of Patent: Apr. 5, 2011

(54) HOISTING SYSTEMS FOR HIGH-RISE BUILDING MAINTENANCE

(75) Inventors: Pavel V. Korchagin, Moscow (RU);
Marina E. Korchagina, Moscow (RU);
Andrey G. Tirsky, Moscow (RU); Ivan P. Korchagin, Moscow (RU)

(73) Assignees: Pavel V. Korchagin, Moscow (RU);
Marina E. Korchagina, Moscow (RU);
Andrey G. Tirsky, Moscow (RU)

( * ) Notice: Subject to any disclaimer, the term of this patent is extended or adjusted under 35 U.S.C. 154(b) by 958 days.

(21) Appl. No.: 11/682,716

(22) Filed: Mar. 6, 2007

(65) Prior Publication Data

US 2008/0011546 A1 Jan. 17, 2008

(51) Int. Cl.
*E04G 3/00* (2006.01)
(52) U.S. Cl. .................................... 182/82; 187/239
(58) Field of Classification Search ............ 182/82, 182/142, 145; 187/239, 403; 414/239
See application file for complete search history.

(56) References Cited

U.S. PATENT DOCUMENTS

| | | | | |
|---|---|---|---|---|
| 3,688,921 A * | 9/1972 | Zaha | ............................ | 414/233 |
| 4,776,746 A * | 10/1988 | Peng | ............................ | 414/253 |
| 4,828,072 A * | 5/1989 | Ho | ................................ | 182/9 |
| 6,345,948 B1 * | 2/2002 | Irish | ............................ | 414/234 |
| 7,191,873 B2 * | 3/2007 | Korchagin et al. | ............ | 187/239 |
| 2008/0236944 A1 * | 10/2008 | Patron | ............................ | 182/112 |

FOREIGN PATENT DOCUMENTS

JP 03151474 A * 6/1991

* cited by examiner

*Primary Examiner* — Alvin C Chin-Shue
(74) *Attorney, Agent, or Firm* — Steven E. Kahm

(57) ABSTRACT

A hoisting system for high-rise buildings which incorporates upright rails mounted on outer walls of the building, a lifting block for each rail. A truss section attached to two lifting blocks to form a loading platform for people or hardware. Doors and windows provide access from the building to the platform, which may be enclosed. The rails are secured on metallic trusses mounted in upright position inside the building structure. The metallic truss can have stairs or elevators for transporting people. The platform can be divided into compartments for holding trays. Guide rollers on the sides of the trays and drive wheels under the trays move the trays into and between the compartments. In this manner cars may be parked in limited space by being lifted to a floor and moved to an open compartment. The platform can be used for emergency evacuation, for construction, parking, or fire fighting.

64 Claims, 35 Drawing Sheets

HOISTING SYSTEMS FOR HIGH-RISE BUILDING MAINTENANCE

BACKGROUND OF THE INVENTION

1. Field of Invention

This invention is referred to vehicles, particularly to the systems for transporting, evacuating and rescuing people, mainly from high-rise buildings, and can be used during construction, fire-fighting and maintenance of high buildings. The invention applies to the system that is to ascend and descend personnel, cargoes and technical hardware required for maintenance on high-rise buildings.

2. Description of the Related Art

Nowadays in high-rise buildings, any upright transportation becomes mostly limited to ladders and scaffolds that can conquer only 70-90 m high buildings. The efficiency of fire-extinguishing facilities mounted on the outer side of the building turns out to be restricted by the height of such escape ladders used for fire-fighting and rescue operations. Access to outer walls and the roof during construction and maintenance are limited too. For instance, wooden platforms, hoisted on ropes and hung unreliably from the top, prevail in window washing. During construction there might be problems with scaffolding. During maintenance, the face of high buildings is not accessible for attending personnel, because no appropriate lifting systems are available.

It is known that during emergency situations, fire-fighters and rescue personnel use vehicles with telescopic booms, provided with special arrangements facilitating the escape of rescued people as shown in (RU No. 2079312, A 62 B 1/02, published 20 May 1997).

Functional capabilities of above-mentioned vehicles are limited by height: hence, they are useless for rescue and fire-fighting operations in buildings, higher than 70-90 meters, often called skyscrapers.

An exterior evacuation system is also known for use on high-rise buildings. It consists of rails secured to the outer walls, along which a cabin can travel transporting fire-fighters and rescue personnel to the emergency hotbed and evacuate rescued people from it. In this case, the rail with a traveling cabin has H-form in cross section and is toothed to be engaged with tooth-gear drive wheels (U.S. Pat. No. 4,865,155, B66 B9/00, publication 12 Sep. 1989, issued Sep. 12, 1989).

This system allows performing rescue and fire-fighting operation only in the zone of rail location, thus considerably diminishing its capabilities under conditions, when walls in the building have an arbitrary profile.

SUMMARY OF THE INVENTION

The objects of the invention are to:

solve engineering problem of using the hoisting system on high-rise buildings with round and cone profiles of their exterior face walls;

solve engineering problem of arranging one hoisting system on at least two planes of neighboring buildings;

solve engineering problem of arranging rail guides on planes of high-rise buildings with stress-bearing structural members located inside the perimeters of these buildings and quite distantly from their exterior face planes (at least, 1-4 meters);

solve engineering problem of using the hoisting system for assembling, repairing, preventive, construction works and other janitorial services (window replacement and cleaning) on tower-type buildings with round-and-cone profiled walls along entire width and height;

solve engineering problem of providing the possibility to perform individual ascending to or descending from one level of multi-floor building of at least two platforms (trays) with useful load (with cars, for example) simultaneously;

solve engineering problem of providing possibility to perform individual mechanized handling of at least two trays with useful loads (cars, for instance) from or to the loading platform of truss section in the hoisting system;

solve engineering problem of accommodating, at least, two additional empty trays on the plane of truss section hoisting system, as well as to arrange mechanized handling operations;

solve engineering problem of enhancing stability and load-carrying capacity of lifting blocks in the hoisting system;

solve engineering problem of reinforcing the structure of hoisting system truss;

solve engineering problem of providing the possibility to use platforms (trays) for car transportation;

solve engineering problem of providing the possibility of mechanized delivery of trays (with/without cars) in four orthogonally related directions of horizontal plane;

solve engineering problem of providing the possibility to arrange a multi-level parking garage complex from the side of dead (brandmauer) wall (firewall) in a multi-story building;

solve engineering problem of providing the possibility to arrange a multi-level parking garage complex in a multi-story building;

solve engineering problem of providing the possibility to deliver an individual tray (with/without useful load) to any rectangular compartment of storage and retrieval dock in a multi-story building;

solve engineering problem of providing the possibility to rotate empty trays beyond the boundaries of storage and retrieval dock in a multi-story building;

solve engineering problem of providing the possibility to load/unload cars and/or trays with cars or other useful loads and/or empty trays that are as long as a loading platform from direction of face ends of loading platform in the hoisting system truss.

The engineering result to be achieved due to applied invention is improvement of efficiency and enhancement of operational capabilities to maintain tower-type buildings with round- and -cone profiles owing to vertical and horizontal transportation of personnel, cargo and attached implements on the outer wall as well as to rescue of people during fire and any other emergency situations. An additional technical effect to be gained with suggested invention is improvement of efficiency and enhancement of operational capabilities of hoisting system during maintenance of multi-story buildings due to vertical and horizontal transportation of at least two trays with useful loads (with cars, for example) along the outline surface of buildings.

The above-mentioned engineering effect is achieved due to a special design of hoisting system for high-rise building maintenance: it comprises vertically secured rails on outer walls with at least one lifting block for each rail, having a fastening unit and a relocating mechanism; the system is distinctive by remote-located rails along outer wall and separate lifting blocks mounted on each rail that are linked, at least, with one truss section, thus making an integrated hoisting system traveling along rails lengthwise and in doing so the internal plane of truss section imitates the contour of building wall; the truss section is provided with platforms for people and/or cargo, whereas lifting blocks and hoisting system truss section are furnished with doors and man-holes to be matched with doors, man-holes and/or windows available in high buildings.

The above-mentioned effect is also achieved due to the fact that this hoisting system can be used for, at least, two adjacent high buildings: it consists of rails mounted on at least two outer walls of these buildings, one lifting block for each rail, having a fastening unit and a relocating mechanism; lifting blocks mounted on each rail are linked with each other with at least one truss section, thus making an integrated hoisting system traveling along the rails lengthwise; the truss section is provided with platforms for people and/or cargo, whereas lifting blocks and truss section are furnished with doors and man-holes to be matched with doors, man-holes and/or windows available in high buildings.

The unit fastening the lifting block to the rail is made in the form of two groups of carrying wheels, each of them having at least one wheel, in this case wheel spindles are perpendicular to one plane in which the longitudinal axis of rail is located; wheels of the first group are so made that they can touch with the first seating surface of the rail, opposite to, at least, one second of seating surface of rail, while the wheels of the second group are mounted with possible contact with second seating surface of rail.

In this case, the fastening unit is integrated with the third group of carrying wheels, the spindles of which are perpendicular to, at least, one plane, where, at least, one longitudinal axis of rail is located; carrying wheels of the third group can touch, at least, with one third of seating surfaces of the rail, mating with one second of seating surfaces of rail and positioned at a angle to the indicated second seating surface of rail.

The relocating mechanism is made in the form of drive-engaged gearwheel, the teeth position of which is matching the position of teeth made along indicated rails lengthwise. Alternatively, it can be made in the form of, at least, one carrying wheel; in this case it incorporates a drive-engaged gear wheel, the teeth position of which is matching the position of teeth made on the rail lengthwise.

Each rail has a constant cross section in its basic part with a rigidly-fixed tooth rack, where teeth are formed up lengthwise.

The relocating mechanism is a drive-engaged rubber-covered wheel forced-down to the rail with such an effort which is sufficient for avoid any slide relatively to the rail. Alternatively, this mechanism can be made as a steel cable with relocating device.

Rails are of H-profile.

Each truss section is made as a frontal passage having a prolonged rectangular form with two lateral sides, flooring and roofing.

The hosting system is provided with lift block speed adjustment devices to ensure their synchronous traveling.

Lifting blocks are pin-connected with truss sections due to horizontally-rotated platforms and vertically-rotated joints provided in lifting block cases.

Hinged access bridges with elastic accordions are arranged in the zone of movable connection of lifting blocks with truss sections.

An exterior site with protective enclosure is provided on the roof of lifting blocks and frontal passages. Man-holes with attached ladders from inward compartments of hoisting system are also provided on the roof of lifting blocks and frontal passages. Additional hinged access bridges are equipped in the area of movable connection of lifting blocks with frontal passages.

Minimum one lifting block of the hoisting system is equipped with stationary crane facilities, furnished with upright rotation gear for reciprocal displacement of crane boom from the side of its bearing edge: the telescopic boom, consisting of two elements, connected by means of upright rotation gear, can reach any place on the building.

As an alternative variant, a telescopic boom can be equipped with a jib-raising mechanism and hoisting hook.

Alternatively, a pulling yoke with hinged-connected fenced platform is attached to the boom end through vertically rotating gear. In this case, this platform is equipped with a man-hole and is made of fire-proof material.

As a variant, the platform can have fire-extinguishing facilities.

A protective enclosure of platform has sliding doors.

As a variant, a detachable crane device equipped with jib-raising mechanism and hoisting hook is mounted on the platform or frontal passage of hoisting system.

As a variant, a detachable washing unit (provided with brushes and nozzles for liquid spraying and air-drying) for mechanized cleaning of outer surfaces of high buildings is suspended to the platform or frontal passage of hoisting system.

Also as a variant, the platform and frontal passage can be equipped with detachable manipulator. This manipulator is made as a secured support, to which the first end of the boom is attached, whereas the other end of boom is enabled to move relatively to the first end of the boom.

As a variant, a fastening connector is provided on the second end of the manipulator boom.

Provision is made in the manipulator that the second end of boom can move inside the building.

Additional air-tight closing doors are made available on front and/or lateral surfaces of lifting blocks and frontal passage. In this case, air-tight doors and outside surfaces of hoisting system are provided with heat-resistant windows.

All lifting blocks have safety brakes to ensure halts or slow-down of movement during emergency.

The above-mentioned engineering effect is achieved due to the fact that hoisting system for high building maintenance has additional metallic frame with some horizontal beams to secure the rail; in this case the metallic frame is mounted inside the high-rise building, looking like rectangular trusses installed one beneath another in vertical direction between horizontal floor structures.

For this purpose, rectangular trusses of framework are rigidly connected between each other in upright direction, thus forming an integral stack with joints passing through floor holes.

One of the load-bearing structural elements is placed inside integral stack or beside it.

The integral stack of metallic framework is secured on each floor to erection clips of metallic bands which cover the load-bearing structural elements of the high-rise building. The integral stack is connected with erection clips by means of damper brace rods.

The rail is placed on the plane of integral stack in metallic longitudinal shell that is located inside the exterior outline of the building. In this case, the metallic longitudinal shell makes ensemble with outer surface of building, while its aperture with the rail inside is covered by an upright set of sliding panels which are decorated in the same manner as the finish coating of the building.

Holes made in horizontal floors for integral stack of metallic frame are filled with resilient thermal sealant.

Expansion joints are made in load-bearing structural elements of common stack along entire area of their horizontal section by equal upright intervals.

Expansion joints are also made in the rail and in the metallic shell along entire area of their horizontal section at equal upright intervals.

Along its entire perimeter, the integral stack of metallic shell is furnished with walls made of solid thermal-resistant material, thus forming-up separate sections on each level of high-rise building. These separate sections are connected with each other by means of ladders and air-tight, heat-resistant floor hatches. These separate sections on each floor are provided with apertures, having air-tight closing doors and heat-resistant windows.

The above-mentioned engineering result is also achieved due to a special design of hoisting system for high-rise building maintenance: it comprises vertically secured rails on outer walls with at least one lifting block for each rail, having a fastening unit and a relocating mechanism; the system is distinctive by remote-located rails along outer wall and separate lifting blocks mounted on each rail that are linked, at least, with one truss section, thus making an integrated hoisting system traveling along rails lengthwise and in doing so the internal plane of truss section imitates the contour of building wall; the truss section is provided, at least, with one platform for people and/or cargo, that is divided by guide rollers into rectangular compartments, whereof it contains individual trays mounted on drive wheels available on the loading platform of truss section.

Lifting blocks are hinged with truss section by means of swivel connectors.

As a variant, one end of separate swivel connector is fixed on one lateral surfaces of lifting block, while another end is secured on one of side surfaces of truss section.

As a variant, one end of separate swivel connector is fixed on the bottom surface of lifting block, while another one is secured on the upper surface of truss section.

As a variant, one end of separate swivel connector is fixed on the upper surface of lifting block, while another one is secured on the lower surface of truss section.

As a variant, one end of separate swivel connector is fixed on frontal surface of lifting block, while another one is secured on one of lateral surfaces of truss section; in this case, each of two opposite lateral surfaces of truss section has a link with two lifting blocks.

Through apertures are available in the plane of truss section for accommodating empty trays; in this case, rectangular compartments, formed up by through apertures, are identical to rectangular compartments of the loading platform and equipped with drive wheels and guide rollers to displace empty trays.

Upright rails are mounted on surfaces of upright stacks of metallic frame being a constituent of multi-story building.

As a variant, in each upright stack of metallic frame there is a vertical aperture, where, at least, three rails are mounted on three surfaces, which are engaged with fastening units and relocating mechanisms, located on three vertical planes of lifting block.

Each rectangular compartment of loading has a common plane of horizontal floor and a common plane of horizontal ceiling with other rectangular compartments and vertical structural elements at its level. Meanwhile vertical structural elements are rigidly connected with flooring plane and ceiling plane into an integral structure of truss section.

In the lower part of vertical structural elements there are apertures where guide rollers are mounted.

Trays are made in the form of rectangular metallic flat platforms having guide paths or slots for car's wheels. These guide slots have slant flanges, inclined to the horizontal surfaces, whereas all external surface of tray is ridged.

The hoisting system is additionally equipped, at least, with one transit platform having access to road network in the city.

This transit platform is divided by metallic curbs into rectangular compartments. Overall sizes of rectangular compartments are similar to overall sizes of rectangular compartments of loading platform in the truss section. Location of rectangular compartment groups is so positioned that some sides of external perimeters closely border with each other and symmetry axes of separate compartments are aligned in each group.

In metallic curbs of rectangular compartments in the transit platform, there are guide rollers to be engaged with trays, installed on drive wheels provided in rectangular compartments of transit platform.

On the plane of transit platform, there is a chamber with absorbers.

An automatic barrier is available in the plane of transit platform in front of each tray mounted in the rectangular compartment of transit platform and/or in rectangular compartment of loading platform of truss section.

Flights of stairs and/or passenger elevators are provided in upright stacks of metallic frame.

Additionally, the hoisting system near dead wall of multi-story building has a dismountable multi-level structure.

Upright rails are mounted on outer surfaces of upright stacks of metallic frame that is an integral part of dismountable multi-level structure.

An even storage and retrieval dock, open, at least, to one hoisting system, is equipped on each level of dismountable multi-story structure, designed for multi-level parking garage complex.

The storage and retrieval dock of dismountable multi-story structure has usable area quite sufficient to accommodate, at least, one horizontal row of rectangular compartments, designated for cars or trays with cars.

Besides, each rectangular storage and retrieval dock has a common flooring and ceiling planes as well as vertical structural elements with other rectangular compartments of dismountable multi-level structure at the same level. According to this execution, some guide rollers of storage and retrieval dock in the dismountable multi-level structure are mounted in apertures in the lower part of adjacent vertical structural elements.

Each rectangular compartment of storage & retrieval dock in the dismountable multi-level structure is provided with separate trays interacting with guide rollers that are mounted on drive wheels available in the plane of floors in the storage & retrieval dock of the dismountable multi-level structure.

Rectangular compartment overall sizes of the storage & retrieval dock in dismountable multi-level structure are similar to rectangular compartment overall sizes of loading platform in the truss section of hoisting system. Location of rectangular compartment groups is so positioned that some sides of their external perimeters border closely with each other and symmetry axes of separate compartments are aligned in each group.

The storage and retrieval dock of multi-story structure has usable area quite sufficient to accommodate, at least, two horizontal rows of rectangular compartments, designated for cars or trays with cars. In this case, rectangular compartments of storage & retrieval dock in a multi-story structure are separated by horizontal lines of guide rollers.

Each rectangular compartment of storage & retrieval dock with other rectangular compartments at the same level has common planes of floors, ceiling and vertical structural elements. According to this design, there are apertures with guide rollers mounted in it, in the lower part of adjacent vertical structural elements in the storage & retrieval dock of multi-level structure.

Each rectangular compartment of storage & retrieval dock in the multi-level structure has separate trays, interacting with guide rollers, which are mounted on drive wheels available in the flooring plane of storage & retrieval dock in the multi-level structure.

Additionally on two outer walls of building, the system has, at least, two hoisting systems, one of which elevates cars from entry transit platform to the storage & retrieval dock in the multi-level parking garage complex, while the second one lowers cars from storage & retrieval docks of garage to the entry transit platform.

In addition, the system is provided with conveying system that makes possible to rotate empty trays beyond the boundaries of storage & retrieval docks in the multi-story structures. The conveying system, comprising consecutively arranged compartments, connects the entry transit platform with the exit one in multi-level parking garage.

Rectangular compartments of conveying system are provided with guide rollers. In this case, each rectangular compartment has separate empty trays interacting with guide rollers that are mounted on drive wheels available in the floor plane of conveying system.

Rectangular compartment overall sizes in the conveying system are similar to rectangular compartment overall sizes in the entry/exit transit platforms. The location of rectangular compartment groups is so positioned that some sides of their perimeters border closely with each other and symmetry axes of their separate compartments are aligned in each group.

The conveying system is equipped with automatic equipment for washing and drying empty trays as well as with crane facilities for handling empty trays.

Overall sizes of rectangular compartments in loading platform and through apertures of truss section, transit platform, storage & retrieval dock in dismountable multi-story structure, storage & retrieval dock of multi-level structure and overall sizes of conveying system are identical.

Meanwhile, the ratio of width and length equals to no less than 1:2 for each separate rectangular compartment of loading platform and through apertures of truss section, transit platform, storage & retrieval dock in dismountable multi-level structure, storage & retrieval dock in multi-level structure and conveying system.

According to this design, the area of each rectangular compartment is made up of two squared zones in loading platforms and through apertures of truss section, transit platforms, storage & retrieval docks in any dismountable multi-level structure, storage & retrieval docks in any multi-story building and conveying systems.

Drive wheels of loading platform, through apertures of truss section, transit platform, storage & retrieval dock in dismountable multi-level structure, storage & retrieval dock in multi-story building and of conveying system are provided in each squared zone of rectangular compartments.

The number of drive wheels of loading platform, through apertures of truss section, transit platform, storage & retrieval dock in dismountable multi-level structure, storage & retrieval dock in multi-story building and that of conveying system is not less than four in each squared zone of rectangular compartments. Wheels are located in pairs on symmetry axes, leastwise, on each side of squared zone.

As a variant, drive wheels, available in each squared zone of rectangular compartments of loading platform, through apertures of truss section, transit platform, storage & retrieval dock in dismountable multi-level structure, storage & retrieval dock in multi-story building and of conveying system, are so positioned that axes of symmetry of one pair of drive wheels are aligned, whereas the axes of symmetry of another pair of drive wheels are parallel to the axis of symmetry of the first pair and are located at equal distance from it.

In this case, drive wheels of loading platform, through apertures of truss section, transit platform, storage & retrieval dock and conveying system are actuated by engines.

In addition to that, drive wheels of loading platform, through apertures of truss section, transit platform, storage & retrieval dock and conveying system have tread tires.

Guide rollers are installed along the perimeter of each rectangular compartment in the loading platform, through apertures of truss section, transit platform, storage & retrieval dock and conveying system.

Meanwhile, the number of guide rollers in each rectangular compartment of the loading platform, through apertures of truss section, transit platform, storage & retrieval dock and conveying system is at least twelve: four of them are located in the corners of rectangular compartment, six rollers are placed on long sides, whereas two rollers are positioned on short sides; axes of symmetry of all twelve guide rollers are located along the perimeter of rectangular compartment at equal spaces.

Each guide roller is represented by two spindles with tires, which are mounted between lower and upper round pads fixed to the rod by pin; a guide roller is rigidly mounted on the surface of rectangular compartment. Tires have treads on their working surfaces. The upper round pad of guide rollers has a spherical surface at the top and in this case external planes of tires do not protrude over the boundaries of diameter in the upper round pad.

Some guide rollers are mounted to allow a reciprocal movement.

As a variant, some guide rollers are equipped with protruding supports to hold a tray. According to its design, protruding supports in guide rollers are provided with elastic gaskets.

As a variant, drive wheels of loading platform, through apertures of truss section, transit platform, storage & retrieval dock and conveying system are rigidly secured on pivoted carriages in each squared zone of rectangular compartments; pivoted carriages are positioned in seats so that reciprocal movement is possible in vertical direction.

As a variant, drive wheels of loading platform, through apertures of truss section, transit platform, storage & retrieval dock and conveying system are rigidly secured on pivoted carriages in each squared zone of rectangular compartments; in this case rectangular compartments are provided with slide-out supports mounted over the boundary of pivoted carriage. The number of slide-out supports is at least four and they are so positioned that each separate support can be engaged with a corner part of tray bottoms. The upper face end of each slide-out support has an elastic gasket.

As a variant, drive wheels, in pairs, are so mounted in corners of each squared zone of rectangular compartments that reciprocal movement is possible in vertical direction: rotation axes of drive wheels in each pair are mutually perpendicular.

According to such design, pairs of drive wheels, mounted in corners of each squared zone of rectangular compartments are engaged with guide slots in bottom trays. In this case, guide slots in bottom trays have slant flanges.

These features are essential and so interrelated that they create a steady combination of essential features which are quite enough to obtain a required engineering effect.

Distinctive features of applied system have not been found during patent search of known systems of similar purpose that proves that the present engineering solution meets the requirements of patentability.

BRIEF DESCRIPTION OF DRAWINGS

The present invention is accompanied with examples, which, however, are not unique, but vividly demonstrate that it is possible to achieve the required technical effect owing to the combination of essential features.

DETAILED DESCRIPTION OF THE PREFERRED EMBODIMENTS

Figure 1:
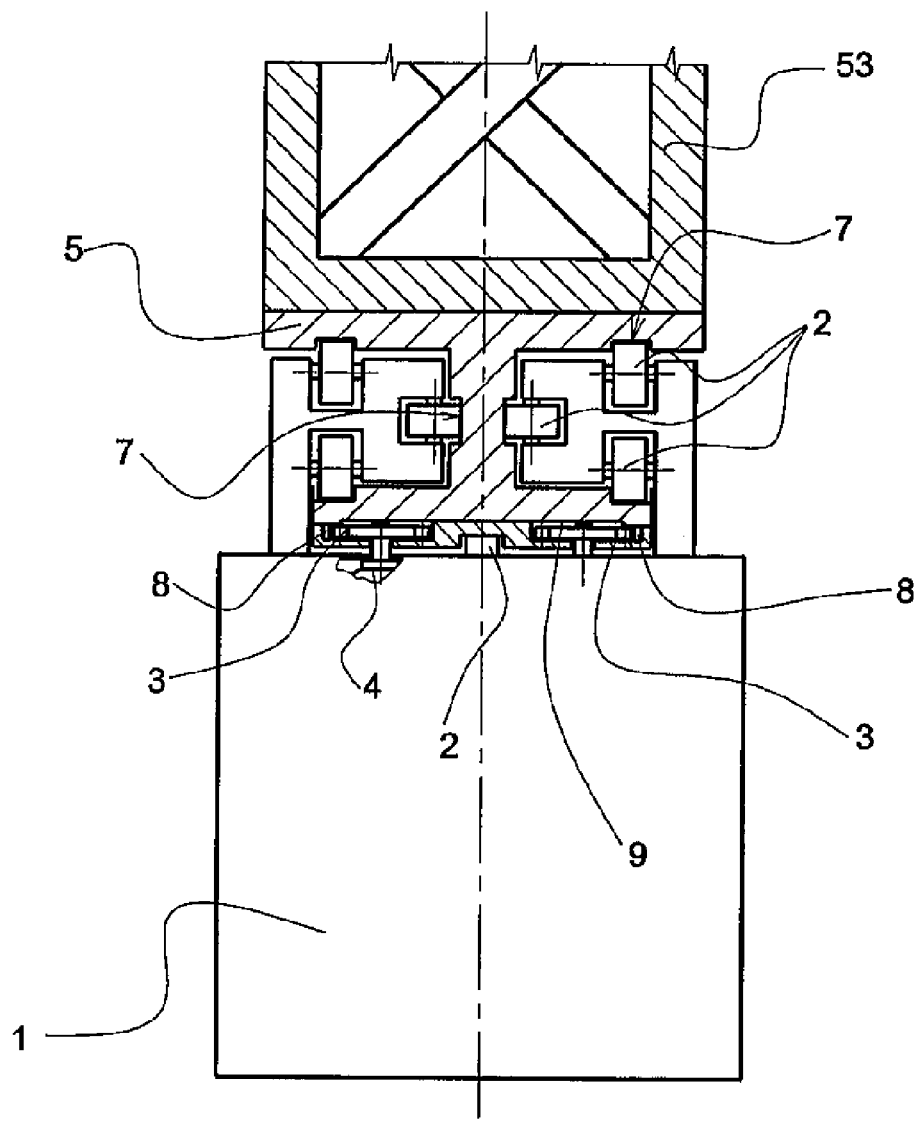
FIG. 1: Cross section of H-rail and running gear of lifting block, top view
Figure 2:
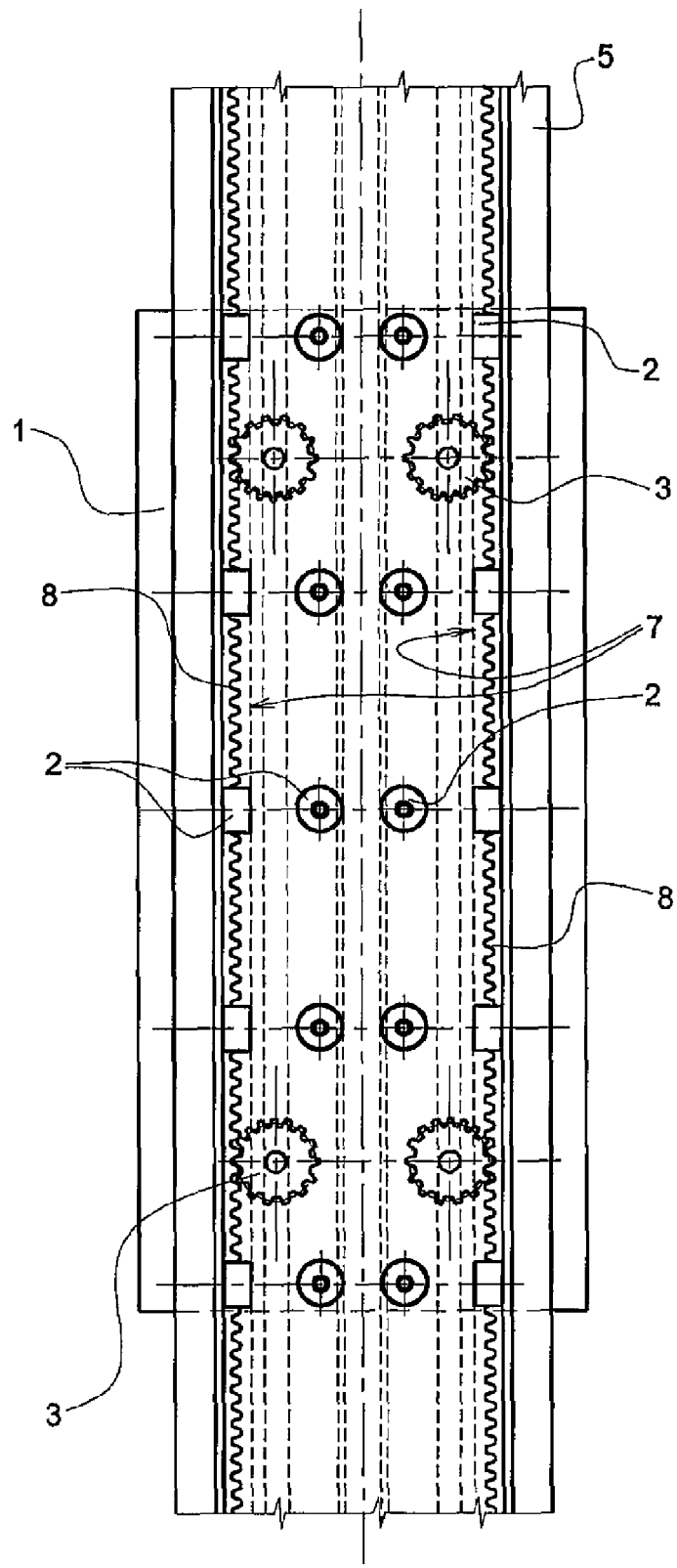
FIG. 2: Running gear of lifting block, rear view.

The present invention is substantiated by the following examples:

As illustrated in FIG. 1 and FIG. 2, hoisting systems in the form of lifting blocks 1 have identical running gear with carrying wheels 2 and tooth-gear drive wheels 3. The tooth-gear drive wheels 3 are actuated by engines 4, installed inside of lifting block frame. Due to its running gear, the lifting block 1 is capable to travel along H-rails 5, mounted on outer planes of high-rise building 6. Such a possibility is provided owing to the engagement of carrying wheels 2 and tooth-gear drive wheels 3 with guide slots 7 and guide racks 8 of H-rail 5. To improve such an engagement, carrying wheels are positioned in different planes, while tooth-gear drive wheels 3 are located in guide slots 9 of H-rail 5.

Figure 3:
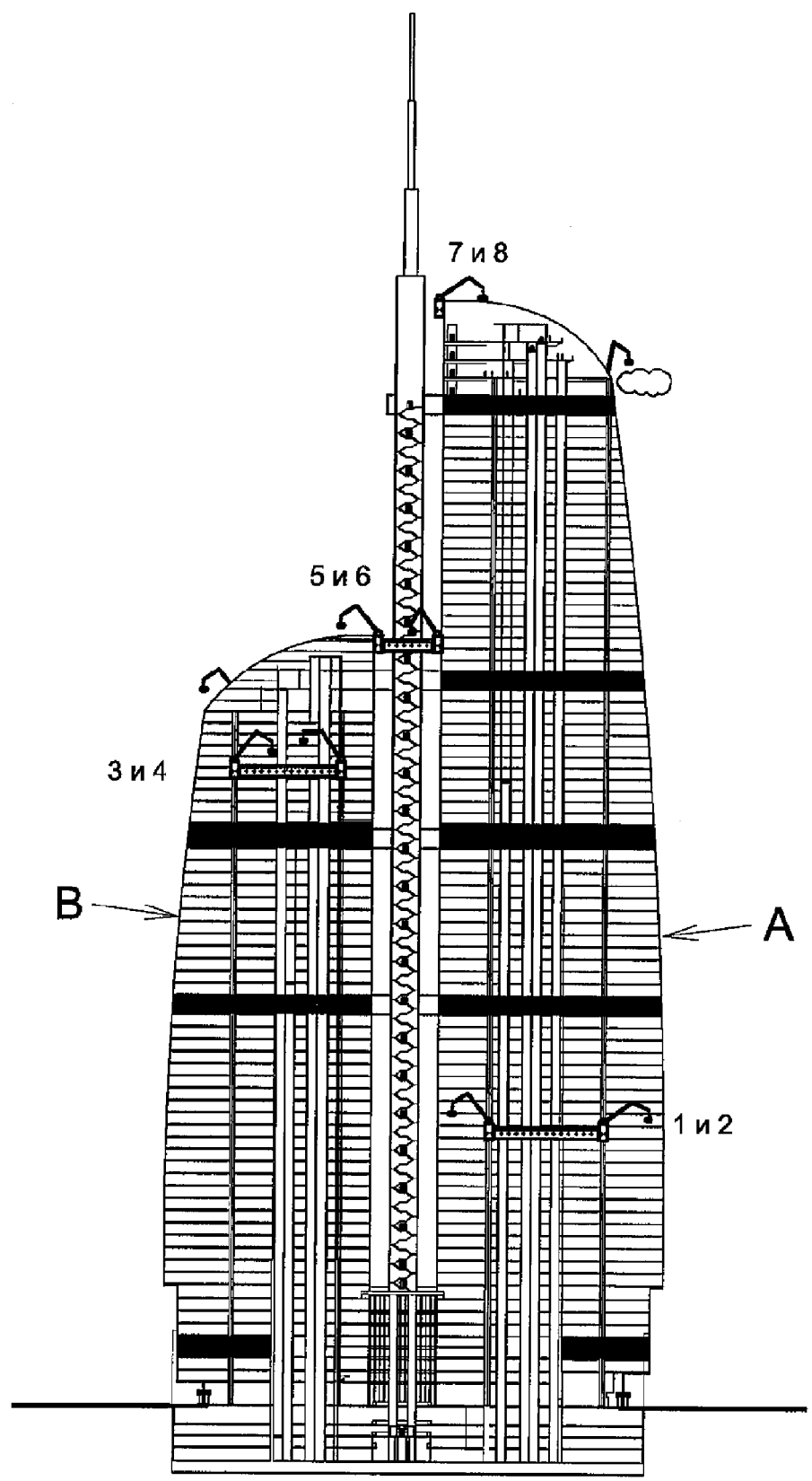
FIG. 3: High-rise building equipped with several hoisting systems, front view. ("Federation" Tower Complex in the city of Moscow).

A high-rise building 6 has several lines of H-rail 5 on its outer rounded surface, mounted along entire height of structure. Rails are mounted vertically with some distance between each other (FIG. 3).

Figure 4:
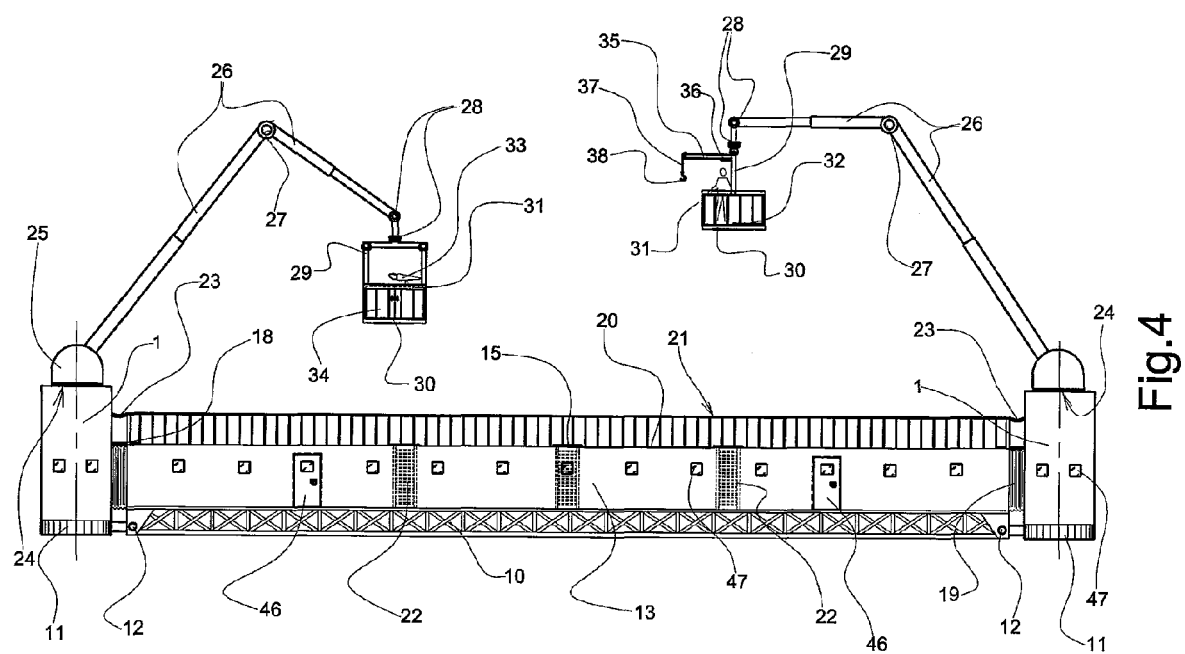
FIG. 4: One variant of hoisting system, front view.

On each vertical line of H-rail 5, hard-mounted separate lifting blocks 1 are inter-connected by the truss section 10, the movement of which imitates a rounded form surface of building face 6: this entire makes an integral hoisting system that is capable to travel along H-rails (FIG. 4). This system is provided with speed adjustment device to make lifting blocks 1 travel synchronously.

Lifting blocks 1 are flexibly connected with truss section 10 by means of horizontally-rotated platforms 11 and vertically-rotated joints 12 available in bodies of these lifting blocks (FIG. 4).

A frontal passage 13 of elongated shape with two lateral walls, ceiling and flooring is mounted on the truss section 10 (FIG. 4).

Lifting blocks 1 are integrated with a truss section 10 to form up a hoisting system, having doors 14 and man-holes 15 to match doors, man-holes and windows in the multi-story building and/or of other similar system (FIG. 5, FIG. 6, FIGS. 7 and 8).

Sliding doors 17 are provided in lateral bays 16 of lifting blocks 1 to facilitate evacuation of people and delivery of equipment along entire length of integral hoisting system. Besides, metallic hinged bridges 18 with resilient corrugated accordions 19 (FIG. 9) are available for this purpose in the zone of flexible joint of lifting blocks with frontal passages 13.

An exterior site 20 with protective guards or enclosure 21 (FIGS. 4, 5, 6, 7, 8, 9 and 10) is provided on the roof of lifting blocks with frontal passage 13 to facilitate any operations of personnel on outer surfaces of hoisting system.

Man-holes 15 with attached ladders 22 (FIGS. 4 and 7) are available on the roof of frontal passage 13 to facilitate evacuation of people and delivery of hardware from interior space of hoisting system to the exterior site 20 and vice versa.

Besides, additional hinged metallic bridges 18 and resilient protective sections 21 (FIGS. 4, 5, 7 and 9) are provided in the zone, where lifting blocks are flexibly jointed with frontal passage 13 to ensure safety precautions during evacuation of people along exterior part of hoisting system.

Figure 10:
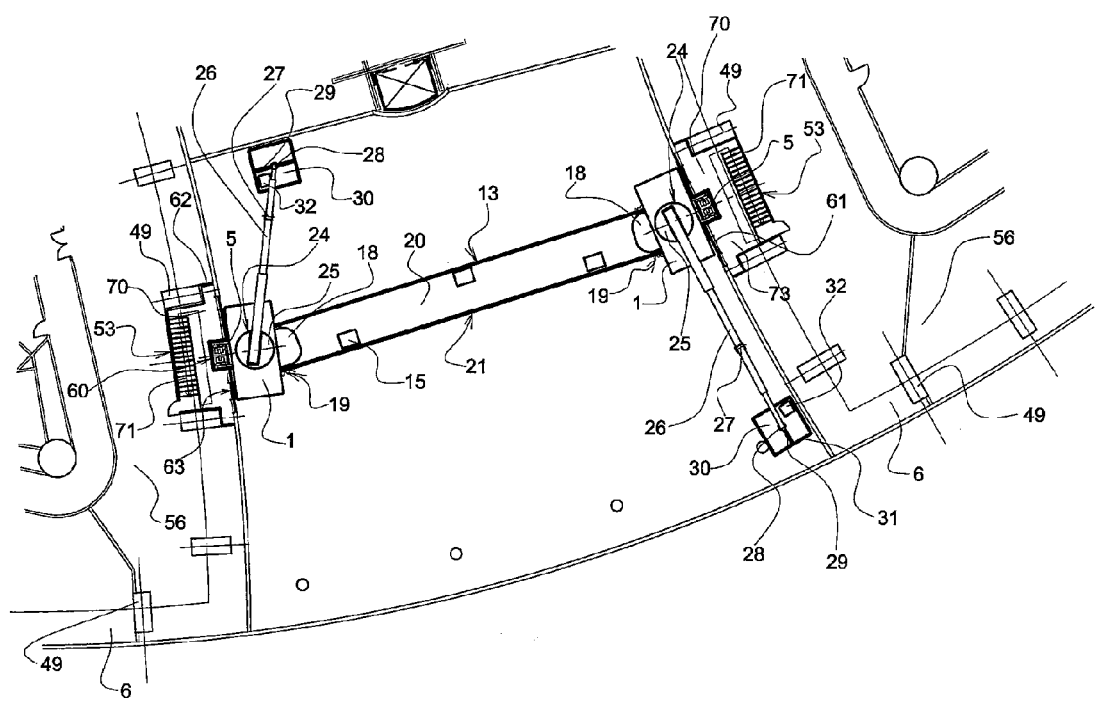
FIG. 10: One variant of hoisting system, installed on two adjacent structures, top view.

In addition, provision can be made for crane facilities on outer surfaces of lifting blocks. Crane facilities comprise horizontally and vertically-rotated mechanisms (24 and 25) to allow reciprocal movements of boom 26 from the side of its bearing edge. A telescopic boom enables to reach any place on the building and other hoisting system, as well as above itself. It consists of two parts linked by means of vertically-rotated mechanism 27 (FIGS. 4 and 10).

As a variant, the telescopic boom 26 can be equipped with jib-raising mechanism and hoisting hook.

Figure 11:
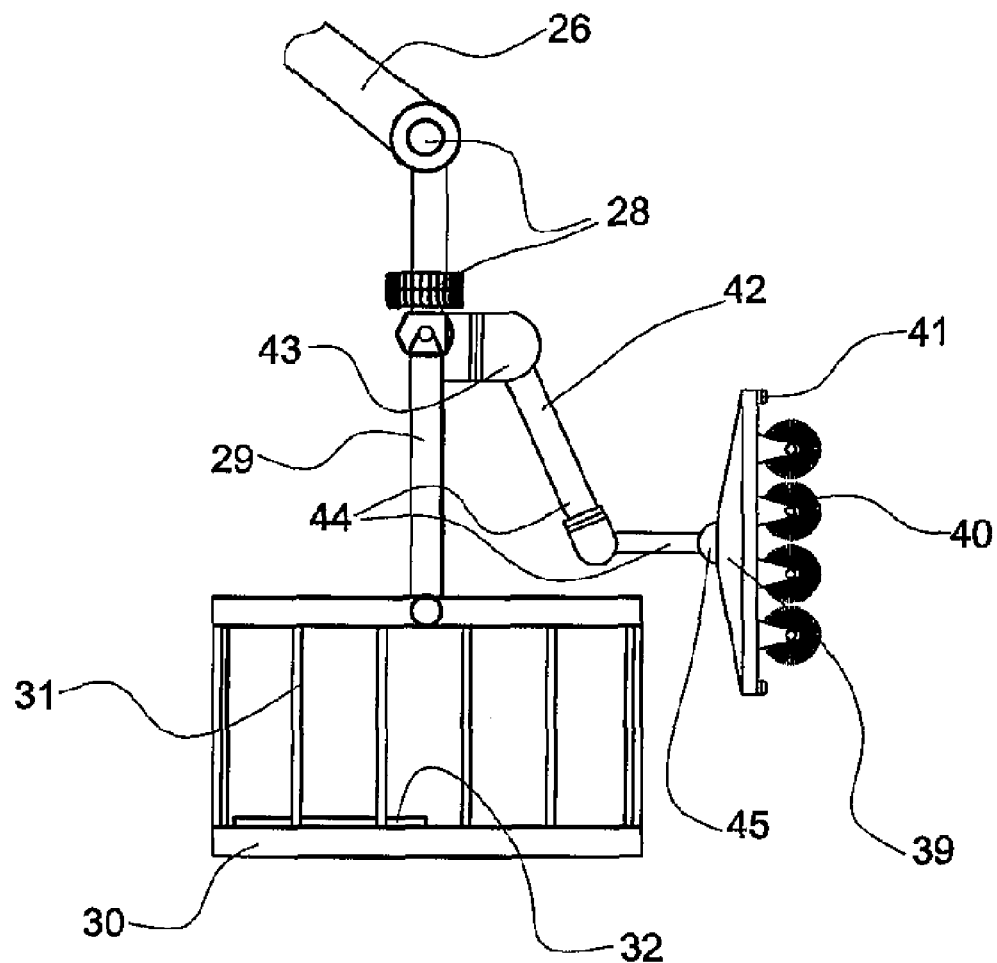
FIG. 11: Detachable washing unit, side view.

As a variant, there is a pulling yoke 29 of vertically-rotated mechanism 28 at the end of the boom 26. A platform 30, having protective guards (enclosure) 31 and a man-hole 32, is hinged with this pulling yoke. This platform should be made of fire-resistant material and be equipped with a fire-hose barrel 33 for fire extinguishing (FIG. 4). Protection enclosure is provided with sliding doors 34 (FIG. 4). A small detachable crane facility 35 consisting of jib-raising mechanism 36 and hoisting hook 37 (FIG. 4) can be arranged on this platform (on frontal passage 13). The platform 30 (or frontal passage 13) can be equipped with a washing unit 39 for mechanized cleaning of outer walls in high-rise buildings 6. The washing unit can incorporate brushes 40 and nozzles for spraying liquids and air drying (FIG. 11).

Figure 12:
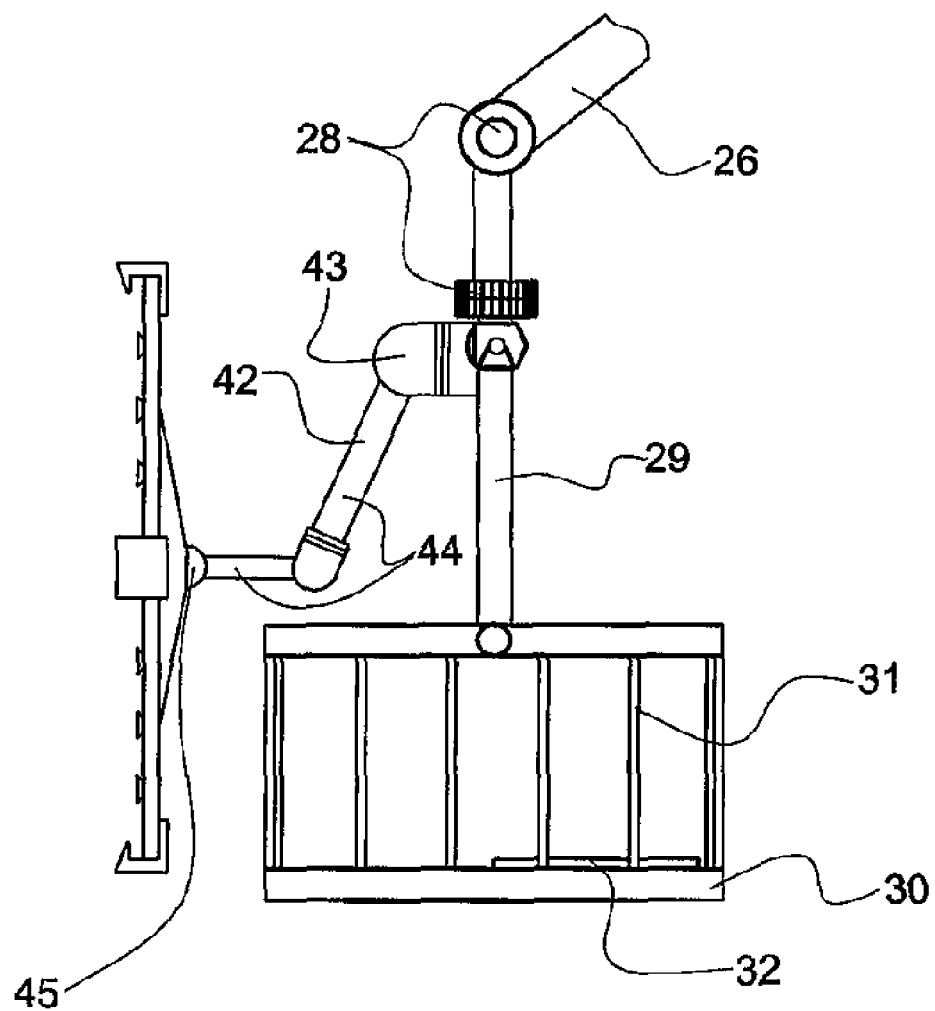
FIG. 12: Detachable manipulator, side view.

As a variant, platform 30 (or frontal passage 13) can be equipped with detachable manipulator 42. The latter is a mounted swivel support 43 with one end of arm 44 secured flexibly to it and with the other end of arm traveling relatively to the first end. The second end of arm accommodates a fastening connector 45. The second end of manipulator's arm is capable to move inside the building (FIG. 12).

Additional air-tight closing doors 46 are provided on frontal and/or lateral surfaces of lifting blocks 1 and frontal passage 13 to ensure access from one interior bay to another one or to exterior space (when the hoisting system is located on the first floor). These doors as well as other external surfaces of integral hoisting system have heat-resistant windows 47 (FIGS. 4, 5, 7 and 9).

The structure of integral hoisting system is provided with searchlights, video cameras, loud speakers, radio-telephones, navigation equipment, temperature sensors, distance detectors, air pollution sensors, wind detectors and load sensing elements. These structural elements have bays for keeping fire-fighting foam, other process liquids, terminals for connecting pipelines, electric cables and auxiliary accessories. Outside, functional bays of integral hoisting system have solid, air-tight and heat-resistant coating, interior lighting, air filtration and conditioning, oxygen masks, first-aid kits, fire-fighting and other technical facilities (according to customer's order).

All lifting blocks 1 of hoisting system are provided with safety brakes to ensure slow-down or halt of movement.

Figure 9:
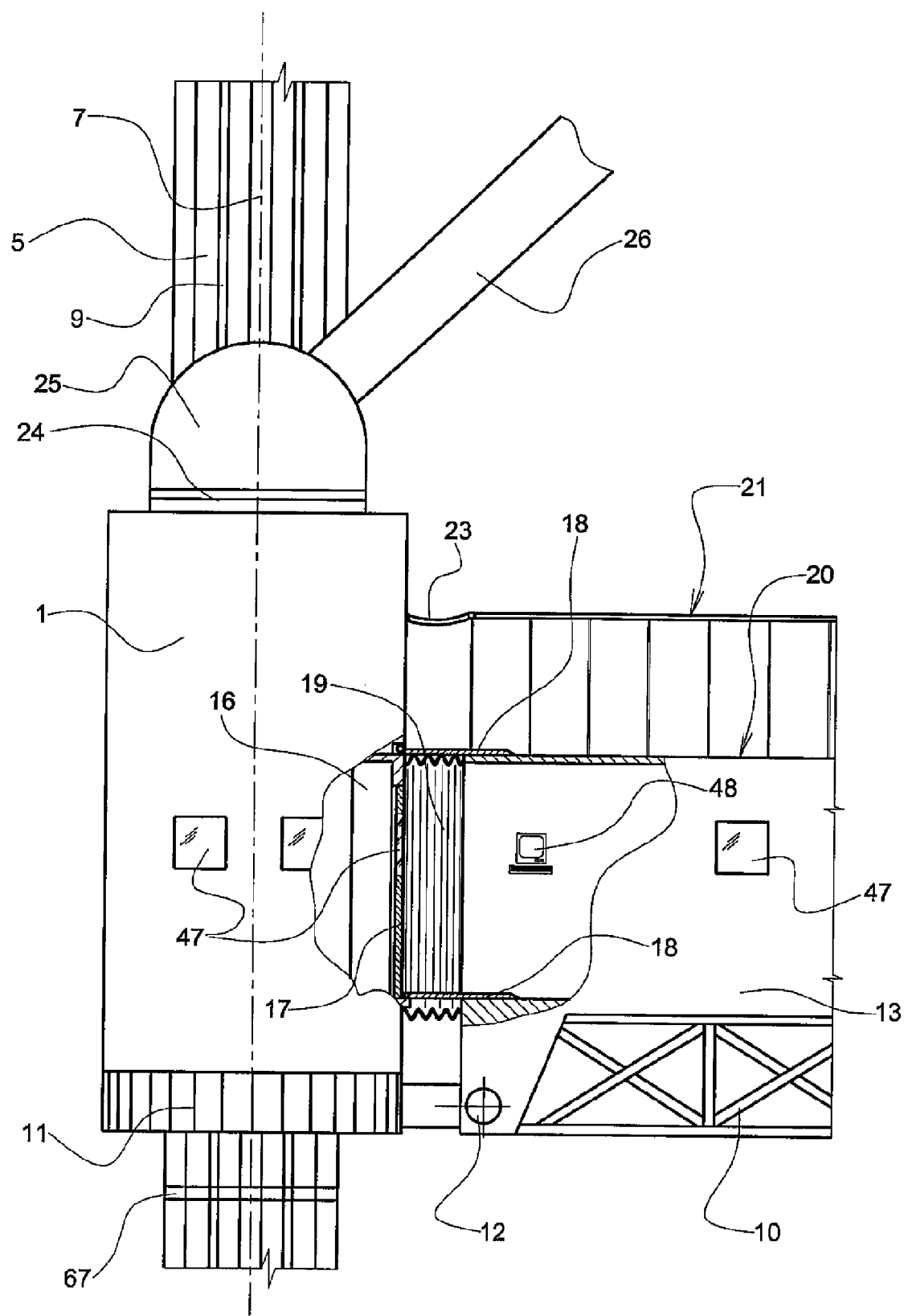
FIG. 9: One variant of lifting block, front view.

The hoisting system is operated by personnel from inside by control panel 48 that is located in one of its bays or from outside by means of remote control panel (FIG. 9).

The above-mentioned hoisting system can be used for maintaining (janitorial services) two high-rise buildings standing side by side. For this purpose, it is required to mount, at least, one H-rail 5 on two opposite outer surfaces of these buildings. On each H-rail, separate lifting blocks 1 are to be rigidly fixed, which are flexibly connected by means of truss section 10 with a frontal passage 13 on it (FIG. 10).

Let us consider the possibility of fitting the H-rails 5 of integral hoisting system on high-rise buildings, where structural elements are located inside the building perimeter at a considerable distance (1-4 meters and even more) from its exterior facial planes. In this case, some load-bearing elements 49 of high structure are covered with metallic bands 50 on each level (floor).

By its erection clips 51 and damper brace rods 52, each metallic band is jointed with a common stack of metallic frame 53, which is passing all levels (floors) of high-rise building through holes 54 and face-end apertures made in floors 56.

Figure 5:
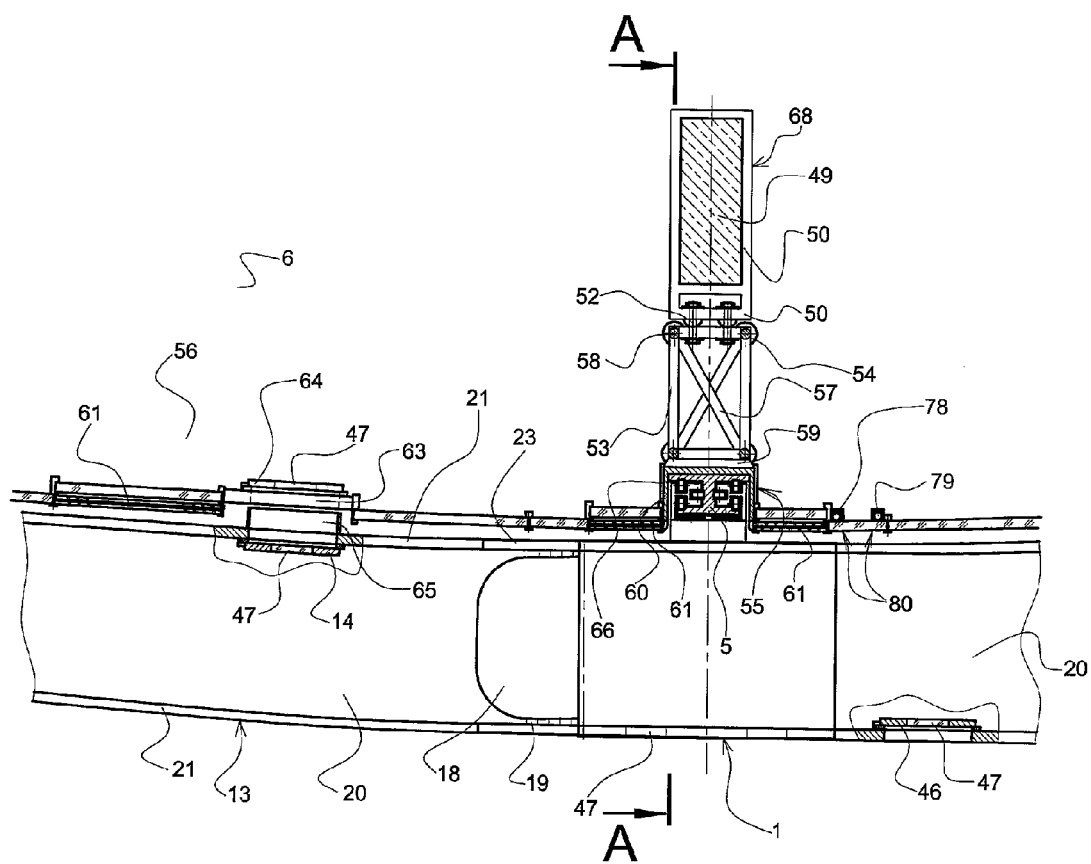
FIG. 5: One variant of lifting block secured on the building, top view.
Figure 6:
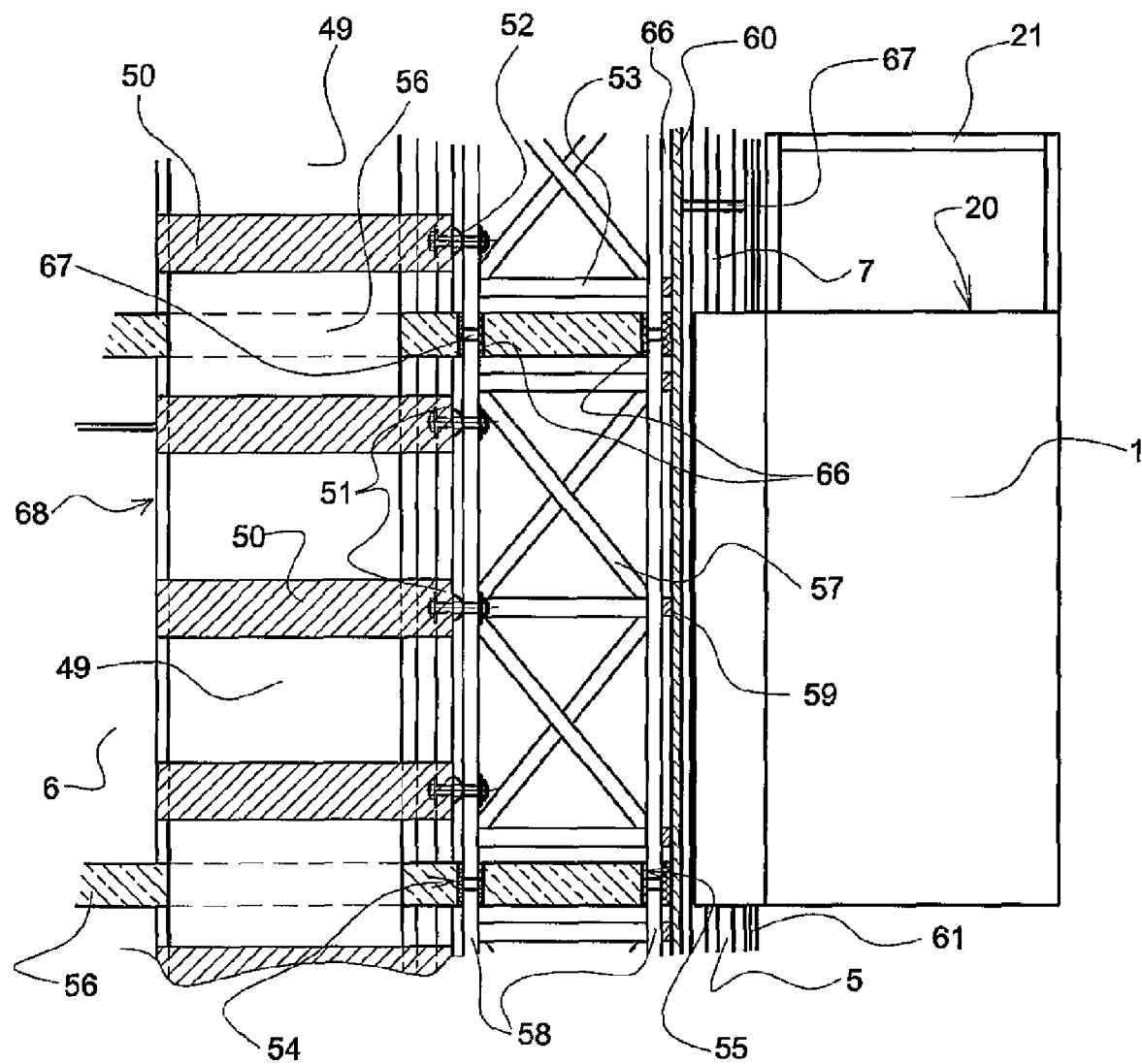
FIG. 6: One variant of lifting block, secured on the building, side view.

It is worthy of note that the area of horizontal cross section of common stack can be relatively small: not more than the cross section area of medium height-capacity tower crane, i.e. 2×2 m (6.5×6.5 feet), (FIGS. 5 and 6).

Figure 7:
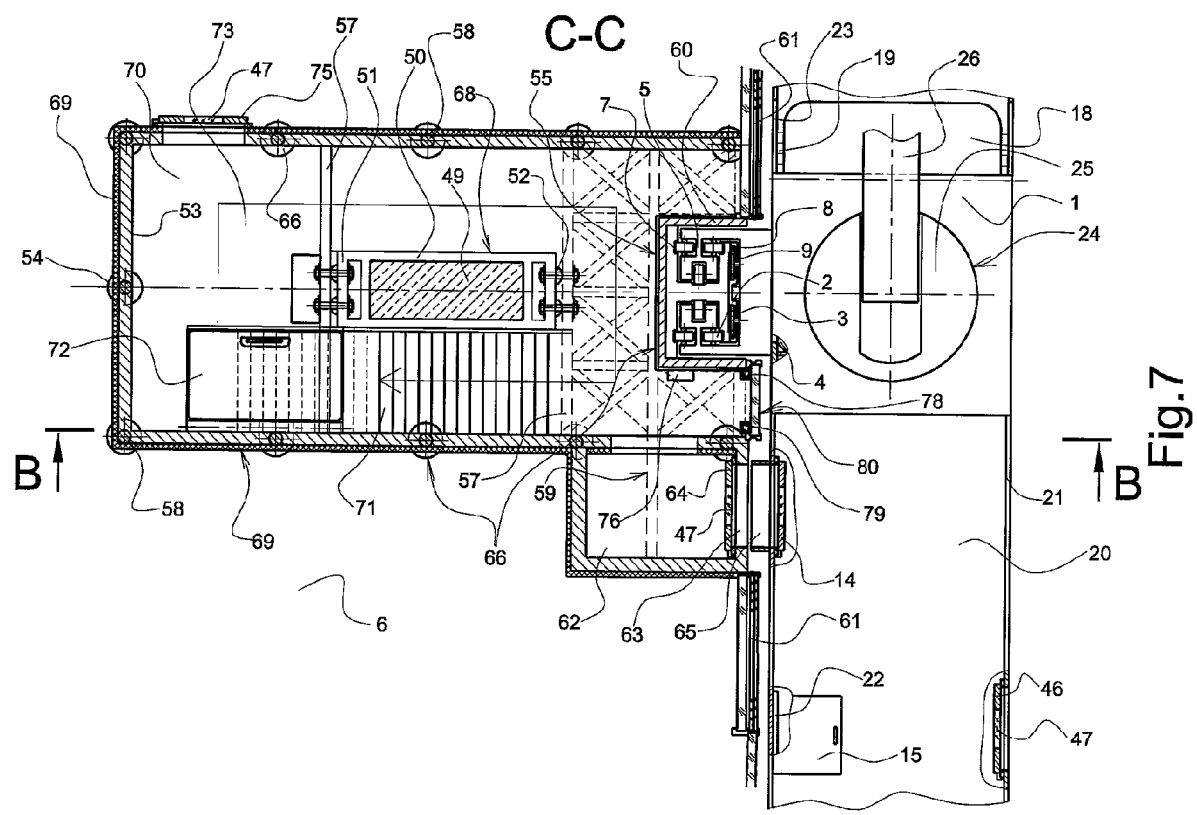
FIG. 7: One variant of lifting block, secured on the building, top view.
Figure 8:
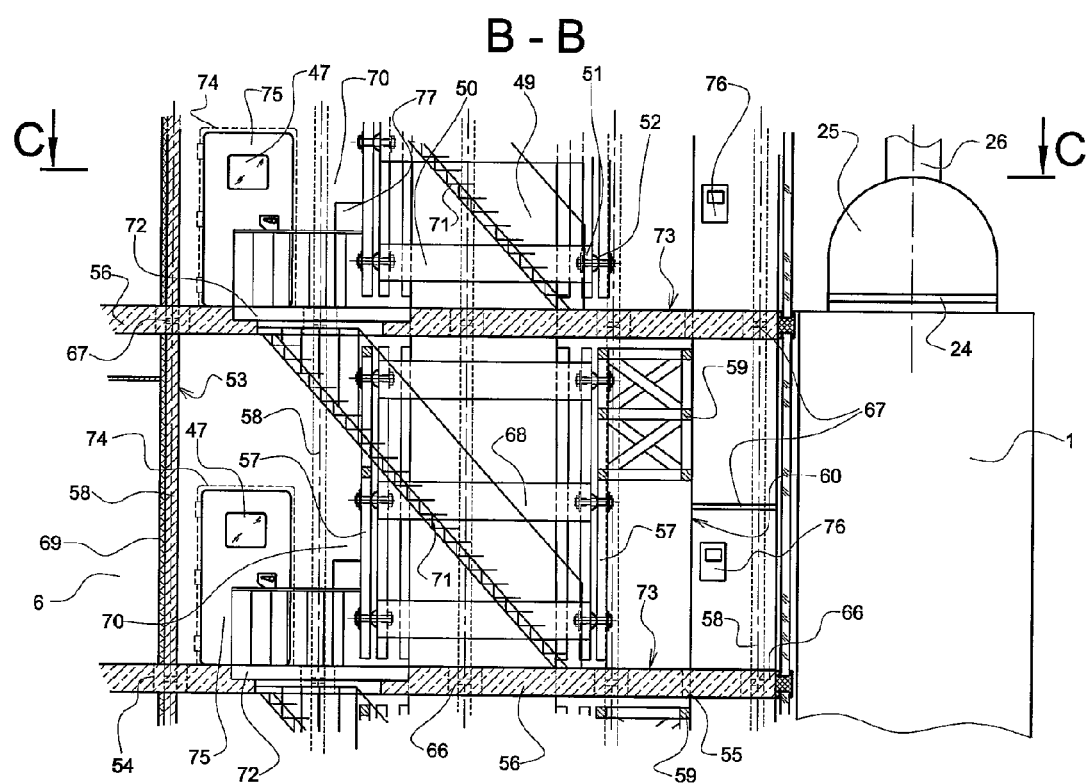
FIG. 8: One variant of lifting block, secured on the building, side view.

Nevertheless, in the variant of hoisting system where provision is made for safe sheltering of evacuated people during fire emergency in the zone between floors, a common stack of metallic frame 53 is allowed to have dimensions quite sufficient to accommodate a required number of rescued people (for instance, 3×6 m or 9.8×19.7 feet), FIGS. 7 and 8).

Both in the first and second variants, load-bearing elements 49 of high structure can be both inside and close to the area of horizontal section (iconography) of such stack.

Regardless of its horizontal section, a bottom part of common stack of metallic frame 53 is erected and secured on a concrete footing of high-rise building.

Structural load-bearing elements 49, located inside the horizontal section of common stack (or close to it), are connected by means of erection clips 51 with structural components 57 of this truss (FIGS. 5, 6. 7 and 8).

If cone-shaped bearing elements 49 are located closely to the common stack of metallic frame 53, the bearing elements 58 of metallic frame should remain in vertical position. In this case, a step-by-step variation of distance between planes to be connected is compensated at the expense of similar step-by-step changing of width of each individual erection clip 51 on each level (floor) in the high-rise structure (FIGS. 4, 6 and 10).

If cone-shaped bearing elements 49 are located inside the common stack of metallic frame 53, the bearing elements 58 of metallic frame should remain in vertical position. In this case, a step-by-step variation of distance between planes to be connected is compensated at the expense of similar step-by-step changing of location of each individual structural element (57 location on each level (floor) in the high-rise structure 6 (FIGS. 7 and 8).

Depending on its width, each outer face surface of building 6 is provided with one or several stack of metallic frame 53. Frontal planes of each erected stack are formed up by an upright row of horizontal beams 59, to which H-rail 5 is secured along entire height of truss (FIGS. 5, 6, 7 and 8).

H-rail is secured on frontal plane of common stack of metallic frame 53 within the longitudinal metallic shell 60 and does not go beyond the exterior outline of the building 6. This shell is integral with outer facial surface of building 6 and its aperture with H-rail 5 is covered by an upright row of sliding panels 61, which are decorated in the same manner as facial surface of high-rise building 6 (for instance, if outer walls are lined with reinforced mirror-type triplex glass, then the panels are also made of similar glass), please refer to FIGS. 5, 6 and 7.

If a common stack of metallic frame 53 is arranged in the safe sheltering zone for rescued people (in the event of fire), this stack can have an increased horizontal section on each level (floor) at the expense of additional extension structures 62 (FIGS. 7 and 10).

Evacuation exits 63, provided with air-tight closing doors 64 having heat-resistant windows 47 are located at the front plane of common stack of metallic frame 53 (or its extension 62), as well as on each floor and in other places of building face, where such a stack is not available. These evacuation exits 63 are interlinked with portals 65 of lifting blocks 1 or frontal passages 13 in the integral hoisting system and/or other hoisting devices made of hard, elastic material (FIG. 5, 7).

In this case, the evacuation exit 63 is made integral with outer facial plane of this high structure. The aperture of evacuation exit with its door 64 is covered by a vertical row of sliding panels 62, which are decorated in the same manner as the outer face of the building 6 (FIGS. 5 and 7).

All holes 54 and end clearances 55, made in floors 56 of the building 6 for a common stack of metallic frame 53 and H-rail 5, are filled with heat-resistant, resilient air-tight sealant 66 (FIGS. 5, 6, 7 and 8) for the sake of safety precautions and fire safety.

Expansion joints 67 (FIGS. 6 and 8) are made at regular vertical intervals in all bearing elements 58 of common stack of metallic frame 53 (along their entire area of horizontal section) to protect from any thermal impact (for instance, in case of fire).

For this very purpose, similar expansion joints 67 (FIGS. 6 and 8) are made at regular vertical intervals in H-rail 5 and longitudinal metallic shell 60, throughout their horizontal section.

For this very purpose, all structural elements of common stack of metallic frame 53, as well as metallic bands 50, erection clips 51, damper brace rods 52, horizontal beams 59 and longitudinal metallic shell 60 are covered with heat-resistant coating 68 (FIGS. 5, 6, 7 and 8).

As it was earlier mentioned, for the purpose of arranging the shelter for evacuated people in a floor-to-floor zone of common stack of metallic frame, the stack is made in such dimensions that its horizontal section area should be sufficient for a required number of rescued people. Therefore, in order to protect such zones from any thermal impact (in event of fire), a common stack of metallic frame 53, along its entire exterior perimeter, is provided with walls made of solid, air-tight heat-resistant material 69 (FIGS. 7 and 8).

The structure, formed up by these walls is also naturally divided by horizontal floors 56 into isolated rooms which, alternatively, can be used as separate safety sections 70. To let these safety sections communicate with each other, they are provided with ladders 71 and air-tight, heat-resistant hatches 72, as well as with evacuation inter-floor sites 73 (FIG. 7, 8, 10).

To let each section 70 communicate with parallel floor of structure 6, door apertures 74 with air-tight closing doors 75 having heat-resistant windows 47 are made in walls of common stack of metallic frame 53 of each separate section 70 (FIGS. 7 and 8).

Each section 70 has a telephone panel 76 in order to let injured persons to call for evacuation service or talk with rescue personnel. To satisfy relevant needs of injured people (for instance, in the event of fire), each separate section 70 has a bay for storing medicine, gas masks, water and foodstuff (FIGS. 7 and 80).

As a variant, a self-contained pipeline 78 and electric cable 79 are provided in the area, where H-rail is mounted. Self-contained pipeline 78 and electric cable 79 are connected to terminals 80, located on the face plane of high-rise structure at such a distance that an integral hoisting system, being at any height, can reach at least one of such terminals (FIGS. 5 and 7).

Owning to the pipeline 78 and electric cable 79, each separate section has internal lighting, air filtration and conditioning and public convenience operating autonomously from similar networks of the building 6.

To ensure unfavorable weather protection, there is a heater connected with self-contained power source 79, in metallic body of H-rail 5.

There are practically no identical cone-shaped high-rise buildings in the world, since each of such structures has a unique engineering design and architecture. That is why, a Multifunctional Business and Entertainment Complex "Federation" (height: 340 m/1116 feet, height with spire: 420 m/1378 feet) was chosen by the authors of the present invention for description purposes. This complex is a multi-level podium with two towers different in height (85 and 57 floors) integrated with a common stylobation (FIG. 3).

It is worthy of note that in spite of obvious beauty and uniqueness of "Federation" complex project, this high-rise structure is notably inconvenient for using the notorious rise lift tables (cabins, cradles and hanging stages) for janitorial services, especially at the height exceeding 50-70 meters (165-230 feet). And it is quite obvious from exterior structure of this twin building. Firstly, it has no roof. Instead of it, towers have a round projection of facial glass solarium at the last level of building. Secondly, two out of three facial planes of each tower have a rounded cone-shaped structure. The only way of maintaining this kind of building is to use industrial climbers, who can do it while being suspended on soft ropes from upper windows. But this opportunity looks like very illusive, because stained glass windows in this Complex as well as in any other skyscraper do not have movable double-glass panes, i.e. they can not be opened.

Besides, the width of any stained double glass pane is 3 meters (9.84 feet) at the height of 3.8 meters (12.47 feet). Because of such big sizes, any replacement of double-glass panes seems to be feasible only from outside of the building. Provided that the weight of double-glass pane should not exceed 300 kg/(661.39 lb), employment of industrial climbers for these operations becomes more doubtful.

Let us consider all possibilities for evacuation of people under emergency situation (fire, for instance). In this respect, the "Federation" complex has many advantages compared with other skyscrapers. One of such advantages lies in the availability of five gallery-bridges, linking both towers through a separate third tower, i.e. elevator shaft. No doubt that these gallery-bridges and tower-elevator shaft will be natural and the most efficient ways for mass evacuation in case of fire emergency.

However, dangerous situations may occur in the event of fire, because there are intervals from thirteen to twenty three floors between these gallery-bridges, whereas flights of stairs are available only in one place of both towers. Let us assume that in case of fire on one $60^{th}$ Floor of "A" Tower, automatic system happened to halt elevators, but fire and smoke blocked the sole shaft with flights of stairs, thus making evacuation of people from above floors to the gallery-bridge 81 impossible. In this case, several hundreds of people might fail to leave $60^{th}$ and $70^{th}$ Floors and will be trapped there.

There is no use in arguing that in case of large-scale fire there might be several traps of this kind all over the building on the background of limited time for rescue (sometimes by minutes only, as one can reckon).

Taking the above-mentioned into account, the authors propose their concept of hoisting system for maintaining the "Federation" Tower Complex. This conceptual proposal consists of using eight individual hoisting systems on all six vertical planes of "A" and "B" Towers. This will facilitate to maintain or to provide janitorial services not only on 100% of two Tower's surface, but on the third Tower (elevator shaft) as well with its five gallery-bridges.

In this case, only face planes of stylobath can not be covered by janitorial services. Nevertheless, these planes still can be maintained by conventional lifting systems (for example, crane trucks with telescopic low-height booms, since stylobath is 23 m (75.4 feet) high maximum.

Eight hoisting systems, herein proposed, are grouped into four pairs. Systems in each pair are precisely similar to each other by design and overall dimensions.

Twelve vertical lines of H-rails 5 (two rails per one plane) are arranged on these planes to secure and to let travel eight hoisters on six outer surfaces of "A" and "B" Towers (FIG. 3).

The first pair of hoisters, No. 1 and No. 2, is the biggest one by overall dimensions out from eight proposed systems. They are mounted on cone-shaped vertical planes of "A" Tower (one system per each plane).

Two lines of H-rails, reaching the 81 st Floor of the given Tower, are secured for each system. Each of these systems is an integral hoister, comprising two lifting blocks 1, linked to each other via frontal passage 13 by hinges, moving along a rounded profile of high-rise building. The passage length is 31.6 m (103.7 feet). At the width of 2.5 m (8.2 feet), the passage area amounts to 79 sq.m (850.3 sq.feet). Its capacity is 316 persons, but with regard of outer platform it can accommodate 632 persons (FIG. 3).

Telescopic booms 26 are installed in rotating supports on upper planes of lifting blocks 1. An erection clip 29 is fixed through vertical-horizontal swivel gear at the end of each boom. A platform 30 with protective enclosure is secured to the erection clip by hinges. Since the length of individual extended boom is 17.6 m (57.74 feet), this hoisting system is capable to maintain Tower A at full width along all height as well as other rounded part of its tower roof.

The second pair, No. 3 and No. 4, as well as the previous pair of hoisters, consists of two lifting blocks 1, hinged with frontal passage 13, which, by its internal plane, imitates a rounded profile of building face. This pair of hoisters has also telescopic booms 26 with platforms 30 on upper planes of their lifting blocks 1. The only difference is in the length of passage that makes 29 meters (95.14 feet).

These two hoisters are installed on vertical cone-shaped planes of Tower "B" (one hoister per each plane). For each hoister, two lines of H-rails 5 are mounted, reaching the $54^{th}$ Floor of the given Tower (FIG. 3).

If the passage is 2.5 m (8.2 feet) wide, it will make the area 72.5 sq.m (780.38 sq.feet) to accommodate 288 persons (the capacity will be 576 persons with regard of outer platform).

Since the length of telescopic boom 26 in extended position is 17.6 m (57.74 feet), each hoisting system is capable to maintain each cone-shaped plane of Tower "B" along its width and height, as well as a rounded part of Tower roof.

The third pair, No. 5 and No. 6, comprises the same technical elements of previous pairs of hoisters, but is manufactured as hoisting systems to maintain two buildings standing side by side. For this purpose, two pairs of H-rails 5 are mounted on opposite planes of Tower "A" and "B". One pair is from one side, relative to gallery-bridges, and the other pair is from the other side. In each pair, both rails are mounted opposite each other: one on the "A" Tower plane, the other is on the "B" Tower plane. Rails on both Towers are reaching the top ("B" Tower: $57^{th}$ Floor; "A" Tower: $85^{th}$ Floor) (FIG. 3).

On these rails, there are two lifting blocks 1, which are linked by hinges to form up a frontal passage 13, in the same manner as gallery-bridges connect both Towers of "Federation" Complex. The passage is 14.5 m (47.57 feet) long. If its width is 2.5 m (8.2 feet), it makes the area of 36 sq.m (387.5 sq.feet) that is to accommodate 144 persons (capacity will be 288 persons with regard of outer platform), FIG. 3 and FIG. 10.

The length of each telescopic boom 26 of these two integral hoisting systems (in extended position) also is 17.6 m (57.74 feet). Therefore, each system is quite capable to maintain entire width of its half-face of the building, each of these planes (along entire height of Tower "B", up to $65^{th}$ Floor of Tower "A" as well as some part of rounded roof). Meanwhile, each system is capable to reach the third tower (elevator-shaft) as well as its four gallery-bridges, located up to $58^{th}$ Floor.

The last pair of hoisters, No. 7 and No. 8, is to render service to the "A" Tower area $65^{th}$ Floor-$85^{th}$ Floor), which is unreachable by systems No. 5 and No. 6. Each of these two hoisters is represented by a separate lifting block 1 with a telescopic boom 26 and platform 30. The given boom enables to maintain entire width of "A" Tower half-face, and can reach the elevator-shaft and gallery-bridge at the 81 st Floor. Maximum capacity of platform and passenger bay in each hoister is 32 persons.

All eight hoisting systems are constantly located on H-rails, i.e. on outer surface of Tower "A" and Tower "B" and are the integral movable part of this Multifunctional Business & Entertainment Complex.

These hoisters can be used daily as outside high-capacity elevators for passengers and cargoes. Should they be transparent or have large windows, these elevators can also be used for entertainment purposes to let tourists and visitors enjoy a nice panoramic view of "Moscow-city" around "Federation" Complex. From hoisting systems there will be splendid panoramic views of café or restaurants in sun lounge. According to the authors' opinion, it is very promising to use the hoisters No. 1 and No. 2 for setting up and maintaining large-size illuminated advertisement boards along entire width and height of their face planes.

Besides, these hoisting systems can be used from day-to-day for technical maintenance and janitorial services: cleaning and replacement of double-glass panes, repair, assembly and construction works, as well as for fire-fighting and mass evacuation of people during emergency situations.

When hoisting systems are not in use, they are descended to the building stylobath roof and covered with canvas for the sake of protection from bad weather conditions as well as for other preventive maintenance.

Further on, a hoisting system is considered as a variant of multi-level garage built in the multi-story building. This system incorporates the following components and is clarified on the basis of below-mentioned example:

As it was afore-stated, lifting blocks 1 have identical running gear with carrying wheels 2 and tooth gear drive wheels 3. Tooth gear drive wheels are actuated by engines 4 located inside the bodies of lifting blocks 1. Owning to the running gear, the lifting block 1 is enabled to ascend along H-rails 5, mounted on outer planes of high-rise building 6. This capability is possible due to the engagement of support wheels 2 and tooth-gear drive wheels 3 with guide slots 7 and guide racks 8 in the H-rail 5. To reinforce this engagement, support wheels 2 are located on different planes, while tooth-gear drive wheels 3 are located on guide slots 9 of H-rail 5 (FIGS. 1 and 2).

Figure 13:
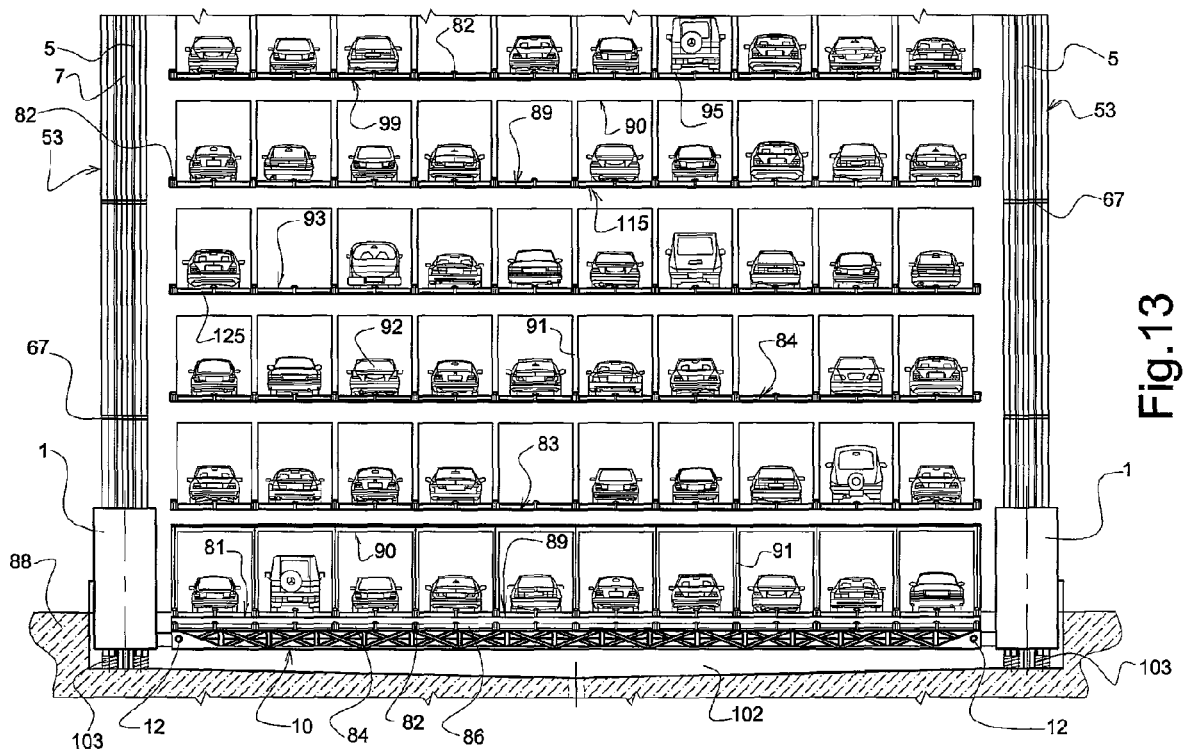
FIG. 13: One variant of hoisting system installed on multi-story building (multi-level car-parking garage)
Figure 14:
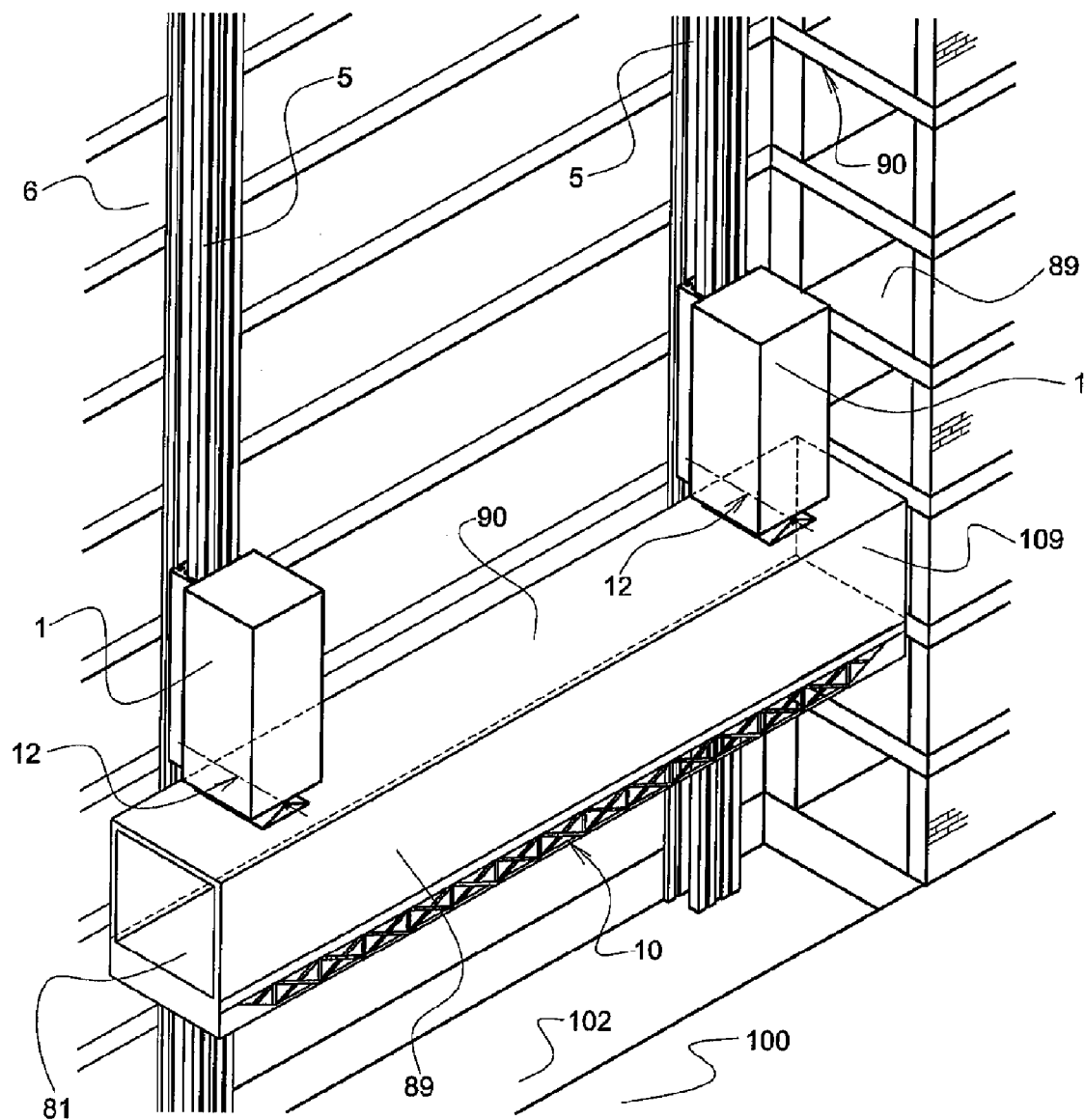
FIG. 14: One variant of hoisting system, isometric view.

A multi-story building 6 has several lines of H-rail on its outer surface lengthwise. These rails 5 are fixed permanently at some distance far from each other (FIG. 13).

On each vertical line of H-rail 5, individual lifting blocks 1 are permanently mounted with a truss section 10, connecting both of them by flexible joints to form-up an integral hoisting system traveling along H-rails 5 lengthwise. The truss section, by its interior plane, is capable to imitate the outer walls of high-rise building (FIG. 13).

The present system is provided with speed adjustment device to make lifting block move synchronously.

All lifting blocks are supplied with safety brakes to enable them slowing-down and halting during emergency.

Lifting blocks 1 are hinged with the truss section 10, by means of swivel connectors 12 (FIG. 13).

According to execution variant, illustrated in FIG. 13, one edge of each swivel connector 12 is secured on the lower plane of lifting block 1, while the other edge is fixed on the end face of upper plane of truss section 10.

Figure 16:
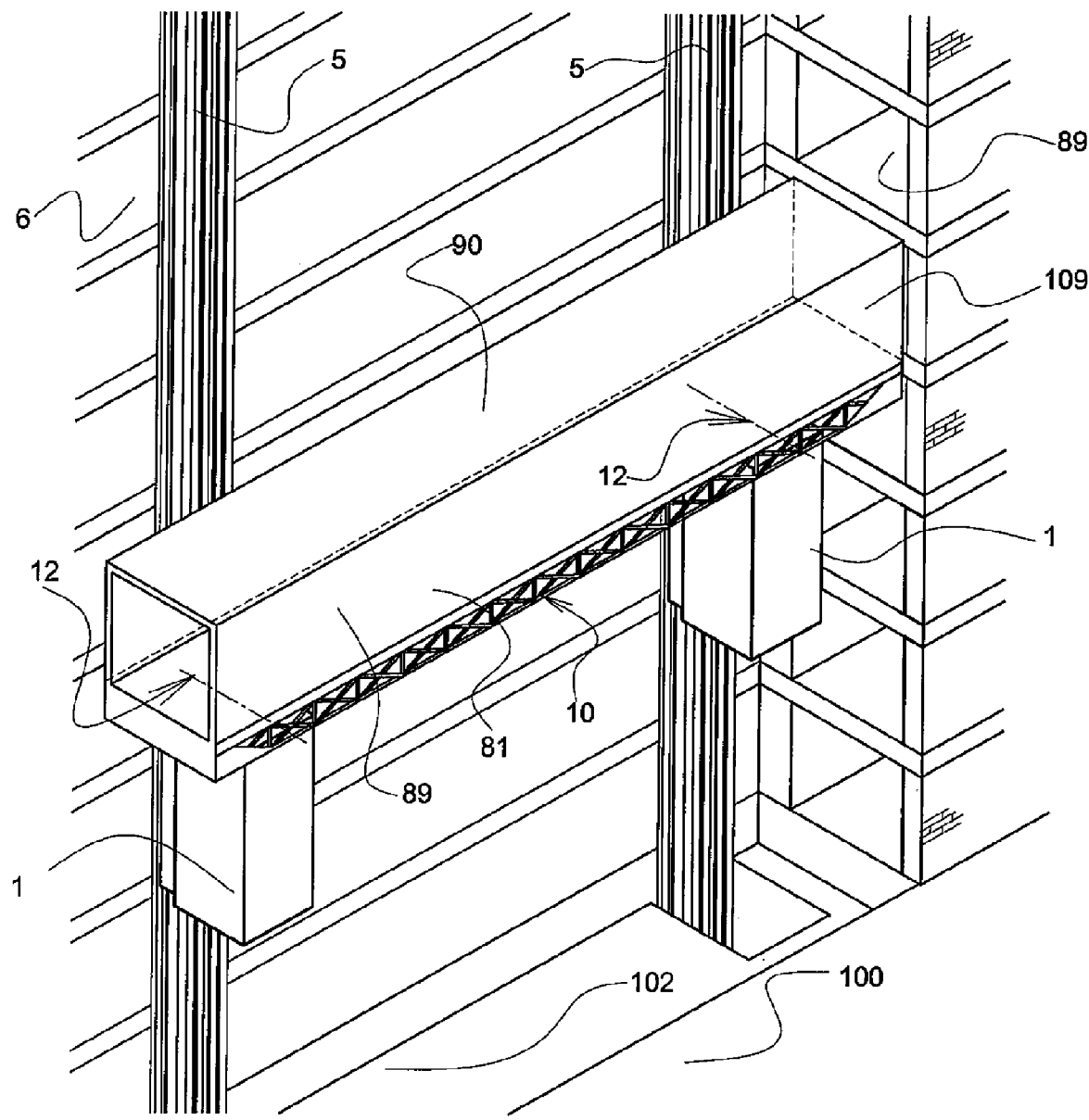
FIG. 16: One variant of hoisting system, isometric view.

According to the execution variant, illustrated in FIG. 16, one edge of each swivel connector 12 is secured on the upper plane of lifting block 1, while the other one is fixed on one of end faces of lower plane in the truss section 10.

Figure 17:
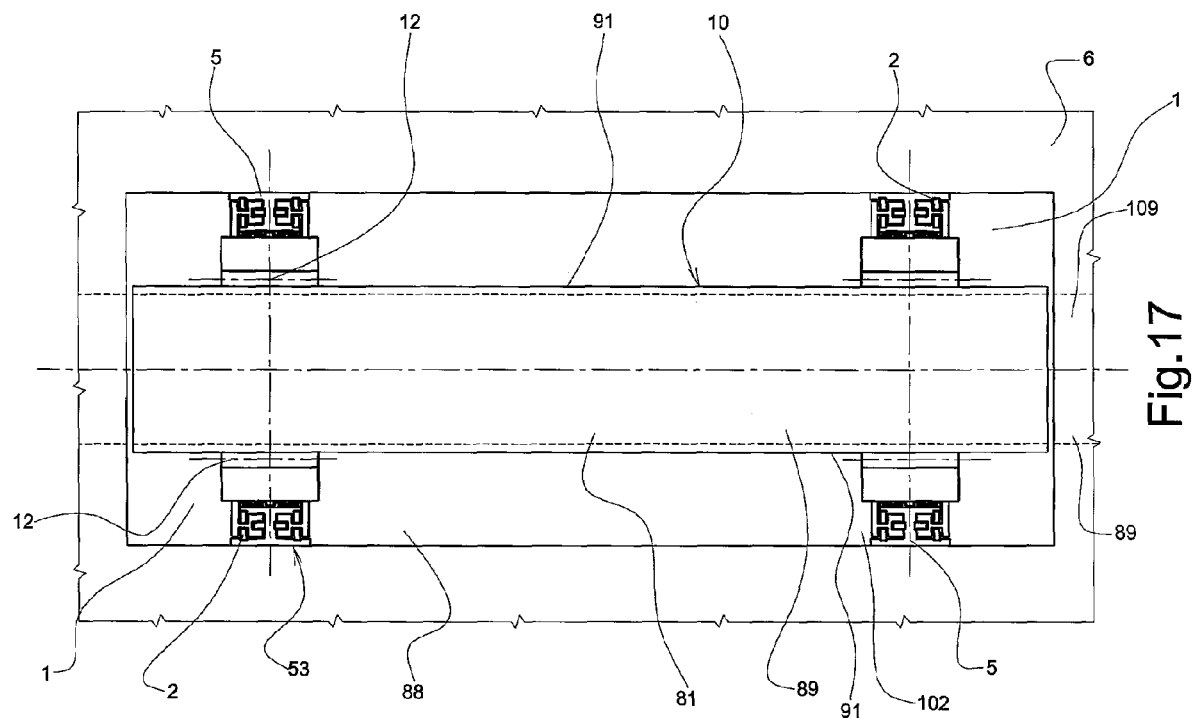
FIG. 17: One variant of hoisting system, top view

According to execution variant, illustrated in FIG. 17, one of edges of individual swivel connector 12 is secured on frontal plane of lifting block 1, while the second edge is fixed on one of lateral planes of truss section 10. In this case, each lateral plane of truss section 10 is connected with two lifting blocks 1.

The truss section 10 incorporates, at least, one loading platform 81 for personnel and/or hardware. It is divided, by guide rollers 82, into rectangular compartments 83, each of which has separate trays 84, mounted on drive wheels 85 available on the loading platform 81 of truss section 10 (FIGS. 13, 18, 19 and 20).

In the plane of truss section 10, there are through-apertures 86 for accommodation of empty trays 84. Rectangular compartments 83, formed up by through-apertures 86, have similar length and width with rectangular compartments of loading platform and they are located in such a way that their symmetry axes are aligned. In this case, both rectangular compartments 83 of through-apertures 86 and rectangular compartments of loading platform 81 are provided with guide rollers 82 and drive wheels 85. They are interrelated with longitudinal sides of truss section 10, thus enabling one to re-load empty trays 84 from through-aperture 86 outside both longitudinal sides of truss section 10 (FIGS. 13, 18, 19 and 20).

Figure 19:
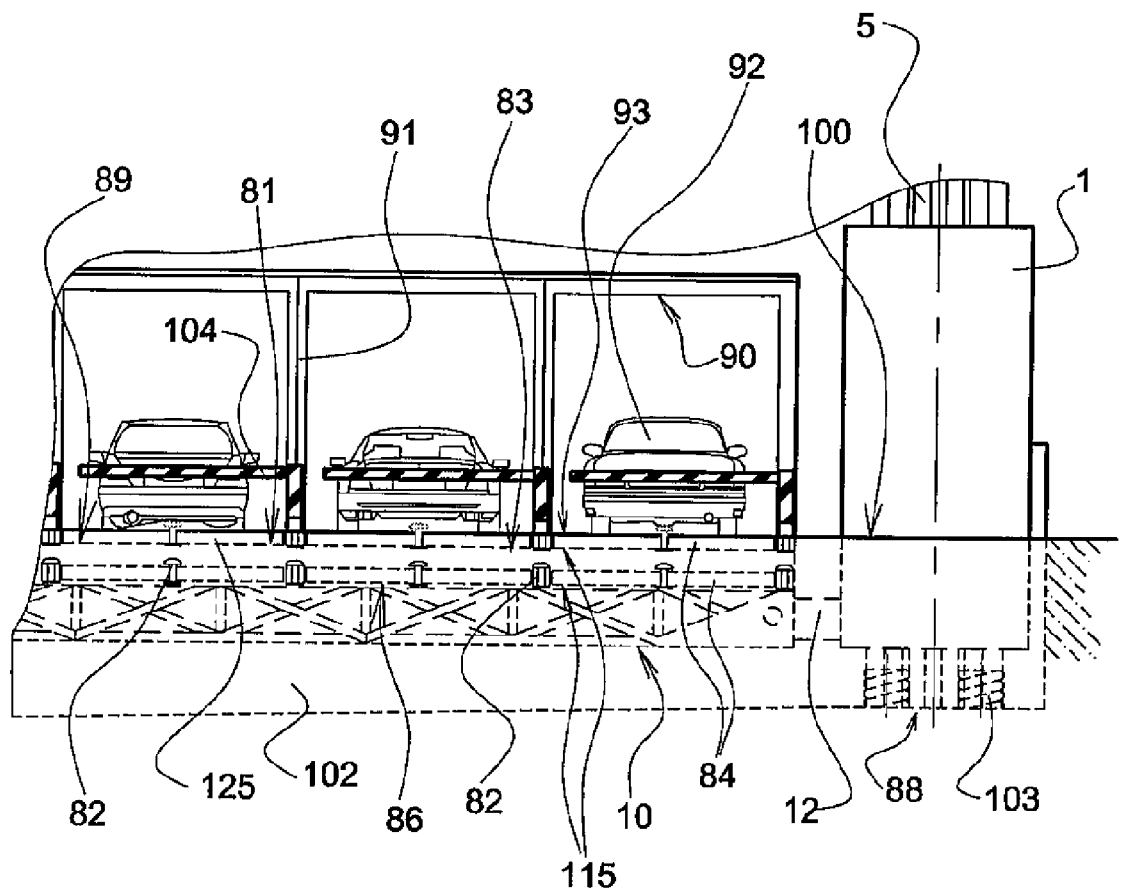
FIG. 19: A fragment of one variant of hoisting system installed on the level of non-mechanized transit platform, front view.
Figure 20:
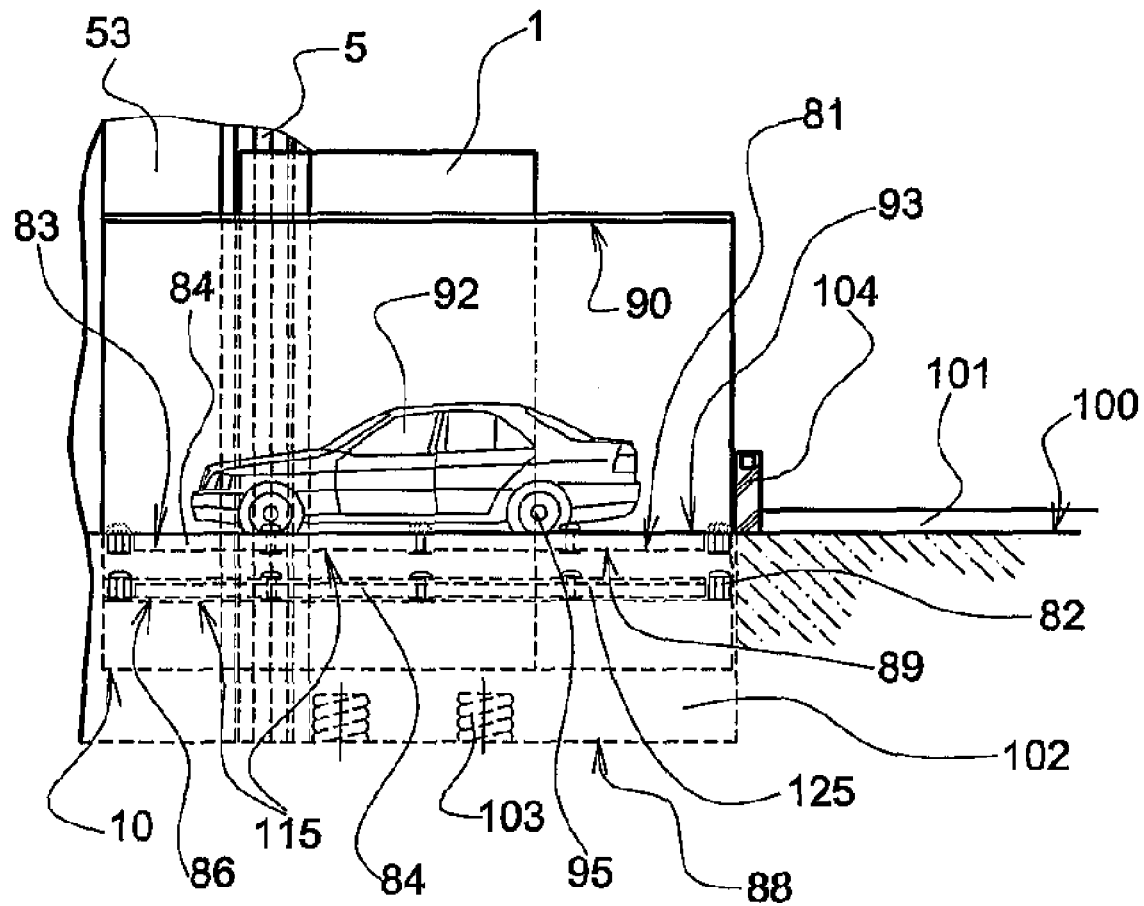
FIG. 20: A fragment of one variant of hoisting system installed on the level of non-mechanized transit platform, side view.
Figure 21:
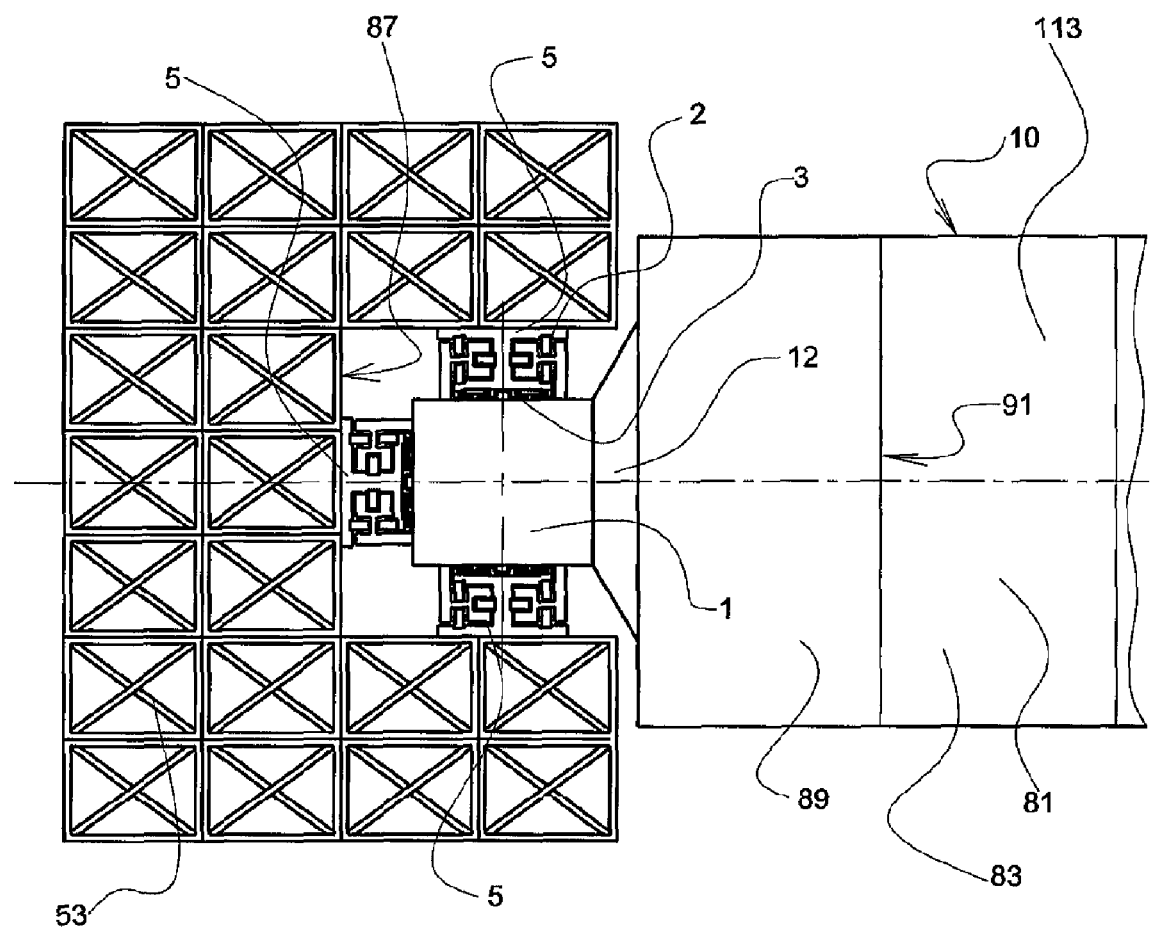
FIG. 21: One variant of lifting block mounted on three H-rails in vertical aperture, top view.

According to standard execution, upright H-rails 5 are secured on outer planes of metallic frame stack, which are constituents of multi-story building 6 (FIG. 1). To enhance stability and load carrying capacity of lifting blocks 1, a vertical aperture 87 is made in each stack of metallic frame 53. Three H-rails 5, which are engaged with fastening unit and relocating mechanism, located on three vertical planes of lifting block 1 (FIG. 21), are mounted on three planes of vertical aperture 87. Regardless of its horizontal cross section, the lower end of each metallic frame stack is placed and secured on concrete footing of 88 of structure 6 (FIGS. 13, 19 and 20).

Each rectangular compartment 83 in the loading platform 81 of truss section 10 has common planes at the level of its truss section: floor 89 with other rectangular compartments 83, ceiling 90 and upright structural elements 91. With the purpose of reinforcing the truss section construction 10, upright structural elements 91 are rigidly joined with the floor and ceiling (89 and 90) to form-up an integral structure of truss section 10 in the hoisting system. In this case, guide rollers 82 are provided in the lower part of upright structural elements 91 of loading platform 81 in the truss section 10 (FIGS. 13, 19 and 20).

Expansion joints 67 are made both in the H-rail 5 and in the stack of metallic frame 53, along entire area of their horizontal section and at regular vertical intervals (FIG. 13).

To protect from bad weather conditions, the metallic body of H-rail 5 is provided with a heater connected to the self-contained power supply source.

The hoisting system is operated by personnel both from inside and outside by means of remote control panels.

To provide a possibility of using trays 84 for car transportation, trays 84 are made in the form of rectangular flat metallic platforms which have guide slots 94 for car wheels 95 on their upper surface 93. Guide slots 94 for car wheels are made with horizontal and inclined surfaces 98, 97, and slant flanges 96. Entire surface of tray 84 is ridged 99, FIG. 18.

To ensure drive-in and drive-out operations from the tray 84 of loading platform 10, the relevant hoisting system is engaged, at least, with one transit loading platform 100, which is accessible from a road network in the town (FIGS. 19, 20, 22 and 23).

For this purpose, the transit platform 100 is divided, by metallic curbs 101, into rectangular compartments 83. Meanwhile, overall dimensions of rectangular compartments 83 in the transit platform 100 and loading platform 81 are similar. Location of rectangular compartment groups is positioned in such a way that one their sides in the exterior perimeter are closely border with each other, whereas axes of symmetry in separate compartments are aligned in each group (FIGS. 19, 20, 22, 23, 24 and 25).

Figure 18:
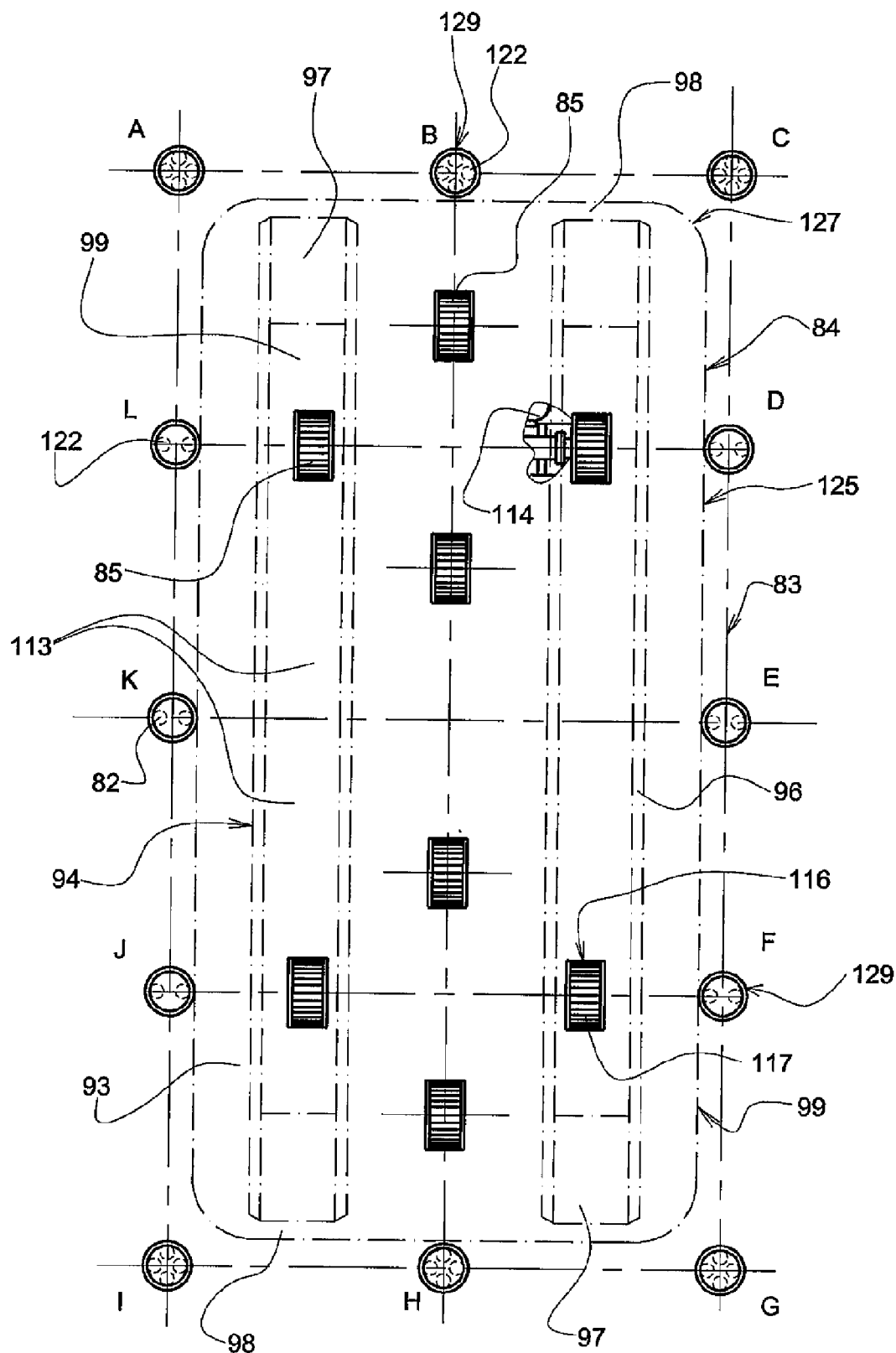
FIG. 18: One variant of rectangular compartment, top view.
Figure 24:
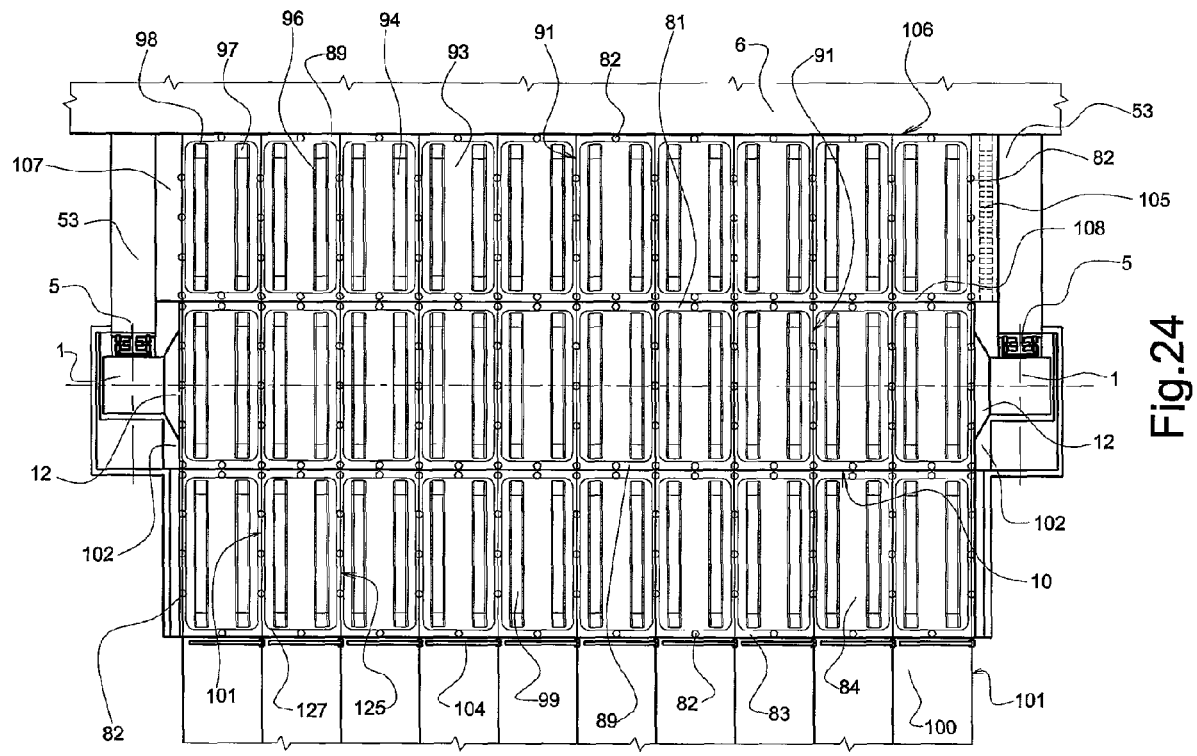
FIG. 24: One variant of hoisting system mounted near dead wall (brandmauer). Example of multi-level car-parking garage with mechanized transit platform, top view.
Figure 25:
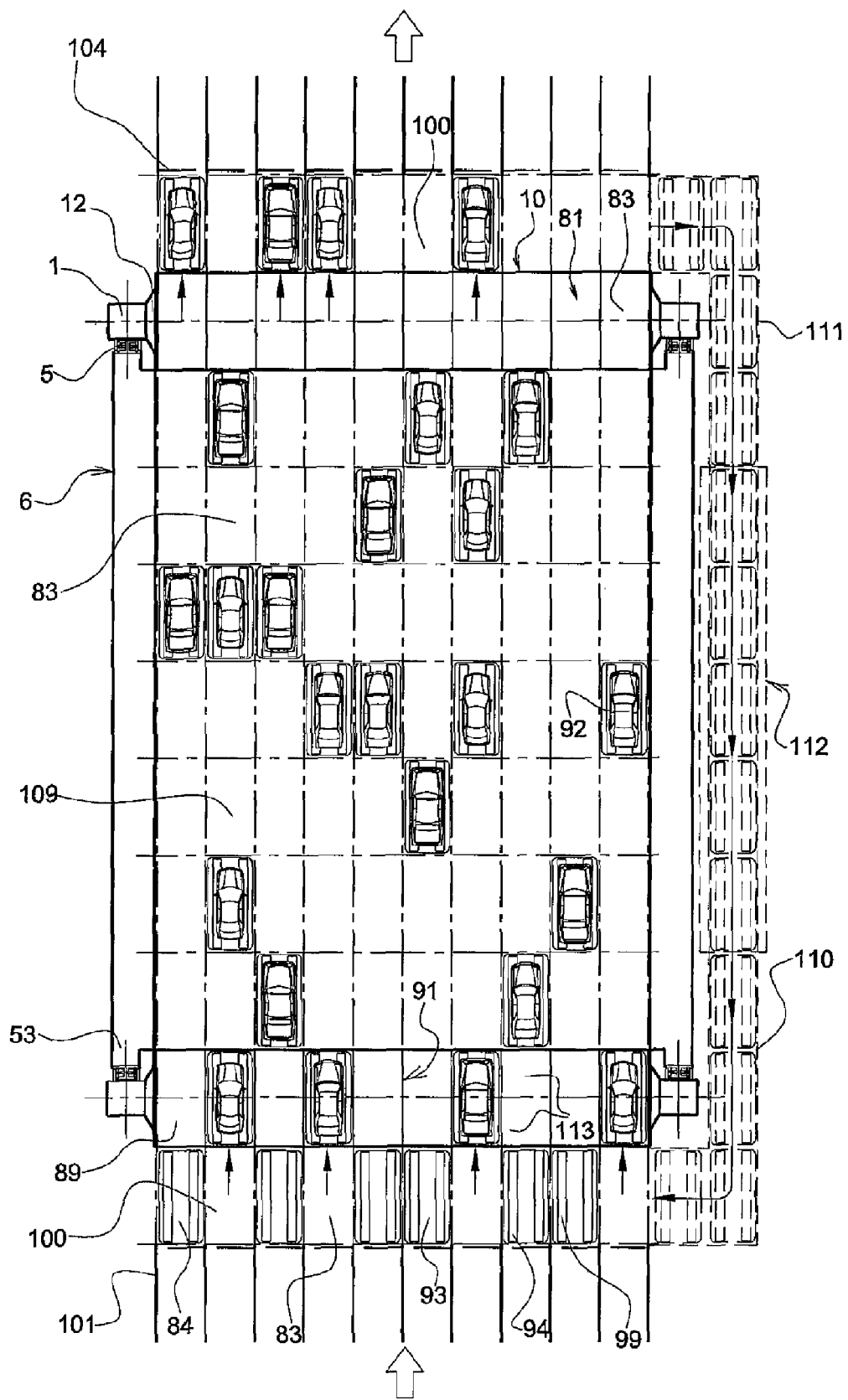
FIG. 25: One variant of multi-level car garage with mechanized transit platforms, top view.

To ensure engagement with trays 84, guide rollers 82 are mounted on drive wheels 85 in rectangular compartments 83 of transit platform 100 (FIGS. 18, 24 and 25).

For the sake of safety precautions, a shaft 102 with absorbers 103 is made in the plane of transit platform 100 (FIGS. 13, 19 and 20).

For the same purpose, automatic barriers 104 are mounted on transit platforms 100 in front of each tray 84 that is placed in rectangular compartment 83 at transit platform 100 and/or in rectangular compartment 83 at loading platform 81 of truss section 10, FIGS. 20, 22, 23, 24 and 25).

Figure 22:
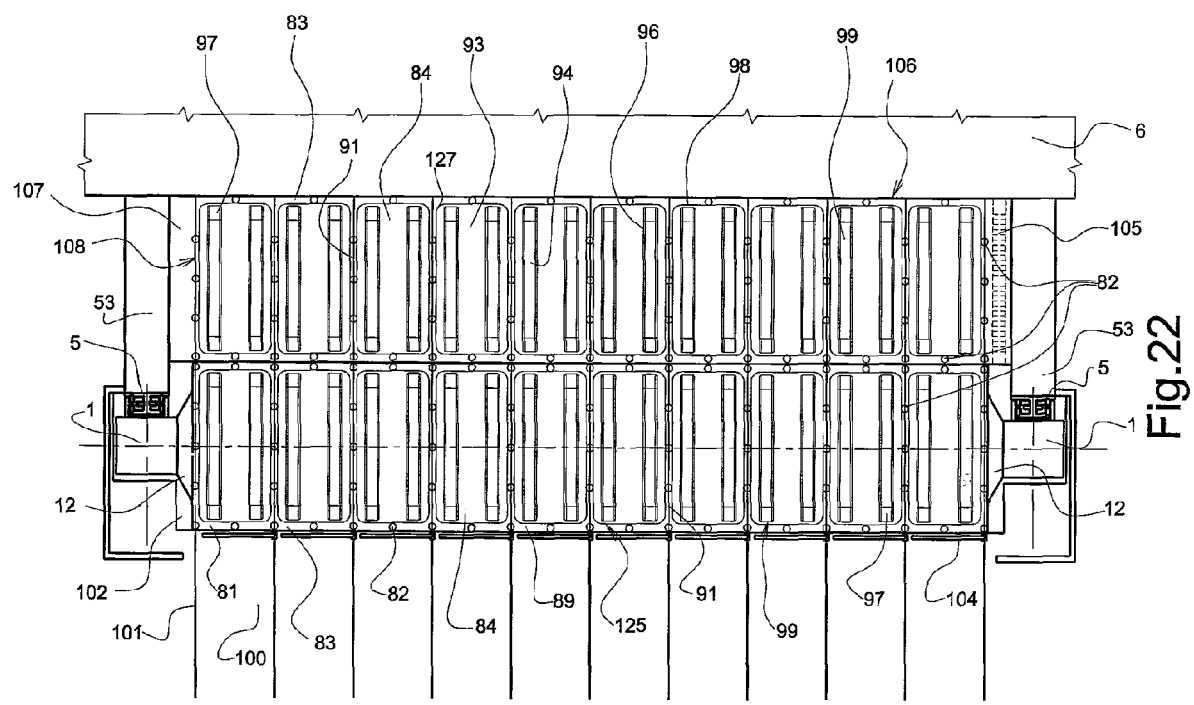
FIG. 22: One variant of hoisting system installed near dead wall (brandmauer). Example of multi-level car-parking garage with non-mechanized transit platform), top view.

For the same purpose, flights of stairs 105 and/or passenger elevators are provided in vertical stacks of metallic frame 53 (FIGS. 22 and 24).

To build up a multi-level parking garage from the side of dead wall (brandmauer) 106 of multi-story building 6, a dismountable multi-level structure 107 is erected near dead wall (brandmauer) 106, FIGS. 22 and 24.

Upright H-rails 5 are mounted on outer planes of vertical stacks of metallic frame 53, which are the part of dismountable multi-level structure 107 (FIGS. 22 and 24).

An even horizontal storage & retrieval dock 108 is arranged on each level of dismountable multi-level structure 107, designed for multi-level parking garage. By one side, the dock can be engaged at least, with one hoisting system (FIGS. 22 and 24).

The storage & retrieval dock 108 has usable area quite sufficient to accommodate one vertical row of rectangular compartments 83 with cars 92 or trays 84 with cars 92 (FIGS. 22 and 24).

Rectangular compartments 83 of dismountable multi-level structure 107 are divided between each other by horizontal lines of guide rollers 82. Each rectangular compartment 83 of storage & retrieval dock 108 at the dismountable multi-level structure 107 has the following common planes at its level: floor 89 with other rectangular compartments 83; ceiling (90) and upright structural elements 91, (FIGS. 13, 22 and 24).

Guide rollers 82 of storage & retrieval dock 108 in dismountable multi-level structure 107 are provided in lower part of adjacent upright structural elements 91 (FIGS. 13, 22 and 24).

Each rectangular compartment 83 of storage & retrieval dock 108 of dismountable multi-level structure 107 has separate trays 84, which are engaged with guide rollers 82 and are mounted on drive wheels 85 available on the floor 89 of storage & retrieval dock 108 at the dismountable multi-level structure 107 (FIG. 18).

Overall dimensions of rectangular compartments 83 of storage & retrieval docks at the dismountable multi-level structure 107 are similar to overall dimensions of rectangular compartments 83 of loading platform 81 in the truss section 10. Location of rectangular compartment groups is so positioned that one their sides of external perimeters are adjacent, whereas axes of symmetry of separate compartments in each group are aligned (FIGS. 13, 22 and 24).

Figure 23:
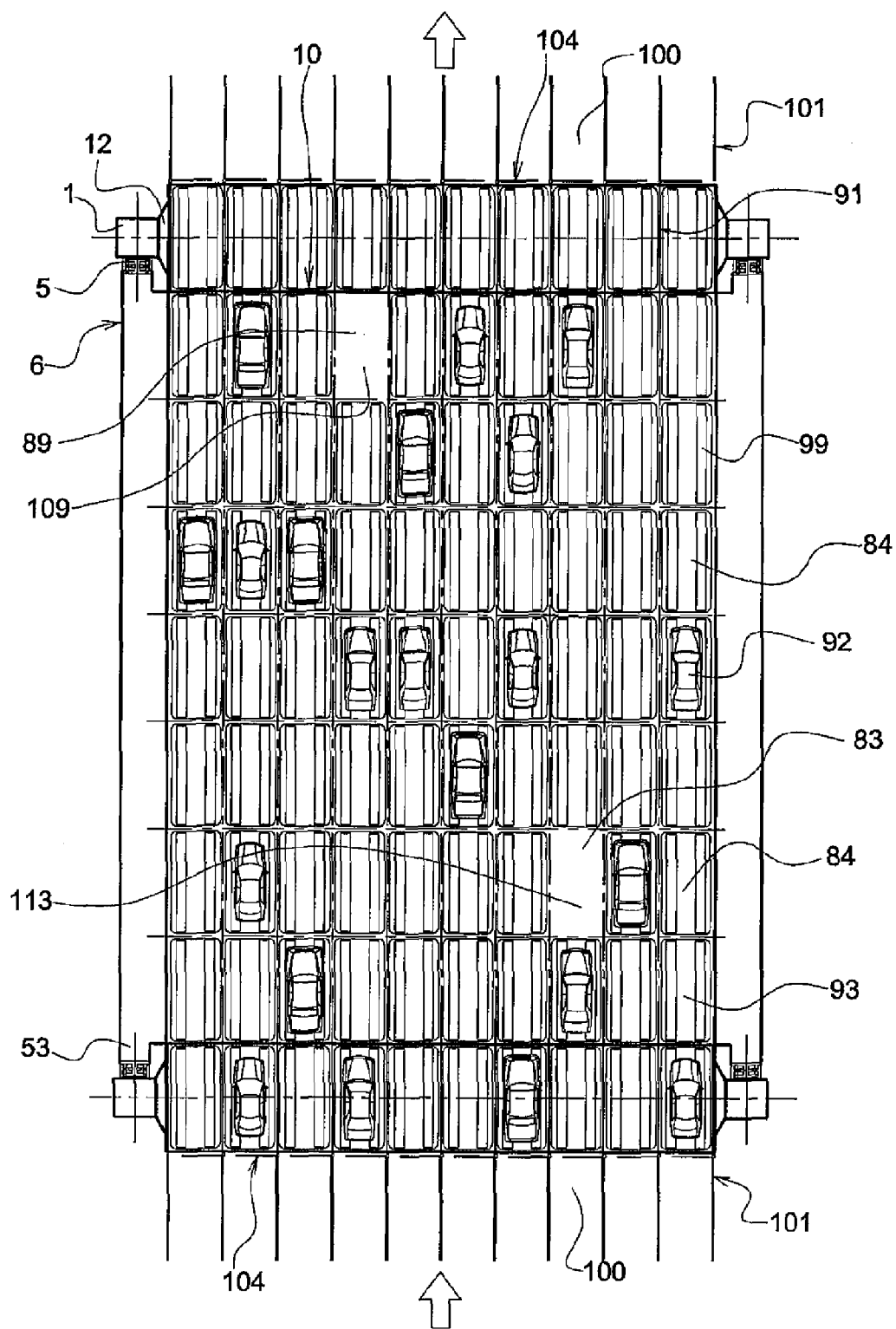
FIG. 23: One variant of multi-level car-parking garage with non-mechanized transit platforms, top view.

In order to construct a multi-level parking garage in the multi-story building 6, it is required to arrange, on its each level, an even horizontal storage & retrieval dock 109, which should have, at least, one side accessible with one hoisting system (FIGS. 13, 23 and 25).

The storage & retrieval dock 109 of multi-story building 6 has a usable area quite sufficient to accommodate, at least, two horizontal rows of rectangular compartments 83 for cars 92 or trays 84 with cars 92, (FIGS. 23 and 25).

Rectangular compartments 83 of storage & retrieval dock 109 at the multi-storage building 6 are inter-divided by horizontal lines of guide rollers 82. Each rectangular compartment 83 of storage & retrieval docks 109 in the multi-story building 6 has the following common planes at its level: floor 89 with other rectangular compartments, ceiling (90) and upright structural elements 91. Some guide rollers 82 of storage-retrieval dock 109 in the multi-story building 6 are installed in the lower part of adjacent vertical structural elements 91 (FIG. 13).

Each rectangular compartment 83 of storage & retrieval dock 109 in multi-story building 6 has separate trays 84, which are in engagement with guide rollers 82, are placed on drive wheels 85 available on the floor 89 of the storage & retrieval dock 109 in the multi-story building 6 (FIG. 18).

Rectangular compartments overall dimensions of storage & retrieval dock 109 in the multi-story building 6 are similar to rectangular compartment overall dimensions of loading platform 81 in the truss section 10. Location of rectangular compartment groups is so positioned that some sides of their external perimeters are closely adjacent, whereas axes of symmetry of separate compartments in each group are aligned (FIGS. 23 and 25).

In order to upgrade servicing capabilities of multi-level parking garage in a multi-story building 6, it is required to construct, on its outer walls, at least, two hoisting systems, one of which is to elevate cars from entry transit platform 100 to the storage & retrieval dock 109, while the second one is to lower down cars 92 from storage & retrieval dock to the exit transit platform 100 (FIGS. 23 and 25).

In order to upgrade servicing capabilities of multi-level parking garage in the multi-story building 6, it is required to construct, on its outer walls, at least, four hoisting systems, two of which are to elevate cars in turn from entry transit platform 100 to the storage & retrieval dock 109 while another two systems are to lower down, in turn, cars 92 from storage & retrieval dock to the exit transit platform 100.

To deliver a tray 84 (with or without car 92) to any rectangular compartment 83 of storage & retrieval dock in the multi-story building 6, at least, one rectangular compartment 83 in the storage & retrieval dock should not be occupied with a tray 84 (with or without car), FIG. 23.

To ensure a rotation of empty trays 84 beyond the boundaries storage & retrieval dock in the multi-story building 6, the entry and exit transit platforms should be connected with each other by means of conveying system 110 that is comprised of consecutively arranged rectangular compartments 83 (FIG. 25).

Guide rollers 82 are mounted along the perimeter of rectangular compartments 83 on the conveying system 110. Each rectangular compartment 83 on the conveying system 110 has separate empty trays 84, which are engaged with guide rollers 82, on drive wheels 85 available on floors 89 of conveying system 110 (FIG. 18).

Rectangular compartments overall dimensions in the conveying system 110 are similar to rectangular compartment overall dimensions of entry and exit transit platform. Location of rectangular compartment groups is so positioned that some sides of their external perimeters are closely adjacent, whereas axes of symmetry of separate compartments are aligned in each group (FIG. 25).

For the sake of safety precautions, the conveying system 110 should be arranged in the tunnel of rectangular section 111 (FIG. 25).

For the purpose of expanding service capabilities, the tunnel 111 of conveying system 110 is equipped with automatic equipment 112 for washing and drying of empty trays (FIG. 25).

Rectangular compartment overall dimensions are similar for the loading platform 81, through apertures of truss section 10, transit platform 100, storage & retrieval dock 108 of dismountable multi-level structure 107, storage & retrieval dock 109 of multi-story building 6 and conveying system 110 (FIGS. 13, 24 and 25).

The width-length ratio in rectangular compartments 83 is 1:2 for: loading platform 81, through apertures 86 of truss section 10, transit platform 100, storage & retrieval dock 108 of dismountable multi-level structure 107, storage & retrieval dock 109 of multi-story building 6 and conveying system 110 (as a variant, width is 3 m/9.84 feet and length is 6 m/19.69 feet), (FIG. 18).

Perimeter of each separate rectangular compartment 83 is composed out of two squared zones 113 on the loading platform 81, through apertures 86 of truss section 10, transit platform 100, storage & retrieval dock 108 of dismountable multi-level structure 107, storage & retrieval dock 109 of multi-story building 6 and conveying system 110 (FIG. 18).

Drive wheels 85 are available in each squared zone 113 of rectangular compartments 83 on loading platforms 81, through apertures 86 of truss section 10, transit platforms 100, storage & retrieval docks 108 of dismountable multi-level structure 107, storage & retrieval dock 109 of multi-story building 6 and conveying systems 110 (FIG. 18).

The number of drive wheels 85 of loading platform 81, through apertures 86 of truss section 10, transit platform 100, storage & retrieval dock 108 of dismountable multi-level structure 107, storage & retrieval dock 109 of multi-story building 6 and conveying system 110 in each squared zone 113 of rectangular compartments 83 is, at least, four. In this case wheels are placed in pairs on axes of symmetry of each side of squared zone 113 (FIG. 18).

Drive wheels 85, available in each squared zone 113 of rectangular compartments of loading platform 81, through apertures 86 of truss section 10, transit platform 100, storage & retrieval dock 108 of dismountable multi-level structure 107, storage & retrieval dock 109 of multi-story building 6 and conveying system 110, are so positioned that symmetry axes of one pair of drive wheels 85 are aligned, whereas the symmetry axes of second pair of drive wheels 85 are parallel to the first pair at the equal distance from it (FIG. 18).

In order to ensure a mechanized delivery of trays 84 (with/without cars) in two opposite horizontal directions, drive wheels of loading platform 81, through apertures 86 of truss section 10, transit platform 100, storage & retrieval dock 108 of dismountable multi-level structure 107, storage & retrieval dock 109 of multi-story building 6 and conveying system 110 are connected with engines 114, which rotate them forward and backward (FIG. 18).

To ensure a reliable contact with ridged coating 99 of tray bottom 115, drive wheels 85 of loading platform 81, through apertures 86 of truss section 10, transit platform 100, storage & retrieval dock 108 of dismountable multi-level structure 107, storage & retrieval dock 109 of multi-story building 6 and conveying system 110 are provided with resilient tires 116 having relevant treads 117 on their working surfaces (FIG. 18).

To ensure the exact positioning of trays 84 (with/without cars 92) in the process of mechanized displacement in two opposite directions, as well as after their halt, guide rollers 82 are made available along perimeter of each rectangular compartment 83 of loading platform 81, through apertures 86 of truss section 10, transit platform 100, storage & retrieval dock 108 of dismountable multi-level structure 107, storage & retrieval dock 109 of multi-story building 6 and conveying system 110 (FIG. 18).

The number of guide rollers 82 on each separate rectangular compartment 83 of loading platform 81, through apertures 86 of truss section 10, transit platform 100, storage & retrieval dock 108 of dismountable multi-level structure 107, storage & retrieval dock 109 of multi-story building 6 and conveying system 110 should be not less than twelve, including: four rollers (A, C, G and I) are located in the corners of rectangular compartment; six rollers (D, E, F, J, K and L) are located on long sides, and two remaining rollers (B and H) are placed on short sides. In this case, symmetry axes of all twelve guide rollers 82 are located on the perimeter line of rectangular compartment 83 and spaced at equal distances from each other (FIG. 18).

Each separate guide roller 82 is made available on the top end of pin 118 rigidly fixed on the surface of rectangular compartment 83. It looks like a coil comprising lower and upper pads rigidly connected with each other by means of round rod 121. Roller elements 122 (metallic spindles 123 with resilient tires 124 on them) are installed between lower and upper pads (119 and 120).

Figure 26:
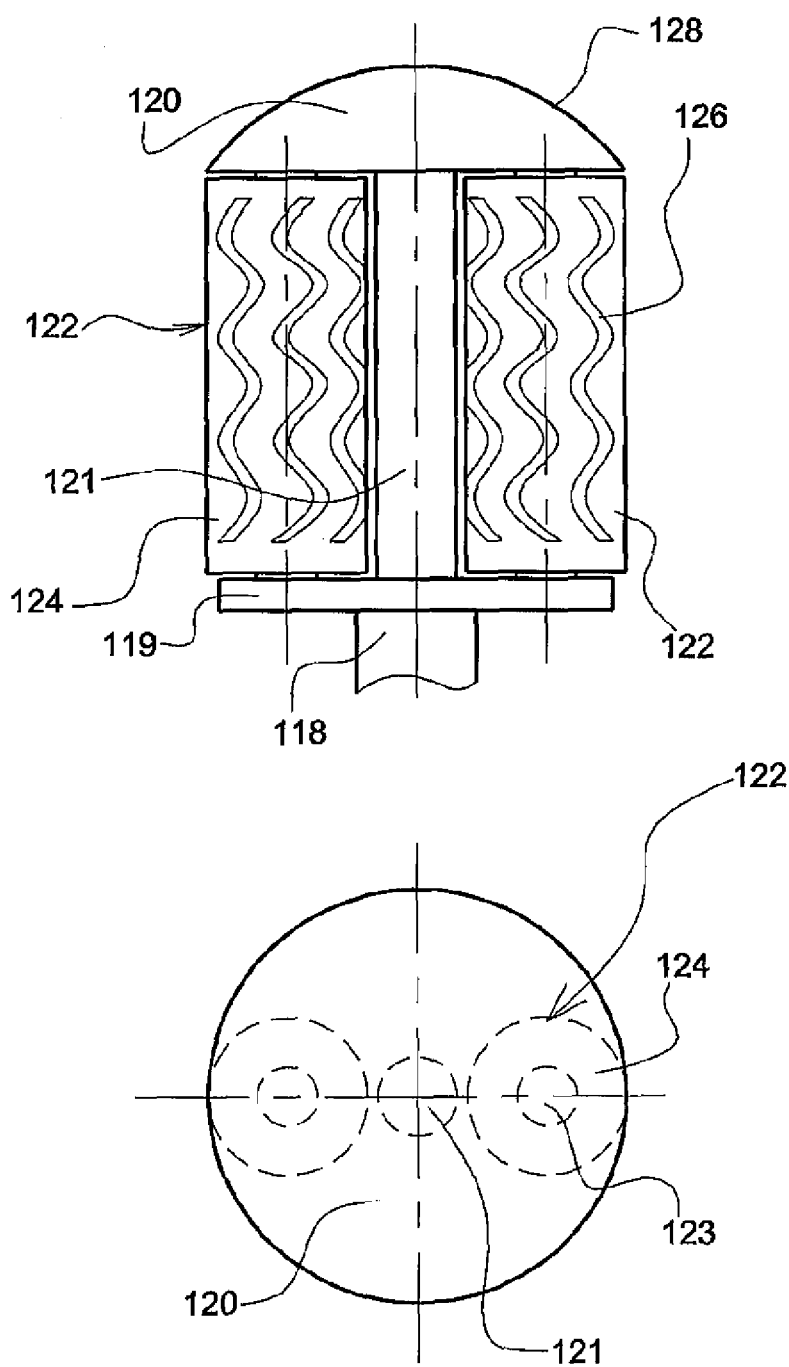
FIG. 26: One variant of guide roller, top and side views.
Figure 27:
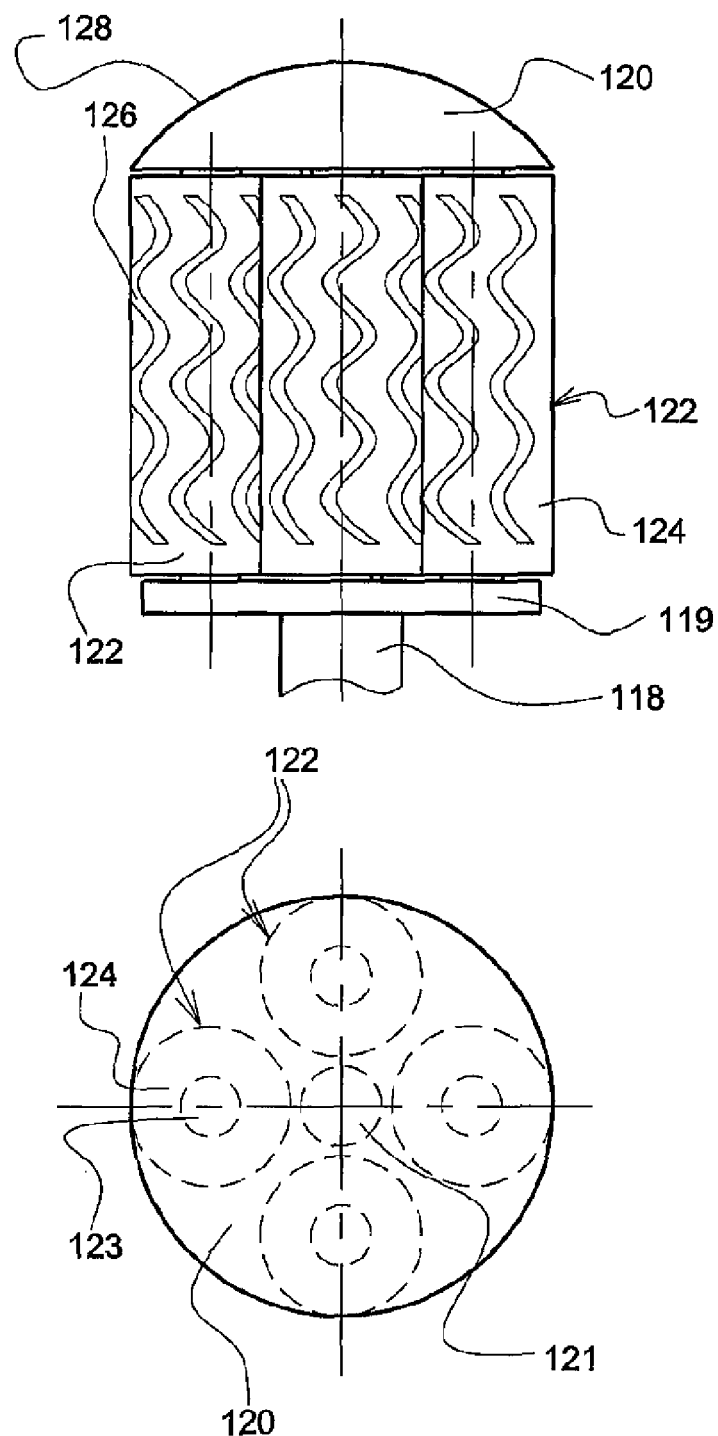
FIG. 27: One variant of guide roller, top and side views.

In order to ensure a reliable contact with ridged coating 99 of lateral surfaces 125 of trays 84, resilient tires 124 of roller elements 122 are provided with treads 126 on their working surfaces (FIGS. 26 and 27).

For the sake of safety precautions, corner sections 127 of lateral sides 125 in trays 84 have a rounded shape (FIG. 18).

For the sake of safety precautions, an upper round pad 120 of guide rollers 82 has a rounded surface 128. In this case, outer planes of resilient tires 124 of roller elements 122 do not go beyond the diameter boundaries of upper round pad 120 (FIG. 26).

Guide rollers 82 of loading platform 81, through apertures 86 of truss section 10, transit platform 100, storage & retrieval dock 108 of dismountable multi-level structure 107, storage & retrieval dock 109 of multi-story building 6 and conveying system 110 are subdivided into one-pair and two-pair guide rollers (FIGS. 26 and 27), which are completely identical with each other by overall dimensions. The only difference between them is in the quantity of roller elements 122: there are two elements in one-pair and four elements in two-pair guide rollers.

Among guide rollers 82, available in the loading platform 81, through apertures 86 of truss section 10, transit platform 100, storage & retrieval dock 108 of dismountable multi-level structure 107, storage & retrieval dock 109 of multi-story building 6 and conveying system 110, (which are rigidly fixed by pins 118 on rectangular compartment surface), there are guide rollers 82 which can be moved into slots 129 available in the plane of rectangular compartment 83 (FIG. 18).

Figure 28:
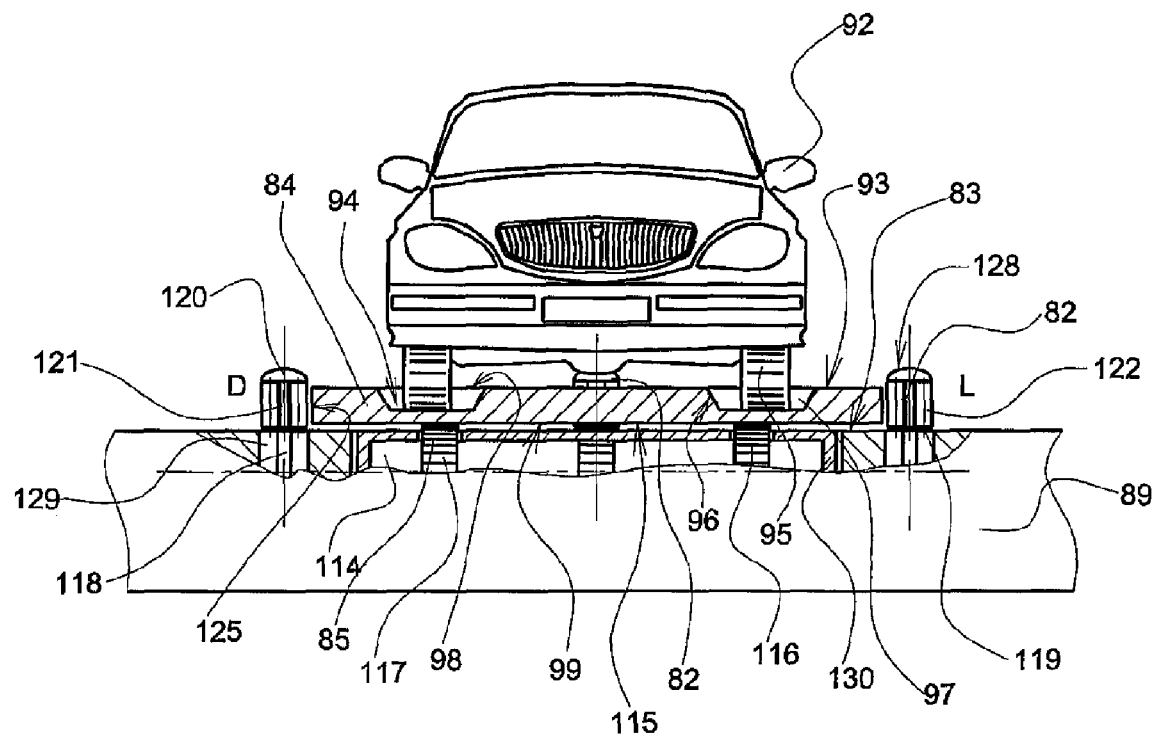
FIG. 28: One variant of rectangular compartment and of tray with a car, front view.
Figure 29:
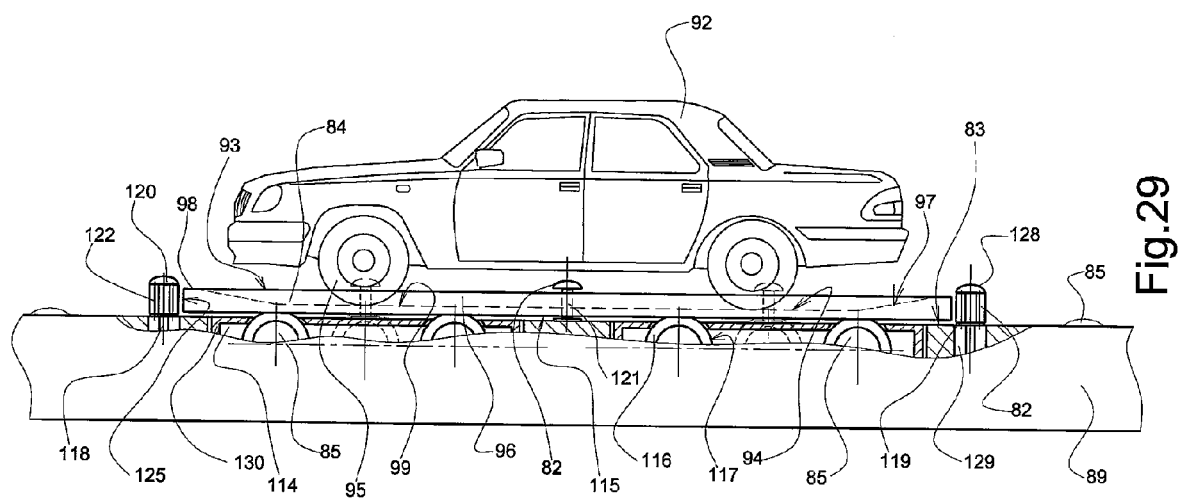
FIG. 29: One variant of rectangular compartment and of tray with a car, side view.
Figure 30:
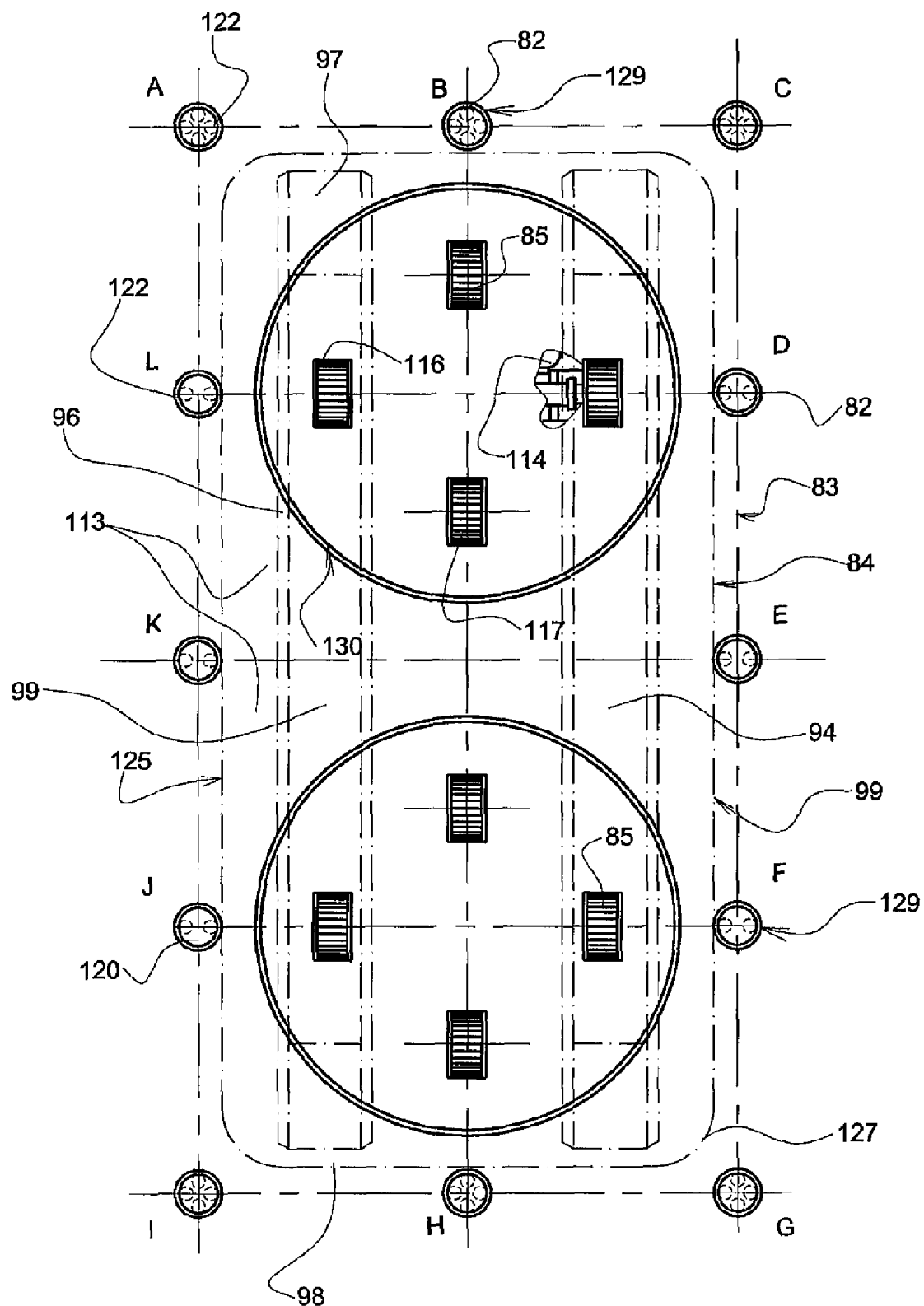
FIG. 30: One variant of rectangular compartment, top view.

To ensure the possibility of mechanized transportation of trays 84 (with/without cars) in four mutually perpendicular directions of horizontal plane, according to the variant illustrated in FIGS. 28, 29 and 30, drive wheels 85 of loading platform 81, through apertures 86 of truss section 10, transit platform 100, storage & retrieval dock 108 of dismountable multi-level structure 107, storage & retrieval dock 109 of multi-story building 6 and conveying system 110 are mounted on pivoted carriages 130, which are located in the plane of rectangular compartments 83 and do not go beyond the exterior outline. In this case, pivoted carriages 130 are capable to rotate around its axis in two opposite directions, through 180 degrees, as well as to descend lower than exterior outline of rectangular compartment 83 at the distance not less than 5 cm (1.97 inches), with the following ascending to its initial position. Some guide rollers 82 of rectangular compartments 83 (B, D, E, F, H, J, K and L) can fully move in to slots 129 in the plane of rectangular compartment 83 and then ascend to the initial position. Drive wheels 85 of loading platform 81, through apertures 86 of truss section 10, transit platform 100, storage & retrieval dock 108 of dismountable multi-level structure 107, storage & retrieval dock 109 of multi-story building 6 and conveying system 110 are connected with engines 114 that rotate them forward and backward: meanwhile resilient tires 116 of drive wheels 85 have a relevant contact with ridged coating 99 of bottom plane 115 in the tray 84 (FIGS. 28, 29 and 30).

Figure 31:
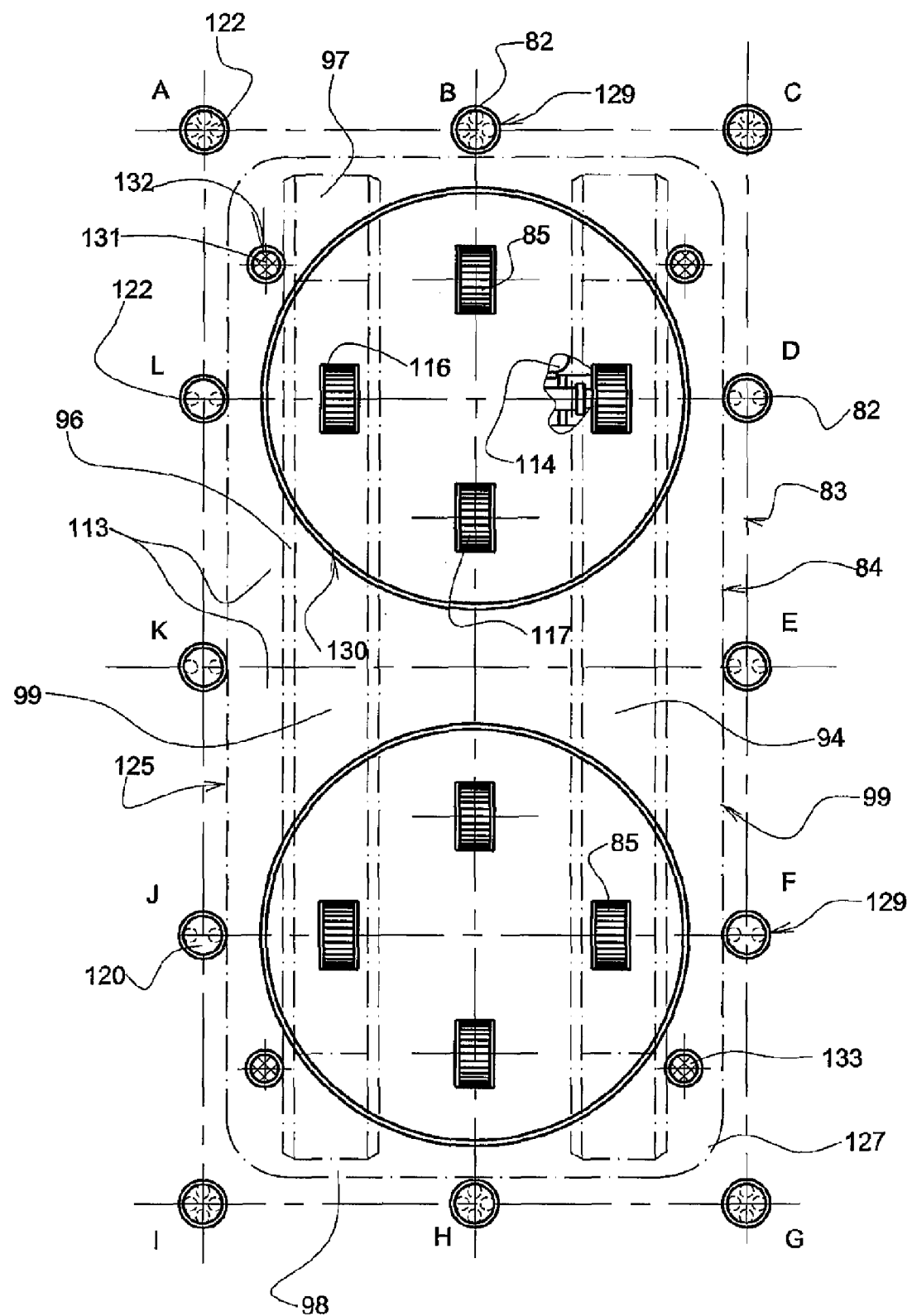
FIG. 31. One variant of rectangular compartment, top view.

To ensure a mechanized transportation of trays 84 (with/without cars) in four mutually perpendicular directions of horizontal plane, according to the variant, illustrated in FIG. 31, drive wheels 85 of loading platform 81, through apertures 86 of truss section 10, transit platform 100, storage & retrieval dock 108 of dismountable multi-level structure 107, storage & retrieval dock 109 of multi-story building 6 and conveying system 110 are mounted in pivoted carriages 130 located in each squared zone 113 of rectangular compartments and do not go beyond the boundaries of their exterior outline. In this case, pivoted carriages 130 are capable to rotate around its axis in two opposite directions, through 180 degrees. Some guide rollers 82 of rectangular compartments 83 (B, D, E, F, H, J, K and L) can fully move in to slots 129 in the plane of rectangular compartment 83 and then ascend to the initial position. Drive wheels 85 of loading platform 81, through apertures 86 of truss section 10, transit platform 100, storage & retrieval dock 108 of dismountable multi-level structure 107, storage & retrieval dock 109 of multi-story building 6 and conveying system 110 are connected with engines 114 that rotate them forward and in backward: meanwhile resilient tires 116 of drive wheels 85 have a relevant contact with ridged coating 99 of bottom plane 115 in the tray 84. Besides, provision is made for slide-out support elements 131 located in slots 132 which are capable to descend and ascend relatively the exterior outline of rectangular compartment 83. Being in slide-in position, slide-out support elements 131 do not go beyond the boundaries of exterior outline of rectangular compartments 83, but in slide-out position they protrude over the exterior outline of rectangular compartments 83 at the distance, not less than 10 cm (3.94 inch), (FIG. 31).

According to execution variant, illustrated in FIG. 31, the number of slide-out support elements is not less than four and they are placed so that each slide-out support element 131, being in out-position, can be engaged, at least, with a corner section of bottom plane 115 in the tray 84.

According to execution variant, illustrated in FIG. 31, an elastic gasket is available on the top end of slide-out support element 131.

Figure 32:
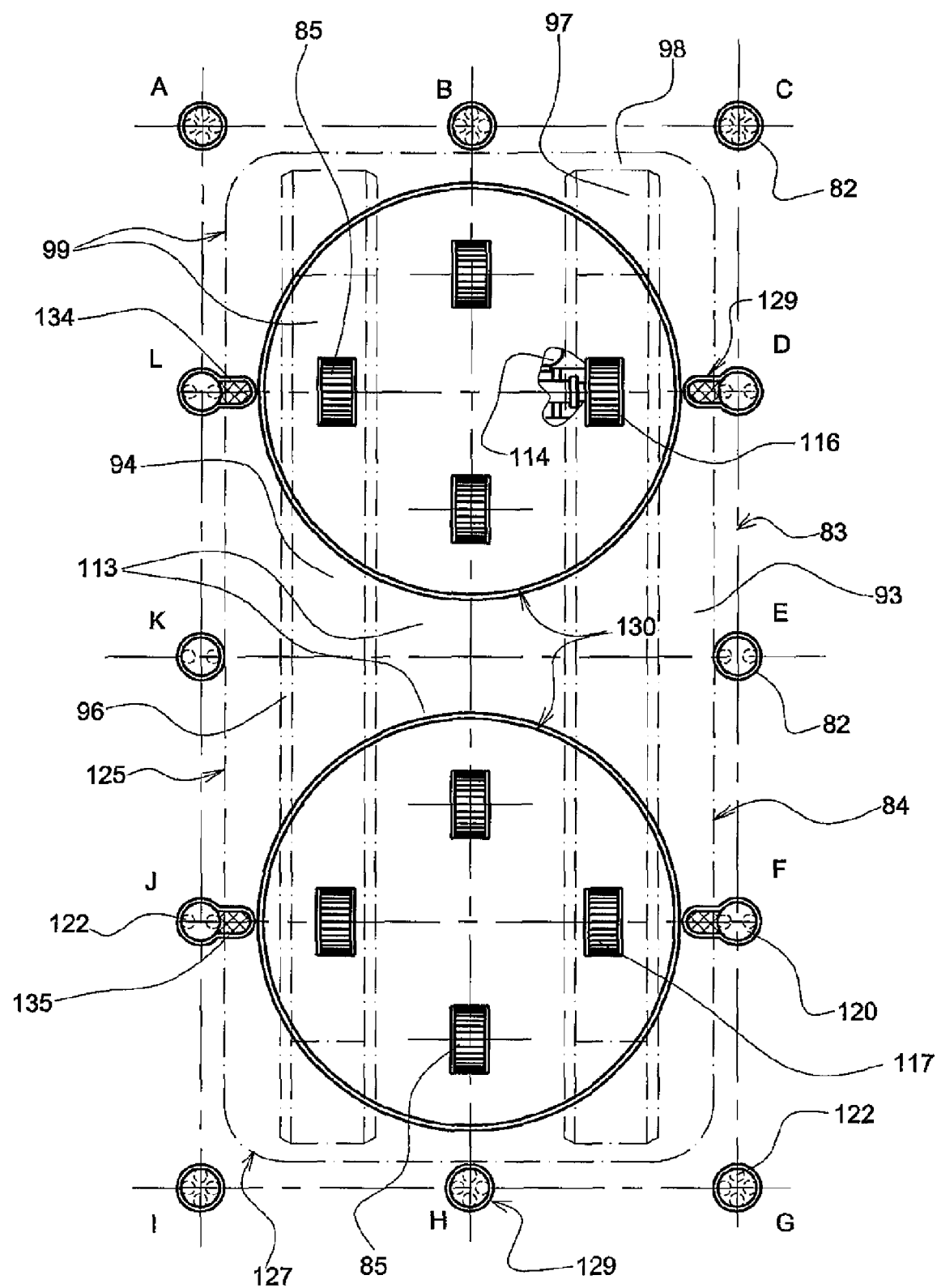
FIG. 32. One variant of rectangular compartment, top view.

In order to ensure a mechanized transportation of trays 84 (with/without cars 92) in four mutually perpendicular directions of horizontal plane, according to the execution variant, illustrated in FIG. 32, drive wheels 85 of loading platform 81, through apertures 86 of truss section 10, transit platform 100, storage & retrieval dock 108 of dismountable multi-level structure 107, storage & retrieval dock 109 of multi-story building 6 and conveying system 110 are provided in pivoted carriages 130 located in the plane of each squared zone of rectangular compartments 83 and do not go beyond their exterior outline.

In this case, pivoted carriages 130 are capable to rotate around its axis in two opposite directions, through 180 degrees. Some guide rollers 82 of rectangular compartments 83 (B, D, E, F, H, J, K and L) can fully move in to slots 129 in the plane of rectangular compartment 83 and then ascend to the initial position. Meanwhile, some of above-mentioned guide rolls 82, particularly D, F, J and L are provided with protruding support parts 134 and are additionally capable to rotate through its axis in two opposite directions, at least through 180 degrees. Drive wheels 85 of loading platform 81, through apertures 86 of truss section 10, transit platform 100, storage & retrieval dock 108 of dismountable multi-level structure 107, storage & retrieval dock 109 of multi-story building 6 and conveying system 110 are connected with engines 114 that rotate them forward and backward: meanwhile resilient tires 116 of drive wheels 85 have a relevant engagement with a ridged coating 99 of bottom plane 115 in the tray 84 (FIG. 32).

According to execution variant, illustrated in FIG. 32, protruding support parts 134 of guide rolls 82 have sufficient dimensions to contact with bottom plane of trays 84.

According to execution variant, illustrated in FIG. 32, an elastic gasket 135 is provided on the upper plane of protruding support part.

Figure 33:
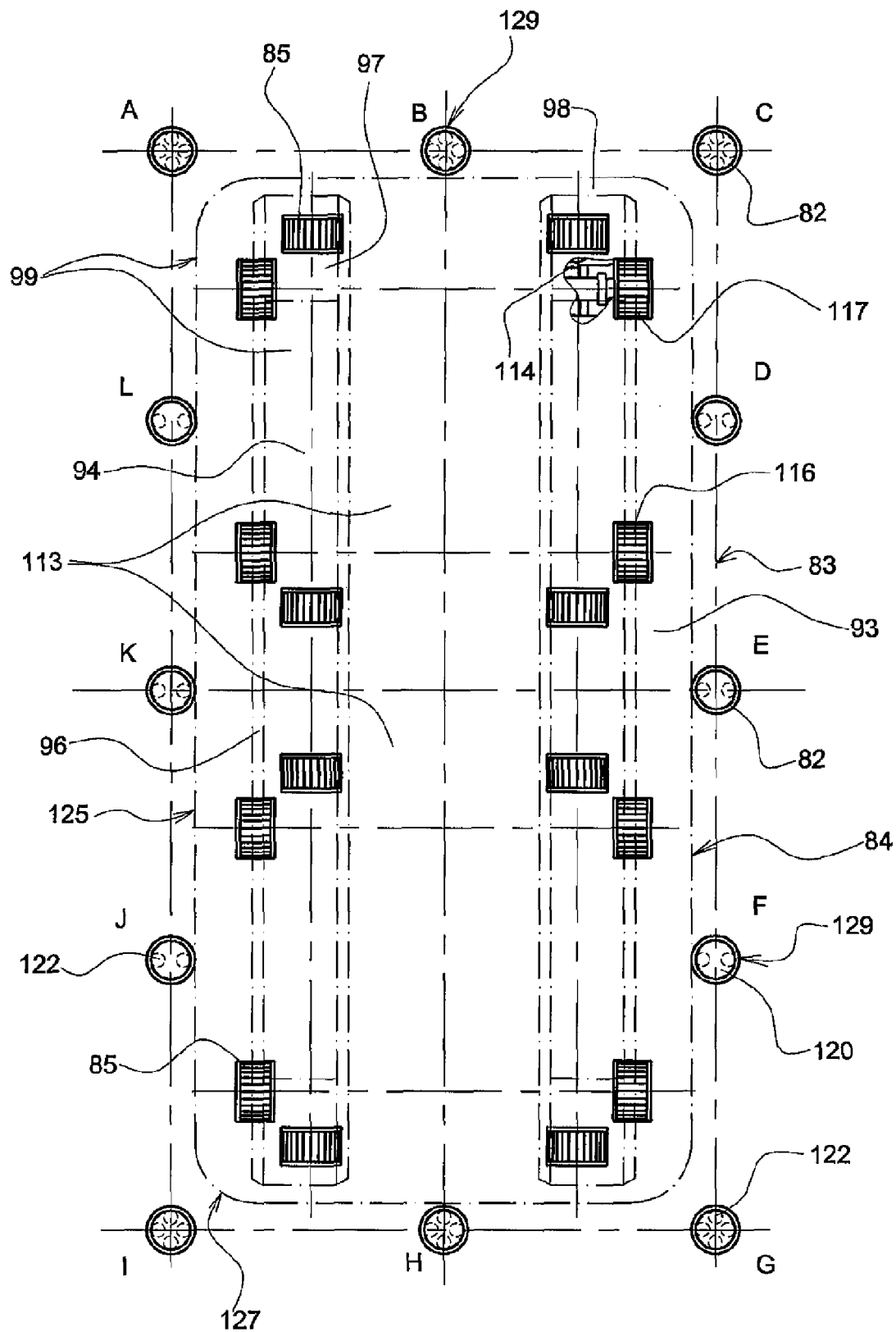
FIG. 33. One variant of rectangular compartment, top view.

To ensure the possibility of mechanized transportation of trays 84 (with/without cars) in four mutually perpendicular directions of horizontal plane, according to the variant illustrated in FIGS. 28, 29 and 30, drive wheels 85 of loading platform 81, through apertures 86 of truss section 10, transit platform 100, storage & retrieval dock 108 of dismountable multi-level structure 107, storage & retrieval dock 109 of multi-story building 6 and conveying system 110 are mounted in each squared zone 113 of rectangular compartments 83. The number of drive wheels 85 in each squared zone 113 of rectangular compartments 83 is, at least, eight and they are located by pairs in corner sections of squared zone 113. In each pair of drive wheels 85, both wheels are perpendicular to each other and are capable to descend lower the exterior outline of rectangular compartments 83 at the distance not less than 5 cm (1.97 inch) and then to come back to initial position, in turn. Some guide rollers 82 of rectangular compartment 83, particularly B, D, E, F, H, J, K and L, are capable to slide into slots available in the plane of rectangular compartment 83, and then to ascend to its initial position. Drive wheels 85 of loading platform 81, through apertures 86 of truss section 10, transit platform 100, storage & retrieval dock 108 of dismountable multi-level structure 107, storage & retrieval dock 109 of multi-story building 6 and conveying system 110 are connected with engines 114, which rotate them forward and backward: meanwhile resilient tires 116 of drive wheels 85 have a relevant contact with ridged coating 99 of bottom planes 115 in the trays 84 (FIG. 33).

Figure 34:
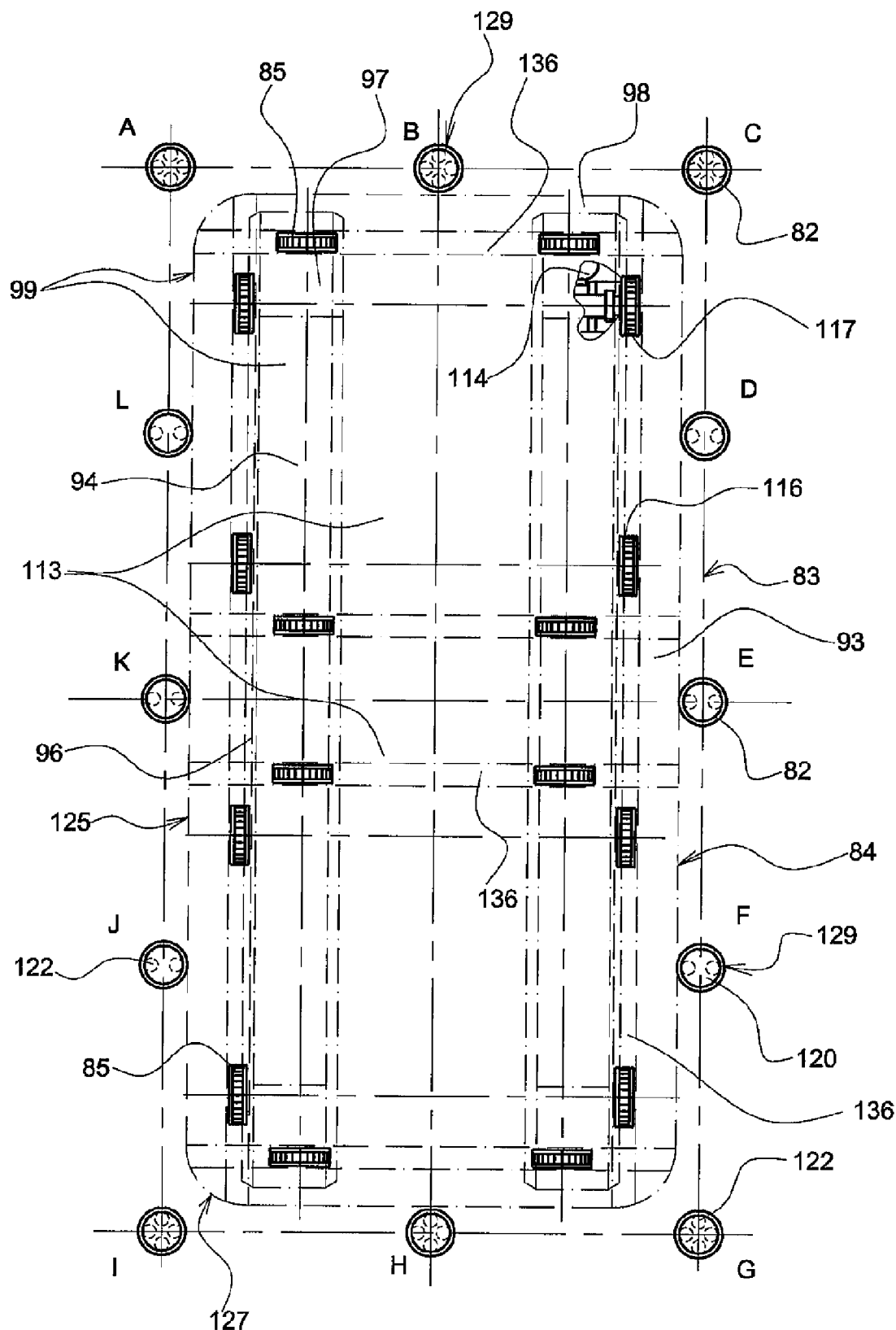
FIG. 34. One variant of rectangular compartment, top view.

To ensure the possibility of mechanized transportation of trays 84 (with/without cars) in four mutually perpendicular directions of horizontal plane, according to the variant illustrated in FIGS. 34 an 35, drive wheels 85 of loading platform 81, through apertures 86 of truss section 10, transit platform 100, storage & retrieval dock 108 of dismountable multi-level structure 107, storage & retrieval dock 109 of multi-story building 6 and conveying system 110 are mounted in each squared zone 113 of rectangular compartments 83. The number of drive wheels 85 in each squared zone 113 of rectangular compartments 83 is, at least, eight, and they are located by pairs in corner sections of squared zone 113. In each pair of drive wheels 85, both wheels are perpendicular to each other and are capable to descend lower the exterior outline of rectangular compartments 83 at the distance not less than 5 cm (1.97 inch) and then to come back to initial position, in turn. Some guide rollers 82 of rectangular compartment 83, particularly B, D, E, F, H, J, K and L, are capable to slide into slots available in the plane of rectangular compartment 83, and then to ascend to their initial position. Drive wheels 85 of loading platform 81, through apertures 86 of truss section 10, transit platform 100, storage & retrieval dock 108 of dismountable multi-level structure 107, storage & retrieval dock 109 of multi-story building 6 and conveying system 110 are connected with engines 114, which rotate them forward and backward: meanwhile resilient tires 116 of drive wheels 85 have a relevant contact with ridged coating 99 of bottom planes 115 in the trays 84 (FIGS. 34 and 35).

Figure 35:
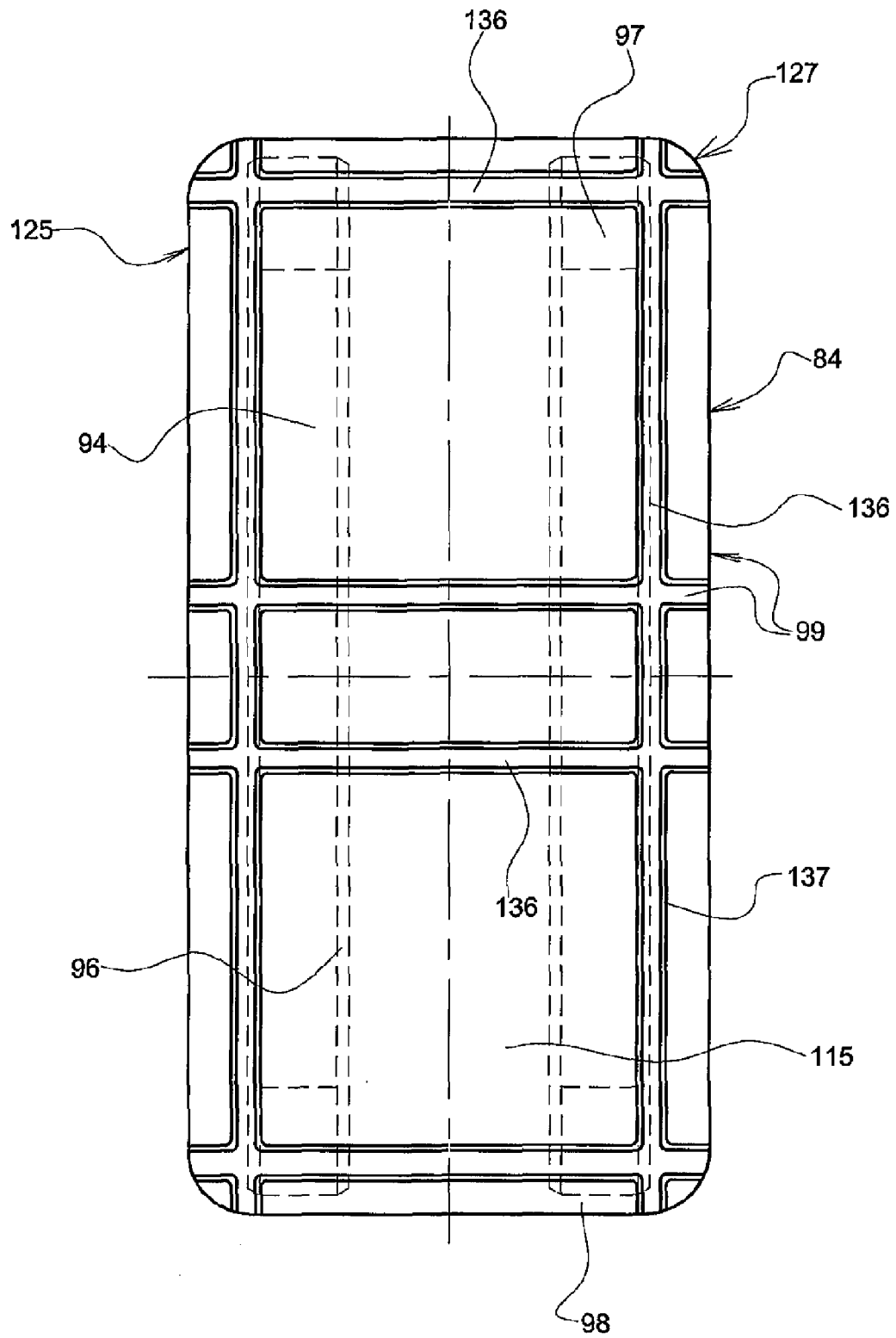
FIG. 35. One variant of trays, bottom view.

According to execution variant, illustrated in FIG. 35, guide slots 136 are made with slant flanges 137.

According to execution variants, illustrated in FIGS. 14, 15, 16 and 17, cars 92 and/or trays with cars 92 or empty trays 84, having the same length as that of loading platform 81, are loaded/unloaded from the face ends of loading platform 81 in the truss section.

Different types of automatic multi-level parking garages are built up all over the world. "Multiparker" Multifunctional ParkingGarage Complex, constructed by "WOHR" Company (Germany) is recognized as one of the most efficient ones at the present moment. This complex is provided with a loader, mounted on vertical jack-type guides, which, in turn, are fixed on horizontal guide rails. The loader can travel to any point of multi-level garage complex by means of vertical and horizontal guide ways. In this case, the loader and storage & retrieval racking in the multi-level garage are provided with a tray changer. As for trays, they are designated for car haulage.

Figure 15:
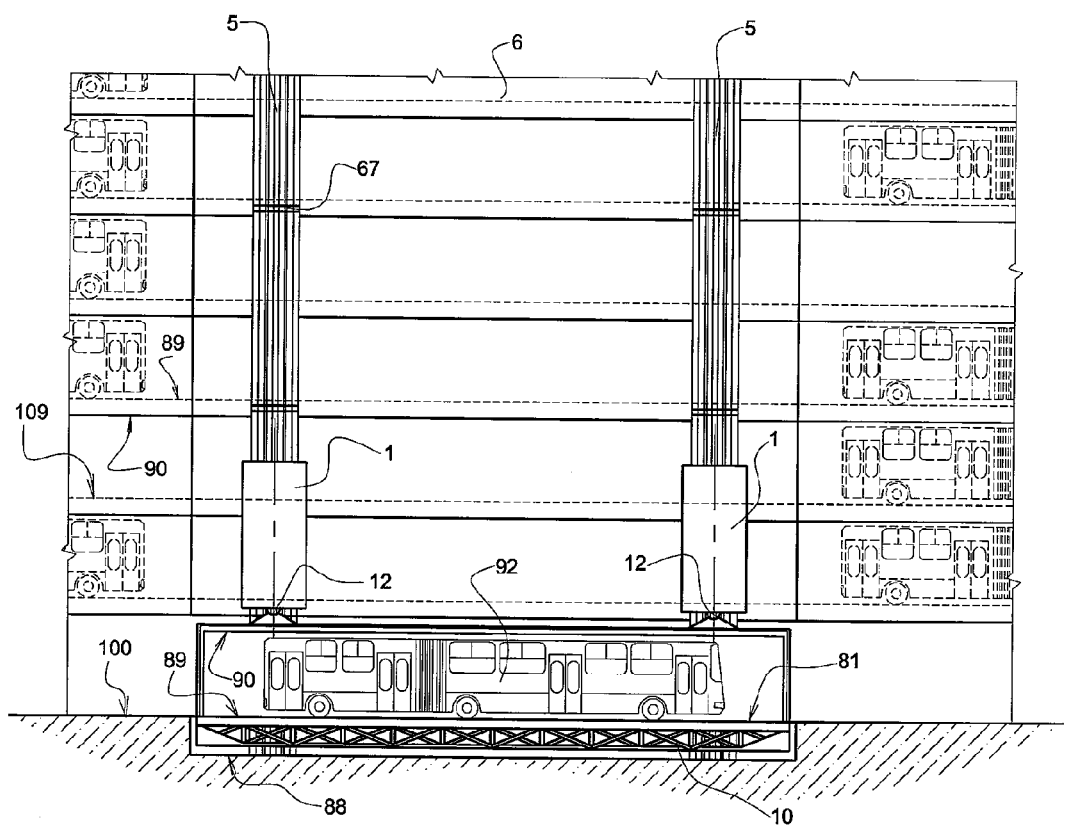
FIG. 15: One variant of hoisting system installed on the multi-floor structure (multi-level bus-parking garage), front view.

The "Multiparker" enables to carry out an individual hoisting operation for lifting to a definite floor of multi-level parking garage or lowering only one tray with effective load (a car, in particular) from it. In line with it, total rate of handling operations for a separate car might take quite a considerable period of time. If one takes into account the fact that working hours in all companies start and finish almost simultaneously, it means that at one and the same time a big group of drivers might crowd the venue of "Multiparker" parking garage, waiting for their cars quite a long time. The system, which has been applied for, is feasible to solve this problem, since the loading platform 81 of truss section 10 is provided with several rectangular compartments 83 with trays 84 that enable the system to carry out an individual hoisting operation for several cars simultaneously. For example, if one hoisting system has ten trays, the total rate of handling operations with an individual car is increased by ten times, compared with "Multiparker" (FIG. 13). For the variant, when a multi level parking garage is serviced by two hoisting systems under consideration (one for ascending and the other one for descending), the rate of handling operations will be 20-fold correspondingly (FIG. 15).

Let us consider all possible operational schemes of the applied system:

A multi-level parking garage complex, arranged from the side of dead wall (brandmauer) of multi-story building The central part of any mega city in developed countries is usually a center of cultural and business activities. From day-to-day many residents come downtown by individual cars for business and leisure. In line with it, this part of any city, compared with other ones, badly needs parking lots. However, the central part or downtown has already developed compact planning that does not allow any further arrangement of underground and above-ground parking lots as much as required. That is why municipality authorities often offer sites near dead walls (brandmauer) or firewalls for constructing a multi-level parking garage with automatic hoisters for such purposes.

The applied system can also be mounted from the side of dead walls (brandmauer) of buildings and structures. For this purpose, a dismountable multi-story structure 107 with a hoisting system mounted on H-rails 5 is erected from the side of dead wall (brandmauer) 106 of multi-story building 6. A transit platform site 100, accessible from road network of the city, is located in direct vicinity of dismountable multi-level structure 107 (FIG. 22).

A car drives in to the transit site 100 and stops near the hoisting system on the plane of the floor 89 of transit site 100 (for the variant of non-mechanized transit site) or on the tray 84, placed on the rectangular compartment 83 of transit site 100 (for the variant of mechanized transit site) (FIGS. 22 and 24).

Simultaneously, the hoisting system is displaced to the level, where the loading platform 81 of its truss section 10 is found on the same horizontal plane with the floor 89 of transit site 100 (FIGS. 19, 20, 22 and 24).

Then, a car 82 is displaced from transit site 100 to the plane of truss section loading platform 81. This displacement can be fulfilled by two ways:

a car 92 drives from the floor 89 of transit site 100 to the tray 84 placed in the rectangular compartment 83 of loading platform 81 for the variant of non-mechanized transit site) (FIGS. 19, 20 and 22).

A car 92 is displaced on the tray 84 from rectangular compartment 83 of transit site 100 to the rectangular compartment 83 of loading platform 81 of truss section 10 (for the variant of mechanized transit site) (FIG. 24).

A variant of multi-level parking garage with mechanized transit site, arranged from the side of dead wall (brandmauer) of multi-story building.

To ensure a mechanized displacement of tray 84, first and foremost two guide rollers 82 (B and H) of two adjacent rectangular compartments are required to be slid in to slots 129. One of these rollers (B) is located on transit site 100, while the other one (H) is placed on the loading platform 81 of truss section 10. Both of them are positioned opposite each other on end face border of compartments 83 (FIGS. 18 and 24).

Afterwards, engines 114 are actuated to rotate, in the direction from transit site, drive wheels 85 of two adjacent rectangular compartments 83, one of which is located on transit site 100, and the other one is on the loading platform 81 of truss section 10 (FIGS. 18 and 24).

When being rotated, drive wheels 85 through the treads 117 of their elastic tires come to the engagement with ridged coating 99 on the bottom of the tray, where a car is placed. As a result, the tray 84 with a car 92 moves along drive wheels 85 from rectangular compartment 83 of transit site to the rectangular compartment of loading platform 81 in the truss section 10 (FIGS. 18 and 24).

A proper trajectory of such displacement is provided by guide rollers 82 (A, C, D, E, F, G, I, J, K and L) of two adjacent rectangular compartments 83, which are engaged with ridged coating 99 of lateral planes 125 of trays 84 by its roller elements 122 (FIGS. 18 and 24).

Having made a definite number of turns, drive wheels 85 of two adjacent rectangular compartments 83 are stopped and the tray 84 is hereby displaced to the rectangular compartment 83 of loading platform in the truss section (FIGS. 18 and 24).

Afterwards, two guide rollers 82 (B and H) of two adjacent rectangular compartments are completely slid out from the slots 129 into previous working position by closing hereby the perimeters of their rectangular compartments (FIGS. 18 and 24).

Then, the hoisting system moves to the level of dismountable multi-story structure 107, where it is planned to store this tray with a car temporarily. At this level, the obligatory condition is: a rectangular compartment 83 of storage & retrieval dock 108 with empty tray 84 should be positioned at the same horizontal axis of symmetry with a rectangular compartment 83 of loading platform 81 (FIGS. 18 and 24).

The lifting system is stopped at the moment, when the floor 89 of through apertures 86 of truss section 10 is found at the same horizontal plane with the floor of storage & retrieval dock 108 in the dismountable multi-level structure 107.

Then, two roller guides 82 (B and H) of two adjacent rectangular compartments 83 are completely slid in to the slots 129. One of these rollers (B) is located on the through aperture 86 of truss section 10, while the other one (H) is on the storage & retrieval dock 108 of dismountable multi-level structure 107. Both of them are located opposite each other on face end border of compartments 83 (FIGS. 13, 18 and 24).

Afterwards, engines 114 are actuated to rotate, in the direction from storage & retrieval dock 108, drive wheels 85 of two adjacent rectangular compartments 83, one of which is located on storage & retrieval dock 108, and the other one is in the through aperture 86 of truss section 10 (FIGS. 13, 18, 19, 20 and 24).

When being rotated, drive wheels 85 through the treads 117 of their elastic tires come to the engagement with ridged coating 99 on the bottom of empty tray, located in the rectangular compartment 83 of storage & retrieval dock 108. As a result, an empty tray moves along drive wheels 85 from rectangular compartment 83 of storage & retrieval dock to the rectangular compartment of free through aperture 86 in the truss section 10 (FIGS. 13, 18 and 24).

Afterwards, a guide roller 82 (B) of rectangular compartment in the through aperture 86 of truss section is completely slid out from the slot 129 into previous working position by closing hereby the perimeters of their rectangular compartment, where an empty tray 84 is placed (FIGS. 13 and 18).

When this operation is over, the rectangular compartment 83 of storage & retrieval 108 becomes free from empty tray 84, thus giving a possibility to set a tray with a car on it from rectangular compartment of loading platform 81 (FIGS. 13 and 24).

To ensure such a possibility, the hoisting system will move until the moment, when the floor 89 of loading platform 81 of truss section 10 is found at the same horizontal plane with the floor 89 of storage & retrieval dock in the dismountable multi-level structure 107 (FIG. 24).

Afterwards, the guide roller 82 (B) of loading platform rectangular compartment 83 should be slid in to the slot 129. The guide roller 82 (H), which is oppositely-positioned on the adjacent rectangular compartment of storage & retrieval dock, was slid in to the slot 129 as earlier as at the beginning of previous re-loading operation (FIGS. 18 and 24).

Afterwards, engines 114 are actuated to rotate, in the direction from loading platform of truss section 10, drive wheels 85 of two adjacent rectangular compartments 83, one of which is located on loading platform 81, and the other one is on the storage & retrieval 108 of dismountable multi-level structure (FIGS. 18 and 24).

When being rotated, drive wheels 85 through the treads 117 of their elastic tires come to the engagement with ridged coating 99 on the bottom of empty tray, where a car is placed. As a result, an empty tray moves along drive wheels 85 from rectangular compartment 83 of loading platform to the rectangular compartment of storage & retrieval dock 108 (FIGS. 18 and 24).

A proper trajectory of such displacement is provided by guide rollers 82 (A, C, D, E, F, G, I, J, K and L) of two adjacent rectangular compartments 83, which are engaged with ridged coating 99 of lateral planes 125 of trays 84 by its roller elements 122 (FIGS. 18 and 24).

Having made a definite number of turns, drive wheels 85 of two adjacent rectangular compartments 83 are stopped and the tray is hereby displaced to the rectangular compartment 83 of storage & retrieval dock 108 in the dismountable multi-level structure 107 (FIGS. 18 and 24).

Afterwards, two guide rollers 82 (B and H) of rectangular compartment are completely slid out from the slot 129 into previous working positions by closing hereby the perimeters of their rectangular compartments (FIGS. 18 and 24).

Then, a hoisting system moves again to the transit site 100 and an empty tray 84 is unloaded from its through-aperture 86 of truss section 10 onto rectangular compartment 83 of transit site 100. Now this tray is ready for loading another car 92 (FIG. 24).

Car-unloading operations from storage & retrieval dock 108 in the dismountable multi-level structure 107 onto transit site 100 are to be carried out in the reverse order.

For the sake of safety, entry/exit of cars 92 to/from trays, located on the transit site 100 are regulated by automatic barriers 104 (FIG. 24).

The above-mentioned loading/unloading operations during one trip of hoisting system from transit site 100 to any level of dismountable multi-story structure 107 and back can be simultaneously accomplished with all trays 84 of loading platforms 81 in the truss section 10. Compared with other known similar systems, it allows the applied system to ensure a multiple rate increase for car handling rotation during their servicing in the multi-level parking garage.

A variant of multi-level parking garage complex with non-mechanized transit site, arranged from the side of dead wall (brandmauer) of multi-story structure.

For this execution variant, the truss section 10 of hoisting system does not have through apertures 86 for transporting empty trays 84 and therefore all loading and unloading operations are carried out with loaded trays only.

From a rectangular compartment of transit site 100, a car 92 drives onto the tray 82 placed in the rectangular compartment 83 of loading platform 81 in the truss section (FIGS. 19, 20 and 22).

Then a hoisting system travels to that level of dismountable multi-level structure 107, where a free rectangular compartment 83 is available in the storage & retrieval dock that is located on the same horizontal axis of symmetry as the above-mentioned rectangular compartment 83 in the loading platform 81.

The tray 84 with a car 92 is re-loaded onto empty rectangular compartment 83 in the storage & retrieval dock 108.

Afterwards, the hoisting system travels to the rectangular compartment 83 at another level of dismountable multi-level structure 107, located at the same horizontal axis of symmetry with above-mentioned empty rectangular compartment in the loading platform 81 and has a tray 84 with a car 92 that is to be delivered to the transit site 100.

After this vacant rectangular compartment of loading platform is occupied by the tray with a car 92, the hoisting system travels to the level of transit platform (site) 100, where an empty rectangular compartment of transit site 100 is located at the same horizontal axis of symmetry with above-mentioned loaded rectangular compartment 83 on the loading platform 81 (FIG. 22).

When the hoisting system reaches the level of transit platform (site) 100, the car 92 drives from the tray 84 onto the empty rectangular compartment on the transit site 100 and leaves the parking garage for a city (FIGS. 19, 20 and 22).

To ensure safety precautions, entry/exit of cars 92 to/from trays, located on the loading platform 81 is regulated by automatic barriers 104 on the transit site 100 (FIG. 24).

The above-mentioned loading/unloading operations during two-way trip of hoisting system (from transit site 100 to any level of dismountable multi-story structure 107 and back) can be simultaneously accomplished with all trays 84 of loading platforms 81 in the truss section 10. Compared with other known similar systems, it allows the applied system to ensure a multiple rate increase for car handling rotation during their servicing in the multi-level parking garage.

A multi-level parking garage arranged in a multi-story building

In most of cities and small towns in any developed country worldwide there are places and structures, which are permanently or temporarily overfilled with a great number of cars. Large dwelling blocks, big-scale enterprises, transport terminals (airports, railway and bus stations), taxi parks and lorry fleets, entertainment and tourist centers, shopping malls and trade markets are referred to such places.

Very often in the vicinities of such crowded places, parking lots and parking garages are constructed to accommodate a tremendous amount of cars. Multi-level parking garage complexes (underground and above-ground) are the most efficient ones.

The system, we applied for, can also be erected as a multi-level parking garage complex arranged in multi-story buildings in underground/above-ground versions. For this purpose, one can use both a separate building and several lower or underground floors of high-rise building (office building, for instance).

At least, two hoisting systems are mounted on H-rails 5 of outer planes of the given building 6. One system is designed to ascend cars 92 from entry transit site 100 to any level of multi-level parking garage, while the other one is designed to descend cars from any level of multi-level parking garage to exit transit site 100 (FIGS. 23 and 25).

Meanwhile, a transit site 100 in the multi-level parking garage, arranged in the high-rise building 6 as well as a transit site 100 in above-mentioned dismountable multi-level structure 107 can be mechanized (FIG. 25) or non-mechanized (FIG. 23).

In addition to it, compared with above-mentioned dismountable multi-level structure 107, the technical design and operation methods of rectangular compartments 83 on transit sites 100 and truss section loading platforms 81 in the multi-level parking garage, arranged in the multi-story building 6 are completely identical (FIGS. 22, 23, 24 and 25).

Storage & retrieval docks located on different levels of high-rise buildings are large enough to accommodate several rows of rectangular compartments 83 (two or more) (FIGS. 23 and 25).

Rectangular compartments 83 on the storage & retrieval site 109 of multi-level structure 6 allow a mechanized transportation of trays 84 with/without cars 92 in four mutually perpendicular directions of horizontal plane that makes possible to deliver trays to any section of multi-level structure 6.

To ensure such a possibility, the technical design of rectangular compartments 83 on the storage & retrieval dock 109 in the multi-level structure 6 has several variants of execution which were described earlier in illustrated FIGS. (28, 29, 30, 31, 32, 33, 34 and 35).

As soon as a car is placed on the hoisting system from entry transit site 100, this hoisting system is moved to that level of multi-story parking garage in high-rise building 6, where there is, at least, one empty tray 84.

Initially, the given tray can be located in any place of storage & retrieval dock 109 of this level. Then, this tray is displaced by means of drive wheels 85 of rectangular compartments 83 to the edge of storage & retrieval dock 109 (i.e. on rectangular compartment), one side of which is engaged with the hoisting system. Meanwhile, a horizontal axis of asymmetry in this rectangular compartment should be in alignment with horizontal axis of symmetry in the rectangular compartment of loading platform 81, where there is a tray with a car 92.

It is worthy of note that to ensure the possibility of displacing each tray 84 with/without car 92 to any place in the storage & retrieval dock, it is enough to have, on this site, at least one empty rectangular compartment 83, which is not occupied by a tray 84 (FIG. 23).

Proceeding with previous handling operation, an empty tray 84 is displaced into through aperture 86 of truss section 10. Afterwards, the position of hoisting system is a bit adjusted and a vacant compartment in the storage & retrieval dock 109 is occupied by a tray with a car 92 from hoisting system.

The above-mentioned loading/unloading operation during two-way trip of hoisting system (from transit site 100 to any level of dismountable multi-story structure 107 and back) can be simultaneously accomplished with all trays 84 of loading platforms 81 in the truss section 10.

Owning to it, during one trip of hoisting system from transit site 100 to any level of multi-level parking garage arranged in high-rise building it is possible to deliver as many rectangular compartments 83 as there is available on the loading platform 81 of truss section 10. In this case, during one trip of hoisting system from any level of multi-story structure in the high-rise building 6 to the transit site 100 it is possible to deliver as many empty trays, as through-apertures 86 are available in the truss section 10 (FIGS. 13 and 23).

Trays (with/without cars), which were delivered for temporary storage to the storage & retrieval dock 109 in multi-level parking garage, arranged in high-rise building, are displaced from time to time. Meanwhile, the less empty rectangular compartments are in number, the more complicated are combinations and routes of such displacements. However, it is not a problem, provided that this parking garage complex releases cars on the basis of preliminary applications made by their drivers.

A multi-level parking garage, arranged in multi-storage building and equipped with empty tray delivery system To make storage & retrieval dock (of the multi-level parking garage arranged in the high-rise building 6) free of empty trays 84, a conveying system 110 is provided near the parking garage complex. This system connects entry and exit transits sites together and is represented by consecutively-positioned rectangular compartments 83 (FIG. 25).

Rectangular compartments 83 of conveying system 110 and transit site 100 (entry and exit) have identical technical design and operation methods, compared with rectangular compartments 83 of storage-retrieval site 109 in the multi-level parking garage of high-rise building 6. In line with it, rectangular compartments 83 of conveying system 110 and transit site 100 (entry and exit) allow for a mechanized delivery of trays 84 in four mutually perpendicular directions of horizontal plane. It enables to displace empty trays 84 along integral route of conveying system 110 and (exit/entry) transit sites 100 (FIG. 25).

So, when leaving the parking garage, cars 92 drive down from trays 84 and move to the "city" after these trays have been displaced from rectangular compartments 83 on the loading platform 81 to the rectangular compartment 83 on exit transit site 100 (FIG. 25).

Then, empty trays 84 are displaced onto the rectangular compartments of conveying system 110 by means drive wheels 85 of rectangular compartments on the exit transit site 110 (FIG. 25).

Rectangular compartments 83 of conveying system 110 move these trays 84 onward along the conveying system 110 by means of their drive wheels 85 (FIG. 25).

Empty trays 84 on this stage of haulage are washed and dried automatically (112) (FIG. 25).

Rectangular compartments, in succession to washing/drying zone, move empty trays 84 by their drive wheels 85 onto rectangular compartments 83 on entry transit site 100 (FIG. 25).

As soon as empty trays 84 are found themselves on entry transit site 100, cars from "city" move-in on them (FIG. 25).

After all trays on the entry transit site 100 are occupied by cars 92, they are simultaneously displaced to the loading platform 81 on the truss section of the hoisting system (FIG. 25).

Further on, trays 84 with cars 92 are transported to required floors of multi-level parking garage, arranged in the high-rise building 6, by means of hoisting system and rectangular compartments 83 from loading platform of truss section 10 (FIG. 25).

Trays 84 with cars 92 are arranged for temporary storage on storage & retrieval docks 109 on the required floor of multi-level parking garage in high-rise building 6 (FIG. 25).

As soon as storage period is over, trays 84 with cars 92 are displaced by drive wheels 85 of rectangular compartments in the storage & retrieval dock 109 from the required floor of multilevel parking garage to the loading platform 81 of the second hoisting system (FIG. 25).

Then, this hoisting system moves to the exit transit site 100, where trays with cars are unloaded and an entire cycle of operations is repeated again (FIG. 25).

A continuous cycle of loading and unloading operations is feasible, provided that at least two hoisting systems are available on entry and exit transit sites 100.

Continuity of such a cycle is ensured by possibility of simultaneous handling operations with four groups of cars 92:

the first group of cars 92 is loaded on the first hoisting system from the entry transit site 100;

the second group of cars 92 is unloaded on required floor of multi-level parking garage from the second hoisting system from the entry transit site 100;

the third group of cars 92 is loaded from the required floor of multi-level parking garage on the first hoisting system for the exit transit site 100;

the fourth group of cars 92 is unloaded to the present transit platform from the second hoisting system for the exit transit site 100.

Obviously, many modifications and variations of the present invention are possible in light of the above teachings. It is therefore to be understood that, within the scope of the appended claims, the invention may be practiced otherwise than as specifically described.

What is claimed is:

1. The hoisting system for high-rise buildings comprising:
   upright rails mounted on an outer wall of a building,
   at least one lifting block on each rail, each lifting block having a fastening unit and a relocating mechanism,
   a truss section attached to separate lifting blocks, forming an integral exterior hoisting system, the truss section having a loading platform with a plurality of rectangular compartments, at least one guide roller between the rectangular compartments, at least one drive wheel in the rectangular compartments, a tray for supporting objects, the tray engaged by the drive wheels to move the trays on the loading platform to position them in the rectangular compartments, a swivel connector provides a hinged connection between the lifting blocks and the truss section.

2. The hoisting system for high-rise buildings as in claim 1 wherein,
   the lifting block has a lateral plane, the truss section has an end face and
   fixing one end of each swivel connector on one of the lateral planes of lifting block and another end on one of the end faces of truss section.

3. The hoisting system for high-rise buildings as in claim 1 wherein,
   the lifting block has a lower plane, the truss section has an upper plane and
   fixing one end of each swivel connector on the lower plane of lifting block and another end on the upper plane of truss section.

4. The hoisting system for high-rise buildings as in claim 1 wherein,
   the lifting block has an upper plane, the truss section has an lower plane and
   fixing one end of each swivel connector on the upper plane of lifting block and another end on the lower plane of truss section.

5. The hoisting system for high-rise buildings as in claim 1 wherein,
   the lifting block has a frontal plane, the truss section has a lateral plane and
   fixing one end of each swivel connector on the frontal plane of the lifting block and another end on one of the lateral planes of the truss section.

6. The hoisting system for high-rise buildings as in claim 1 wherein,
   the rectangular compartments have guide wheels and guide rollers for moving trays, the guide wheels extending though an aperture in the rectangular compartments.

7. The hoisting system for high-rise buildings as in claim 1 wherein,
   a metallic frame with vertical stacks supports the upright rails mounted on vertical stack planes, the metallic frame being an integral part of the building.

8. The hoisting system for high-rise buildings as in claim 7 wherein,
   the metallic frame has three planes each having a rail mounted thereon, the block on each rail having fastening units and relocating mechanisms.

9. The hoisting system for high-rise buildings as in claim 1 wherein,
   the rectangular compartments have a common floor and a ceiling and have vertical structural elements between the floor and the ceiling.

10. The hoisting system for high-rise buildings as in claim 9 wherein,
    the vertical elements are attached to the truss section such that they are integral therewith.

11. The hoisting system for high-rise buildings as in claim 9 wherein,
    the vertical structural elements have an installed guide roller in lower part thereof.

12. The hoisting system for high-rise buildings as in claim 1 wherein,
    the tray has a rectangular flat platform with an upper surface having guide slots for car wheels.

13. The hoisting system for high-rise buildings as in claim 12 wherein,
    the guide slots have a horizontal surface, an inclined surface and slant flanges.

14. The hoisting system for high-rise buildings as in claim 12 wherein,
    the tray has a bottom with a ridged coating.

15. The hoisting system for high-rise buildings as in claim 1 having,
    a transit platform adjacent the loading platform.

16. The hoisting system for high-rise buildings as in claim 15 wherein,
    the transit platform has rectangular compartments with metallic curbs.

17. The hoisting system for high-rise buildings as in claim 16 wherein,
    the metallic curbs have a guide roller for engaging the trays.

18. The hoisting system for high-rise buildings as in claim 15 wherein,
    the transit platform has a shaft with an absorber under the transit platform.

19. The hoisting system for high-rise buildings as in claim 15 having,
    an automatic barrier in front of each tray mounted on the rectangular compartment in the transit platform or on the rectangular compartment of the truss section of the loading platform to regulate traffic.

20. The hoisting system for high-rise buildings as in claim 7 wherein,
    the vertical stacks of the metallic frame has stairs or passenger elevators therein for people to move up and down between floors in the building.

21. The hoisting system for high-rise buildings as in claim 1 wherein, the building has a firewall with a dismountable multi-level structure adjacent thereto.

22. The hoisting system for high-rise buildings as in claim 21 wherein,
the dismountable multi-level structure has a metallic frame with the upright rails attached thereto.

23. The hoisting system for high-rise buildings as in claim 21 wherein,
the building has a plurality of floors,
a horizontal storage and retrieval dock on each floor.

24. The hoisting system for high-rise buildings as in claim 23 wherein,
the horizontal storage & retrieval dock has a row of rectangular compartments for cars or trays with cars.

25. The hoisting system for high-rise buildings as in claim 24 wherein,
the rectangular compartment in the horizontal storage & retrieval dock has a guide roller separating the rectangular compartments.

26. The hoisting system for high-rise buildings as in claim 23 wherein,
each rectangular compartment has a floor, a ceiling and a vertical structural element between the floor and the ceiling holding up the ceiling.

27. The hoisting system for high-rise buildings as in claim 26 wherein,
the guide rollers on the horizontal storage & retrieval dock are mounted in apertures in the lower part of vertical structural elements.

28. The hoisting system for high-rise buildings as in claim 26 having,
a drive wheel in the rectangular compartment in the storage & retrieval dock, and a tray engaged by the guide rollers and the drive wheels in the rectangular compartments in the storage & retrieval dock for moving the tray.

29. The hoisting system for high-rise buildings as in claim 24 wherein,
the rectangular compartments in storage & retrieval dock of dismountable multi-level structure and rectangular compartments in the truss section loading platform align so as to transfer trays between them.

30. The hoisting system for high-rise buildings as in claim 23 wherein,
the storage & retrieval dock has at least two rows of rectangular compartments for cars or trays with cars thereon.

31. The hoisting system for high-rise buildings as in claim 30 having,
at least one guide roller separating each rectangular compartment in the storage & retrieval dock.

32. The hoisting system for high-rise buildings as in claim 30 wherein,
each rectangular compartment has a floor, a ceiling and a vertical structural element between the floor and the ceiling for supporting the ceiling.

33. The hoisting system for high-rise buildings as in claim 32 wherein,
the guide rollers on horizontal storage & retrieval dock are mounted in apertures in the lower part of vertical structural elements.

34. The hoisting system for high-rise buildings as in claim 32 wherein,
the rectangular compartments in the storage & retrieval dock have drive wheels in the floor.

35. The hoisting system for high-rise buildings as in claim 23 having,
a second storage and retrieval dock on each floor on the opposing side of the floor such that one storage and retrieval dock is for loading and one for unloading.

36. The hoisting system for high-rise buildings as in claim 23 having,
a conveying system connecting a front storage and retrieval dock to a rear storage and retrieval dock to provide a rotation of empty trays beyond the boundaries of storage & retrieval docks at the multi-level structure.

37. The hoisting system for high-rise buildings as in claim 36 having,
the conveying system with a plurality of rectangular compartments, each rectangular compartment having a guide roller.

38. The hoisting system for high-rise buildings as in claim 37 having,
a tray, the tray engaged by the guide roller.

39. The hoisting system for high-rise buildings as in claim 37 wherein,
the dimensions of rectangular compartments in conveying system and rectangular compartments storage and retrieval docks are the same.

40. The hoisting system for high-rise buildings as in claim 36 having,
an automatic washing and air-drying device adjacent the conveying system for cleaning the trays.

41. The hoisting system for high-rise buildings as in claim 36 having,
a crane for handling the trays in the conveying system.

42. The hoisting system for high-rise buildings as in claim 39 wherein,
the rectangular compartments in the conveying system, the storage and retrieval dock and the loading platform are of uniform size.

43. The hoisting system for high-rise buildings as in claim 42 wherein,
the rectangular compartments all have a length to width ratio of 2 to 1.

44. The hoisting system for high-rise buildings as in claim 43 wherein,
the rectangular compartments all have two squared zones.

45. The hoisting system for high-rise buildings as in claim 44 wherein,
each squared zone has a drive wheel.

46. The hoisting system for high-rise buildings as in claim 45 wherein,
each squared zone has four drive wheels with pairs on axes of symmetry on each side of the squared zone.

47. The hoisting system for high-rise buildings as in claim 46 wherein,
the drive wheels in each squared zone rotate on parallel axes and are positioned at zero degrees, 90 degrees, 180 degrees and 270 degrees from the center and at equal distances from the center.

48. The hoisting system for high-rise buildings as in claim 47 wherein,
an engine turns the drive wheels.

49. The hoisting system for high-rise buildings as in claim 48 wherein,
the guide wheels have a tire with a tread.

50. The hoisting system for high-rise buildings as in claim 42 wherein,
a plurality of guide rollers are positioned to engage the rectangular compartments.

51. The hoisting system for high-rise buildings as in claim 50 wherein, each rectangular compartment has a right side a left side a front and a rear with two guide rollers at the front, two guide rollers at the rear, four guide rollers on the left side and four guide rollers on the right side of the rectangular compartments.

52. The hoisting system for high-rise buildings as in claim 51 wherein,
the guide roller has a rod with upper and lower round pads, the guide rollers have a spindle with a tire for engaging the rectangular compartments.

53. The hoisting system for high-rise buildings as in claim 52 wherein,
the tires on the guide rollers have a tread.

54. The hoisting system for high-rise buildings as in claim 52 wherein,
the roller guide has an upper round pad with a spherical surface on the top.

55. The hoisting system for high-rise buildings as in claim 52 wherein,
at least one of the guide rollers has a spindle having a mechanism providing the guide roller with a reciprocal vertical motion.

56. The hoisting system for high-rise buildings as in claim 52 wherein,
at least one guide rollers has a protruding bearing part for engaging the tray.

57. The hoisting system for high-rise buildings as in claim 56 wherein,
the protruding bearing part has an elastic gasket.

58. The hoisting system for high-rise buildings as in claim 48 wherein,
the drive wheels have a pivoted carriage in each squared zone of rectangular compartments.

59. The hoisting system for high-rise buildings as in claim 48 wherein,
the pivoted carriages in each squared zone have a drive wheel rigidly secured therein.

60. The hoisting system for high-rise buildings as in claim 59 having,
a slide-out bearing element for engaging the bottom of the tray.

61. The hoisting system for high-rise buildings as in claim 60 having,
an elastic gasket on the upper end face of the slide-out bearing element.

62. The hoisting system for high-rise buildings as in claim 45 having,
the drive wheels arranged with each corner of the squared zone having a pair of wheels one parallel to each side of the squared zone, each drive wheel having a vertical actuation relative the rectangular compartment.

63. The hoisting system for high-rise buildings as in claim 44 wherein,
the tray has a rectangular flat platform with an upper surface having guide slots for car wheels,
the drive wheels, mounted in pairs at the corners of each squared zone of rectangular compartments, engage the guide slots on the tray bottoms.

64. The hoisting system for high-rise buildings as in claim 63 wherein,
the guide slots on the tray bottom have a slant flange therein.

* * * * *